(12) United States Patent
Ookubo et al.

(10) Patent No.: US 12,198,324 B2
(45) Date of Patent: Jan. 14, 2025

(54) EVALUATION INDEX CALCULATION DEVICE, EVALUATION INDEX CALCULATION METHOD, AND EVALUATION INDEX CALCULATION PROGRAM

(71) Applicant: TOPPAN Inc., Taito-ku (JP)

(72) Inventors: Wataru Ookubo, Taito-ku (JP); Masanori Sakamoto, Taito-ku (JP); Norihiko Kaneko, Taito-ku (JP)

(73) Assignee: TOPPAN Inc., Taito-ku (JP)

( * ) Notice: Subject to any disclaimer, the term of this patent is extended or adjusted under 35 U.S.C. 154(b) by 100 days.

(21) Appl. No.: 18/079,311

(22) Filed: Dec. 12, 2022

(65) Prior Publication Data

US 2023/0114724 A1 Apr. 13, 2023

Related U.S. Application Data

(63) Continuation of application No. PCT/JP2021/022366, filed on Jun. 11, 2021.

(30) Foreign Application Priority Data

Jun. 11, 2020 (JP) ................................. 2020-101875
Jun. 11, 2020 (JP) ................................. 2020-101876

(51) Int. Cl.
*G01N 21/59* (2006.01)
*G06T 7/00* (2017.01)
*G02F 1/13* (2006.01)

(52) U.S. Cl.
CPC ........... *G06T 7/0004* (2013.01); *G01N 21/59* (2013.01); *G02F 1/1309* (2013.01); *G06T 2207/30108* (2013.01)

(58) Field of Classification Search
CPC ...... G06T 7/0004; G01N 21/59; G02F 1/1309
USPC ......................................................... 348/135
See application file for complete search history.

(56) References Cited

U.S. PATENT DOCUMENTS

2021/0072572 A1 3/2021 Yamada et al.

FOREIGN PATENT DOCUMENTS

| JP | H09-68497 A | 3/1997 |
|----|----|----|
| JP | 2000-19064 A | 1/2000 |
| JP | 2001-305051 A | 10/2001 |
| JP | 2016-003906 A | 1/2016 |

(Continued)

OTHER PUBLICATIONS

JP2019200284 Machine Translation (Year: 2019).*

(Continued)

*Primary Examiner* — Nguyen T Truong
(74) *Attorney, Agent, or Firm* — Oblon, McClelland, Maier & Neustadt, L.L.P.

(57) ABSTRACT

The present disclosure provides an evaluation index calculation device, an evaluation index calculation method, and an evaluation index calculation program which are capable of diversifying an evaluation index representing an optical state of a light control sheet. The evaluation index calculation device acquires an evaluation image of an imaging target in a predetermined environment, captured via a light control sheet, and calculates a degree of obscuring caused by the light control sheet in the evaluation image, as an evaluation index, through image analysis of the evaluation image.

11 Claims, 25 Drawing Sheets

(56) References Cited

FOREIGN PATENT DOCUMENTS

JP           6493598 B1     4/2019
JP     2019-200284 A   11/2019

OTHER PUBLICATIONS

Search Report issued Aug. 24, 2021 in International Application No. PCT/JP2021/022366 filed Jun. 11, 2021, 6 pages (with English Translation).
Agrawal et al., "Multifocus image fusion using modified pulse coupled neural network for improved image quality", IET Image Processing, 2010, vol. 4, Issue 6, pp. 443-451, XP006036052.
Hua et al., "Impact of Out-of-focus Blur on Face Recognition Performance Based on Modular Transfer Function", Biometrics (ICB), 2012 $5^{th}$ IAPR International Conference On, IEEE, Mar. 29, 2012, pp. 85-90, XP032215534.
Extended European Search Report issued on Oct. 30, 2023 in European Patent Application No. 21821553.1, 10 pages.

\* cited by examiner

EVALUATION INDEX CALCULATION DEVICE, EVALUATION INDEX CALCULATION METHOD, AND EVALUATION INDEX CALCULATION PROGRAM

CROSS-REFERENCE TO RELATED APPLICATIONS

The present application is a continuation of International Application No. PCT/JP2021/022366, filed Jun. 11, 2021, which is based upon and claims the benefits of priority to Japanese Application No. 2020-101875, filed Jun. 11, 2020, and Japanese Application No. 2020-101876, filed Jun. 11, 2020. The entire contents of all of the above applications are incorporated herein by reference.

BACKGROUND OF THE INVENTION

Field of the Invention

The present disclosure relates to evaluation index calculation devices, evaluation index calculation methods, and evaluation index calculation programs, calculating an evaluation index of an optical state of a light control sheet.

Discussion of the Background

Visibility of an object via light control sheets containing liquid crystal molecules between the transparent electrodes changes according to the change in voltage applied between the transparent electrodes. Normal-type light control sheets that remain opaque in a de-energized state are applied to digital signage screens, store exteriors, and the like which are required to be opaque for a long time. Reverse-type light control sheets that remain transparent in a de-energized state are applied to glass partitions, windows of moving objects, and the like which are required to be transparent in an emergency.

Stabilization of optical state or improvement of reproducibility in light control sheets can lead to widespread application of light control sheets to accelerate the spread of light control sheets. Haze according to JIS K 7136: 2000 is adopted to evaluation indices of optical states of light control sheets. For example, it is proposed that haze of the light control sheet being 95% or more as a predetermined level is set as an opacity control item, and haze in the light control sheet being 12% or less as a predetermined level is set as a transparency control item (e.g., see JP 6493598 B).

SUMMARY OF THE INVENTION

According to an aspect of the present invention, a method of calculating an evaluation index representing an optical state of a light control sheet includes acquiring an evaluation image related to a subject in a predetermined environment and captured via the light control sheet, and calculating a degree of obscuring caused by the light control sheet in the evaluation image, as the evaluation index, through image analysis of the evaluation image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
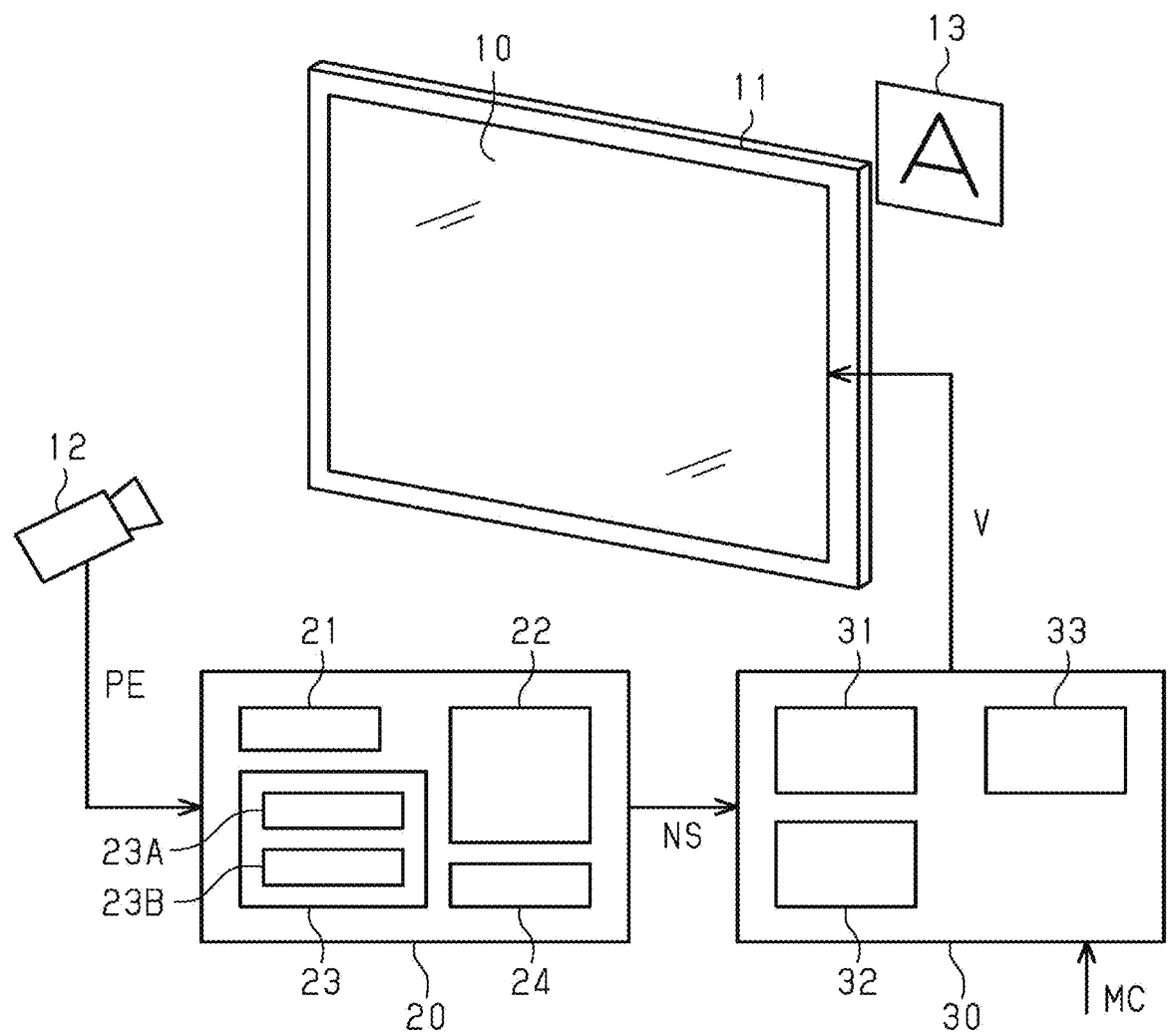
FIG. 1 is a block diagram illustrating a configuration of an evaluation index calculation device together with a light control sheet.

The embodiments will now be described with reference to the accompanying drawings, wherein like reference numerals designate corresponding or identical elements throughout the various drawings.

First Embodiment

Referring to FIGS. 1 to 27, a description will be given of a first embodiment of an evaluation index calculation device, an evaluation index calculation method, and an evaluation index calculation program. First, the configuration of a light control sheet as an evaluation target will be described, and then, an evaluation index calculation device, an evaluation index calculation method, and an evaluation index calculation program will be described.

<Light Control Sheet 10>

A light control sheet 10 is configured such that the light transmittance can be changed. The light transmittance of the light control sheet 10 is changed by changing the driving voltage applied to the light control sheet 10. Other than liquid crystal light control sheets, electrochromic sheets are also included in the types of the light control sheet 10. Light transmittance of liquid crystal light control sheets is controlled by controlling orientation of liquid crystal molecules with application of a driving voltage V. Light transmittance of electrochromic sheets is controlled by controlling charge of the electrochromic materials with application of a driving voltage V.

The light control sheet 10 is mounted to a transparent member 11. The transparent member 11 may be a window of various types of buildings such as commercial facilities and public facilities. The transparent member 11 may be a partition installed in offices, medical facilities, and the like. The transparent member 11 may be a display window installed in exhibition facilities or cultural facilities. The transparent member 11 may be a substrate of a screen on which an image is projected. The transparent member 11 may be a window of a moving object such as a vehicle or aircraft. The light control sheet 10 may be mounted to a surface of a transparent member 11 such as a windowpane, or may be mounted between two transparent members such as of laminated glass.

The light control sheet 10 may have a two-dimensional curved shape such as a cylindrical shape or an elliptic cylindrical shape, three-dimensional curved shape such as a spherical shape or an ellipsoidal shape, indefinite shape other than a geometric shape, or other shapes, in addition to a planar shape conforming to the contour of the transparent member 11. The light control sheet 10 in a high light transmittance state is colorless and transparent, or colored and transparent. The light control sheet 10 in a low light transmittance state has no hue, or has a hue.

The light control sheet 10 is of a normal type or a reverse type. When the light control sheet 10 is of a normal type, it has a relatively high light transmittance when energized, and has a relatively low light transmittance when de-energized. When the light control sheet 10 is of a reverse type, it has a relatively low light transmittance when energized, and has a relatively high light transmittance when de-energized.

The light control sheet 10 includes a first transparent electrode, a second transparent electrode, and a light control layer extending in the plane of the light control sheet 10. In the light control sheet 10, the first transparent electrode, the light control layer, and the second transparent electrode are laminated in this order. The light control layer is located between the first and second transparent electrodes. The first and second transparent electrodes are electrically connected to a light control device 30.

The first and second transparent electrodes have light transmittance allowing visible light to pass therethrough. Light transmittance of the first transparent electrode allows visual recognition of an object via the light control sheet 10. Light transmittance of the second transparent electrode also allows visual recognition of an object via the light control sheet 10. The material forming the transparent electrodes may be, for example, any material selected from the group consisting of indium tin oxide, fluorine-doped tin oxide, tin oxide, zinc oxide, carbon nanotubes, and poly(3,4-ethylenedioxythiophene).

Light control layers included in liquid crystal light control sheets contain liquid crystal compositions. Such a liquid crystal composition contains a liquid crystal compound, an example of which may be at least one selected from the group consisting of Schiff base compounds, azo compounds, azoxy compounds, biphenyl compounds, terphenyl compounds, benzoic acid ester compounds, tolan compounds, pyrimidine compounds, cyclohexanecarboxylic acid ester compounds, phenylcyclohexane compounds, and dioxane compounds. Types of retaining liquid crystal compositions may include a polymeric dispersion type and a capsule type. In the polymeric dispersion type, liquid crystal compositions are retained in a large number of voids dispersed in a polymer layer. The polymeric dispersion type includes a polymer network dispersion type which is provided with a three-dimensional mesh polymer network. In the polymer network dispersion type, liquid crystal compositions are retained in mesh voids. In the capsule type, liquid crystal compositions in a capsule shape are retained in a polymer layer.

Reverse-type liquid crystal light control sheets further include an alignment film between the light control layer and the first transparent electrode and another alignment film between the light control layer and the second transparent electrode. Examples of the material forming the alignment film may include organic compounds such as polyimides, polyamides, polyvinyl alcohols, and cyanide compounds, inorganic compounds such as silicone, silicon oxide, and zirconium oxide, and mixtures of these materials.

The alignment films may be, for example, vertical alignment films or horizontal alignment films. In the vertical alignment films, the liquid crystal compound is aligned so that the long axes of the liquid crystal molecules are perpendicular to the surface which is opposed to the surface contacting the first transparent electrode, or perpendicular to the surface which is opposed to the surface contacting the second transparent electrode. In the horizontal alignment films, the liquid crystal compound is aligned so that the long axes of the liquid crystal compound are substantially parallel to the surface which is opposed to the surface contacting the first transparent electrode, or substantially parallel to the surface which is opposed to the surface contacting the second transparent electrode.

Light control layers provided to electrochromic sheets contain an electrochromic material and an electrolyte. Examples of the electrochromic material may include organic compounds and inorganic compounds. Examples of the organic compounds may include polyaniline derivatives, viologens, metallic phthalocyanines, and phenanthroline complexes. Examples of the inorganic compounds may include tungsten trioxide and indium dioxide. Examples of the electrolyte may include liquid electrolytes such as lithium salt and potassium salt, and solid polyelectrolytes.

Light Control System

FIG. 1 shows a light control system including the light control sheet 10, an imaging device 12, an index calculation device 20 as an example of the evaluation index calculation device, and the light control device 30 as an example of a drive unit.

Upon receiving a drive command NS from the index calculation device 20 or upon receiving an input signal MC from an operation unit, the light control device 30 drives the light control sheet 10 to calculate an evaluation index Qe. The imaging device 12 captures an image of an imaging target 13 via the light control sheet 10 to produce an evaluation image PE of the imaging target 13. The imaging device 12 transmits the evaluation image PE produced by the imaging device 12 to the index calculation device 20. The index calculation device 20 analyzes the evaluation image PE to calculate a degree of obscuring caused by the light control sheet 10 in the evaluation image PE.

The degree of obscuring calculated by the index calculation device 20 is an evaluation index Qe of the light control sheet 10. The degree of obscuring caused by the light control sheet 10 indicates whether the light control sheet 10 has a predetermined optical state. The predetermined optical state may be a haze of not less than a predetermined value, or may be a clarity of not more than a predetermined value. The predetermined optical state may be, for example, a haze of not more than a predetermined value, or may be a clarity of not less than a predetermined value. Furthermore, the degree of obscuring caused by the light control sheet 10 indicates whether the light control sheet 10 has been brought into the predetermined optical state by the light control device 30.

For example, the degree of obscuring caused by the light control sheet 10 may be a value indicating whether the light control sheet 10 has a high haze by which the presence of an object cannot be visually recognized via the light control sheet 10.

For example, the degree of obscuring caused by the light control sheet 10 may be a value indicating whether the light control sheet 10 has a low haze by which the presence of an object can be visually recognized via the light control sheet 10.

For example, the degree of obscuring caused by the light control sheet 10 may be a value indicating whether the light control sheet 10 has a high haze by which the contour of an object cannot be visually recognized via the light control sheet 10.

For example, the degree of obscuring caused by the light control sheet 10 may be a value indicating whether the light control sheet 10 has a low haze by which the contour of an object can be visually recognized via the light control sheet 10.

For example, the degree of obscuring caused by the light control sheet 10 may be a value indicating whether the light control sheet 10 has a low clarity by which the type of an object cannot be visually recognized via the light control sheet 10.

For example, the degree of obscuring caused by the light control sheet 10 may be a value indicating whether the light control sheet 10 has a high clarity by which the details of an object can be visually recognized via the light control sheet 10.

During manufacture, installation, or use of the light control sheet 10, for example, the index calculation device 20 compares an evaluation index Qe calculated by the index calculation device 20 with an index threshold Qm that is an evaluation index when the light control sheet 10 is in a normal optical state, thereby determining whether the light control sheet 10 is in a normal state. Specifically, the evaluation index Qe calculated by the index calculation device 20 is used for abnormality determination of the light control sheet 10. The evaluation index when the optical state of the light control sheet 10 is normal may be obtained through an analysis of an image captured via the light control sheet 10 satisfying the predetermined optical state, or may be obtained through simulation using the predetermined optical state.

During manufacture, installation, or use of the light control sheet 10, for example, the index calculation device 20 specifies a driving voltage V at which the optical state of the light control sheet 10 is estimated to be normal. Upon receiving a drive command NS from the index calculation device 20 or upon receiving an input signal MC from the user, the light control device 30 applies the specified driving voltage V to the light control sheet 10. In other words, the evaluation index Qe calculated by the index calculation device 20 is used for drive correction of the light control sheet 10.

In deterioration determination processing, for example, the index calculation device 20 stores a previous index Q0, which is the previously calculated evaluation index, during use of the light control sheet 10 to determine whether the deviation between the currently calculated evaluation index Qe and the previous index Q0 is in a predetermined range. Then, if the deviation between the currently calculated evaluation index Qe and the previous index Q0 is in the predetermined range, the index calculation device 20 determines that excessive aging has not yet occurred in the light control sheet 10. On the other hand, if the deviation between the currently calculated evaluation index Qe and the previous index Q0 is out of the predetermined range, the index calculation device 20 determines that excessive aging or the like has occurred in the light control sheet 10. In other words, the evaluation index Qe calculated by the index calculation device 20 is used for deterioration determination for the light control sheet 10.

The imaging device 12 and the index calculation device 20 are configured so that the imaging device 12 can transmit the evaluation image PE and the index calculation device 20 can receive the evaluation image PE via wired or wireless communication. The index calculation device 20 may be, for example, a maintenance device connected to the imaging device 12 to enable communication therebetween without using a network, a server device connected to the imaging device 12 to enable communication therebetween via a network, a device incorporated in a user terminal in which the imaging device 12 is installed, or other devices. The index calculation device 20 may be, for example, a server device which accepts a request for calculating an evaluation index Qe from a user terminal in which the imaging device 12 is installed to thereby receive an evaluation image PE captured via the light control sheet 10 from the user terminal.

Th index calculation device 20 and the light control device 30 are configured, for example, so that the index calculation device 20 can transmit a drive command NS and the light control device 30 can receive the drive command NS via wired or wireless communication. The index calculation device 20 may be, for example, a maintenance device connected to the light control device 30 to enable communication therebetween without using a network, a server device connected to the light control device 30 to enable communication therebetween via a network, or an electronic device provided with a hardware component partially common to the light control device 30.

The imaging device 12 includes a two-dimensional image sensor in which imaging elements, such as CCDs (charged coupled devices) and CMOSs (complementary metal oxide semiconductors), are two-dimensionally arranged, and an imaging optical system which produces an image on the light receiving surface of the image sensor with light emitted from an imaging target 13. The imaging device 12 causes light emitted from the imaging target 13 to produce an image on the light receiving surface of the image sensor to record a still image of the imaging target 13 captured via the light control sheet 10 as an evaluation image PE that is image data. The imaging device 12 may be, for example, a camera installed in a smartphone or tablet, or may be a monitoring camera installed in various facilities such as commercial facilities and public facilities, or may be a generally used camera such as a digital camera.

The imaging device 12 produces an evaluation image PE. The evaluation image PE is an image of an imaging target 13 in a predetermined environment, captured via the light control sheet 10. The imaging target 13 is imaged via the light control sheet 10 in a state in which the imaging device 12 and the imaging target 13 are placed in the predetermined environment.

The predetermined environment where the evaluation image PE is captured may include a setting environment for the imaging device 12, an illumination environment for the imaging device 12, and an illumination environment for the imaging target 13. The setting environment for the imaging device 12 may be one in which, for example, a manual focus distance during imaging is set to a predetermined value, or an aperture or a shutter speed during imaging is set to a predetermined value. The illumination environment for the imaging device 12 may be one in which, for example, lights are turned on in the place where the imaging device 12 is placed, or the amount of solar radiation in the place where the imaging unit 12 is placed is estimated to be a predetermined amount. The illumination environment for the imaging target 13 may be one in which, for example, lights are turned on in the place where the imaging target 13 is placed, or the amount of solar radiation in the place where the imaging object 13 is placed is estimated to be a predetermined amount. The amount of solar radiation being estimated to be a predetermined amount may be that, for example, the date and time of imaging are a predetermined date and time, the weather during imaging is fine, or the like. Thus, an evaluation image PE is captured not by a dedicated optical device such as an integrating sphere, but by a general-purpose imaging device such as a smartphone or tablet.

The imaging target 13 is a target of imaging used for calculating an evaluation index Qe. The imaging target 13 may include test patterns such as printed matter prepared in advance, person's images, artificial objects such as buildings or structures visually recognized via the light control sheet 10, and natural landscapes visually recognized via the light control sheet 10.

The test patterns may be, for example, printed matter used for evaluating physical performance, such as contrast, resolution and noise, based on the degree of separation between white and black. Examples of the test patterns may include patterns in which thin white and black lines are alternated in parallel, patterns in which thin white and black lines are radially arranged, patterns in which thin white and black lines with different line widths are alternated in parallel, and patterns in which thin white and black lines with different densities are arranged. The test patterns may include, for example, characters or alphanumeric characters with different sizes. Furthermore, examples of the test patterns may include test charts including text such as characters or alphanumeric characters used for resolution measurement of digital cameras, resolution charts according to ISO 12233-2000, and barcode test charts according to JIS X 0527 used for performance evaluation of barcode readers.

Index Calculation Device 20

The index calculation device 20 is not limited to one that performs all of various types of processing using software components. For example, the index calculation device 20 may include dedicated hardware components such as integrated circuits (graphics processing unit: GPU or application specific integrated circuit: ASIC) for specific applications in which at least part of various types of processing is executed. The index calculation device 20 may also be configured as a circuit which includes one or more dedicated hardware circuits such as ASICs, one or more processors operating according to computer programs, or combinations of them. It should be noted that the following description will be given taking an example in which the index calculation device 20 stores an evaluation index calculation program in a readable medium and reads and executes the evaluation index calculation program stored in the readable medium to execute various types of processing.

The index calculation device 20 includes a control unit 21, an image analysis unit 22, a storage unit 23, and a communication unit 24.

The storage unit 23 stores an evaluation index calculation program 23A for calculating an evaluation index, and index calculation information 23B used for executing the evaluation index calculation program. The index calculation information 23B includes information on evaluation voltage V0 and sampling conditions. The evaluation voltage V0 is a driving voltage V applied to the light control sheet 10. The evaluation voltage V0 is used as an initial driving voltage V applied for calculating an evaluation index Qe. The sampling conditions are conditions for extracting a sample group used for calculating an evaluation index Qe from feature vector distribution. The sampling conditions are determined so that a sample group suitable for evaluation is extracted based on the results of tests or the like conducted in advance.

For example, a high haze range that does not allow visual recognition of the presence of an object via the light control sheet 10 may be adopted for the predetermined optical state as an evaluation item. In this case, a condition for extracting a sample group, which is suitable for high haze evaluation, from the feature vector distribution is stored as a sampling condition.

For example, a low haze range that allows visual recognition of the presence of an object via the light control sheet 10 may be adopted for the predetermined optical state as an evaluation item. In this case, a condition for extracting a sample group, which is suitable for low haze evaluation, from the feature vector distribution is stored as a sampling condition.

For example, a high haze range that does not allow visual recognition of the contour of an object via the light control sheet 10 may be adopted for the predetermined optical state as an evaluation item. In this case, a condition for extracting a sample group, which is suitable for high haze evaluation, from the feature vector distribution is stored as a sampling condition.

For example, a low haze range that allows visual recognition of the details of an object via the light control sheet 10 may be adopted for the predetermined optical state as an evaluation item. In this case, a condition for extracting a sample group, which is suitable for low haze evaluation, from the feature vector distribution is stored as a sampling condition.

For example, a low clarity range that does not allow visual recognition of the contour of an object via the light control sheet 10 may be adopted for the predetermined optical state as an evaluation item. In this case, a condition for extracting a sample group, which is suitable for low clarity evaluation, from the feature vector distribution is stored as a sampling condition.

For example, a high clarity range that allows visual recognition of the details of an object via the light control sheet 10 may be adopted for the predetermined optical state as an evaluation item. In this case, a condition for extracting a sample group, which is suitable for high clarity evaluation, from the feature vector distribution is stored as a sampling condition.

It should be noted that the index calculation information 23B may include data which is required for various types of processing using the evaluation index Qe. The data required for various types of processing may be the index threshold Qm, or may be an upper limit voltage Vmax, or may be a step voltage Vs. The index threshold Qm is a threshold of the evaluation index Qe obtained via the light control sheet 10 satisfying the evaluation items, and is determined based on tests or the like conducted in advance. The upper limit voltage Vmax is a maximum value of the driving voltage applied to the light control sheet 10 by the light control device 30. The step voltage Vs is an amount of change in the driving voltage V which is changed every time an evaluation index Qe is calculated in the drive correction.

The control unit 21 reads the evaluation index calculation program 23A from the storage unit 23 and interprets the evaluation index calculation program 23A to cause the image analysis unit 22, the storage unit 23, and the communication unit 24 to execute various types of processing. For example, the control unit 21 may cause the communication unit 24 to acquire an evaluation image PE from the imaging device 12. The control unit 21 may cause the image analysis unit 22 to perform image analysis using the evaluation image PE acquired by the communication unit 24. The control unit 21 may cause the communication unit 24 to output the results of the image analysis performed by the image analysis unit 22 to the outside. The control unit 21, which is an example of the determination section, may perform abnormality determination for the light control sheet 10 using the results of the image analysis performed by the image analysis unit 22. Furthermore, the control unit 21 may execute drive correction for the light control sheet 10, using the results of the image analysis performed by the image analysis unit 22.

Image Analysis Unit 22

The image analysis unit 22 analyzes the evaluation image PE to calculate a degree of obscuring caused by the light control sheet 10 in the evaluation image PE, as an evaluation index Qe. The image analysis unit 22 is an example of the calculation section.

Figure 2:
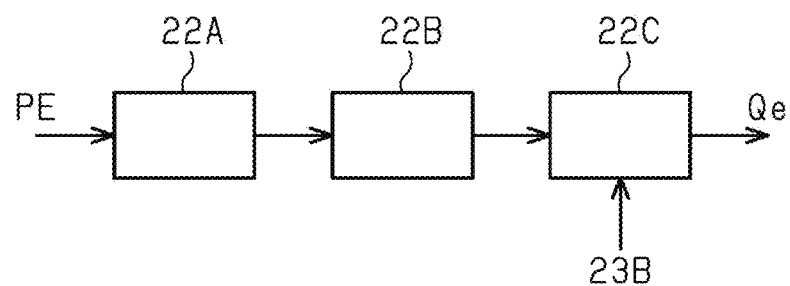
FIG. 2 is a block diagram illustrating a functional configuration of an image analysis unit.

As shown in FIG. 2, the image analysis unit 22 functions as a grayscale processor 22A, an FFT processor 22B, and a frequency analyzer 22C. The grayscale processor 22A performs (i) grayscaling of the evaluation image PE. The FFT processor 22B performs (ii) two-dimensional fast Fourier transform using the grayscaled image data. The frequency analyzer 22C performs (iii) frequency analysis of the Fourier transform image using the results of the processing of the FFT processor 22B.

It should be noted that, in the image analysis performed by the image analysis unit 22, a degree indicating clarity of the evaluation image PE may be calculated as a degree of obscuring of the image. For example, in the image analysis performed by the image analysis unit 22, the range of the evaluation image PE may be detected based on the pixel luminance, and the difference in optical density between the luminance or the like of the evaluation image PE and the luminance or the like of the background image may be determined as a degree of obscuring of the image. Alternatively, in the image analysis performed by the image analysis unit 22, an edge intensity on the contour of the evaluation image PE may be calculated as a degree of obscuring of the image. Alternatively, in the image analysis performed by the image analysis unit 22, an optical density on the contour of the evaluation image PE may be calculated as a degree of obscuring of the image. For example, in the image analysis performed by the image analysis unit 22, edge detection processing may be performed to detect the contour of the evaluation image PE based on the pixel luminance, and an average of the edge intensities on the detected contour may be determined as a degree of obscuring of the image. For example, in the image analysis performed by the image analysis unit 22, edge detection processing may be performed to detect the contour of the evaluation image PE based on the pixel luminance, and an average of the optical densities on the detected contour may be determined as a degree of obscuring of the image.

(i) In the grayscaling, image data in an RGB space is converted to image data in a YUV space. In the grayscaling, an intermediate value method may be used, or a weighted average method may be used. In the intermediate value method, the intermediate value of the RGB values is outputted. In the weighted average method, an average of the RGB values weighted by the coefficients of the respective colors is outputted. In the grayscaling, the weighted average method may be combined with a correction. In the combination of the weighted average method with a correction, a gamma correction is applied to the weighted average of the RGB values weighted by the coefficients of the respective colors. Furthermore, in the grayscaling, a simple average method may be used, or a median value method may be used. In the simple average method, a simple average of the RGB values is outputted. In the median value method, a median value of the RGB values is outputted.

(ii) The two-dimensional fast Fourier transform is performed using the grayscaled image data, while calculating feature vector distribution in the two-dimensional Fourier transform image. The feature vectors are radial vectors and/or angular vectors. Radial distribution $p(r)$ is an example of frequency components and is the sum of the power spectra in the concentric circular region, which are present at a distance r from the center of the two-dimensional Fourier transform image. Angular distribution $q(\theta)$ is the sum of the power spectra in the linear region at an angle $\theta$ with respect to the horizontal axis. The feature vector distribution indicates spatial frequencies and directions of strong waves included in the grayscaled image data, i.e., indicates periodicity of gradation in radial or angular direction in the image.

(iii) In the frequency analysis, a sample group satisfying the sampling conditions is extracted from the feature vector distribution. In the frequency analysis, an evaluation index Qe is calculated from the feature vectors of the extracted sample group. As mentioned above, the sampling conditions are conditions for extracting a sample group used for calculating an evaluation index, from the feature vector distribution. In the frequency analysis, for example, the sum of the feature vectors of all the samples satisfying the sampling conditions is calculated as a sample integrated value SumV. In the frequency analysis, an evaluation index Qe is calculated using the calculated sample integrated value SumV and a reference value for normalizing the sample integrated value SumV.

Sampling

Figure 3:
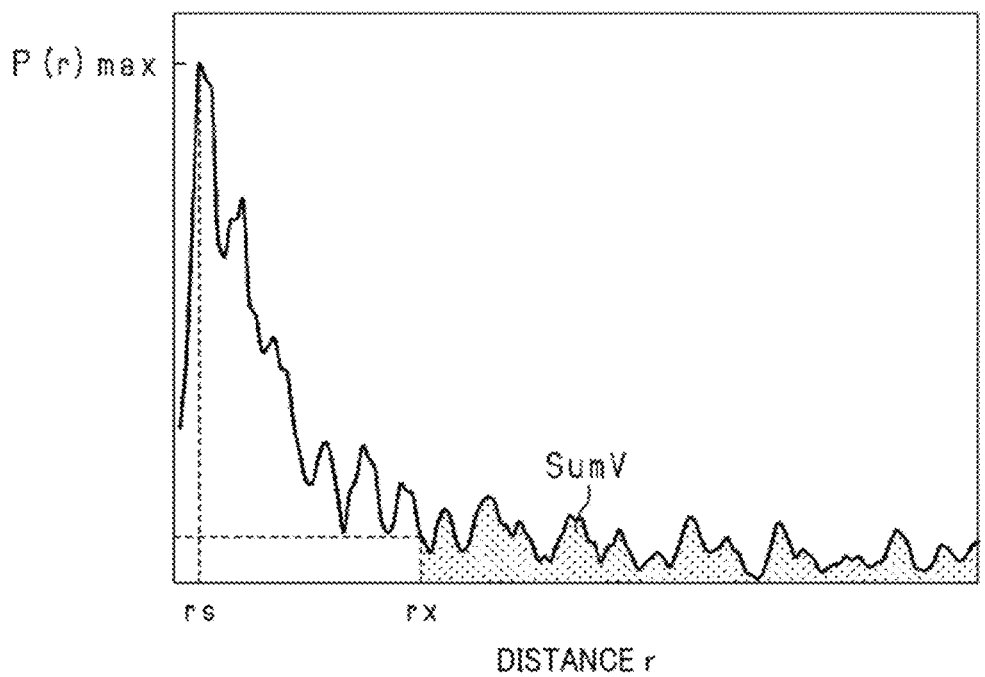
FIG. 3 is a power spectrum diagram illustrating an example of extracting a sample group for calculating an evaluation index.

Next, an example of extracting a sample group in the frequency analysis will be described below. FIG. 3 shows a sample group extracted in the power spectrum of a Fourier transform image, as a dotted region.

As shown in FIG. 3, for example, if the feature vector distribution is a radial distribution, an example of the sampling condition may be that the distance r should be in a predetermined range, i.e., the frequency should be in a predetermined frequency band. If a high haze not allowing visual recognition of the contour of an object is adopted for the predetermined optical state as an evaluation item, an example of the sampling condition may be that the distance r should be not less than a sample threshold rx. An example of the sample threshold rx may satisfy the following Conditions 1 and 2 in a radial distribution.

Sample threshold $rx$>Extraction reference distance $rs$ (Condition 1)

Sample threshold energy $p(rx)$<Extraction reference energy $p(rs)\times 10\%$ (Condition 2)

It should be noted that the extraction reference energy $p(rs)$ is, for example, a maximum value $p(r)max$ indicating the maximum energy in the radial distribution $p(r)$. The extraction reference distance rs is a distance r which provides the maximum value $p(r)max$.

The gradation waves corresponding to the maximum value $p(r)max$ in the grayscaled image have a high probability of being waves indicating the presence or absence of an object. The gradation waves corresponding to the energy smaller than the maximum value $p(r)max$ in the grayscaled image have a high probability of being waves indicating the contour or the like of an object. In the extraction of a sample group based on Conditions 1 and 2 set forth above, waves having a high probability of indicating the presence or absence of an object can be excluded from the sample groups to extract a sample group suitable for evaluating unrecognizability of the contour of an object.

Thus, in Conditions 1 and 2, the extraction reference energy (rs) is set to a specific feature vector to exclude waves having frequencies of not more than the gradation waves corresponding to the feature vectors. Thus, a sample group can be extracted so that the waves having higher frequencies than the gradation waves corresponding to the feature vectors can be a sample suitable for evaluating visual recognizability. Specifically, the sampling conditions are set so that the target range for calculating the magnitudes of frequency components is narrowed to a predetermined frequency range suitable for evaluation. In the frequency analysis, the sum of the feature vectors of all the samples extracted based on these sampling conditions is calculated as a sample integrated value SumV (dotted region in FIG. 3). Thus, in the frequency analysis, the sample integrated value SumV is divided by the reference value to calculate an evaluation index Qe normalized by the reference value.

For example, if a high haze not allowing visual recognition of the contour of an object is adopted for the predetermined optical state as an evaluation item, the reference value may be a sample integrated value SumV of the evaluation image PE captured in the predetermined environment without using the light control sheet 10, or may be a predetermined value estimated to correspond to this. Alternatively, the reference value may be a sample integrated value SumV of the evaluation image PE captured with the light control sheet 10 transparent, or may be a predetermined value estimated to correspond to this.

For example, if a low haze allowing visual recognition of the contour of an object is adopted for the predetermined optical state as an evaluation item, the reference value may be a sample integrated value SumV of the evaluation image PE captured in the predetermined environment via the light control sheet 10, or may be a predetermined value estimated to correspond to this. In this case, the reference value may also be separately calculated by the index calculation device 20, or may be stored in advance in the index calculation device 20.

For example, if the optical state of a normal light control sheet 10 with the driving voltage V applied thereto is adopted for the optical state as an evaluation item, the reference value may be a sample integrated value SumV when the driving voltage V is not applied to the normal light control sheet 10, or may be a predetermined value estimated to correspond to this.

For example, if the optical state of a normal light control sheet 10 with the driving voltage V not applied thereto is adopted for the optical state as an evaluation item, the reference value may be a sample integrated value SumV when the driving voltage V is applied to the normal light control sheet 10, or may be a predetermined value estimated to correspond to this.

In either of these cases, the reference value may also be separately calculated by the index calculation device 20, or may be stored in advance in the index calculation device 20.

Furthermore, if the feature vector distribution is an angular distribution $q(\theta)$, the sampling condition may be that the angle $\theta$ should be in a predetermined range. Furthermore, if the feature vector distribution is an angular distribution $q(\theta)$, the reference value may also be a sample integrated value obtained from the angular distribution $q(\theta)$ of the evaluation image PE captured in the predetermined environment without using the light control sheet 10, or may be a predetermined value estimated to correspond to this. Furthermore, if the feature vector distribution is an angular distribution $q(\theta)$, the reference value may be a sample integrated value obtained from the angular distribution $q(\theta)$ of the evaluation image PE captured with the light control sheet 10 transparent, or may be a predetermined value estimated to correspond to this.

The communication unit 24 acquires an evaluation image PE from the imaging device 12 in response to an instruction from the control unit 21. It should be noted that, in response to an instruction from the control unit 21, the communication unit 24 can, for example, transmit a drive command NS required for calculating an evaluation index Qe to the light control device 30, notify an external notification device of the results of abnormality determination, and transmit a drive command NS required for drive correction of the light control sheet 10 to the light control device 30. Also, the communication section 24 may transmit an evaluation index Qe calculated by the image analysis unit 22 to the user terminal in response to an instruction from the control unit 21.

Light Control Device 30

Referring back to FIG. 1, the light control device 30 is not limited to one that performs all of various types of processing using software components. For example, the light control device 30 may include a dedicated hardware component such as an application-specific integrated circuit (ASIC) that executes at least part of the various types of processing. The light control device 30 may also be configured as a circuit which includes one or more dedicated hardware circuits such as ASICs, one or more processors operating according to computer programs, or combinations of them. It should be noted that the following description will be given taking an example in which the light control device 30 stores a driving program in a readable medium, and reads and executes the driving program stored in the readable medium to execute various types of processing.

The light control device 30 includes a control unit 31, a storage unit 32, and a drive unit 33. The storage unit 32 stores a driving program for driving the light control sheet 10, and various types of data used for executing the driving program. The control unit 31 reads the driving program from the storage unit 32, and interprets the driving program to cause the drive unit 33 to generate the driving voltage V.

For example, upon receiving a drive command NS from the index calculation device 20 or upon receiving an input signal MC from an operation unit, the control unit 31 may cause the drive unit 33 to generate the driving voltage V for calculating an evaluation index Qe. The drive unit 33 may apply the generated driving voltage V to the light control sheet 10.

For example, the control unit 31 may receive a drive command NS after drive correction from the index calculation device 20 to cause the storage unit 32 to store the driving voltage V corrected by the drive correction. Upon receiving a drive command NS from the index calculation device 20 or upon receiving an input signal MC from an operation unit, the control unit 31 may read the corrected driving voltage V from the storage unit 32 and cause the drive unit 33 to generate the corrected driving voltage V. The drive unit 33 may apply the generated corrected driving voltage V to the light control sheet 10.

Index Calculation Method

Next, an index calculation method performed by the index calculation device 20 will be described, together with various types of processing such as normality determination, abnormality determination, and drive correction which can be executed by the light control system. The following description will be given taking an example in which it is evaluated whether the light control sheet 10 has a high haze that does not allow visual recognition of an object via the light control sheet 10, using a reverse type liquid crystal light control sheet.

Figure 4:
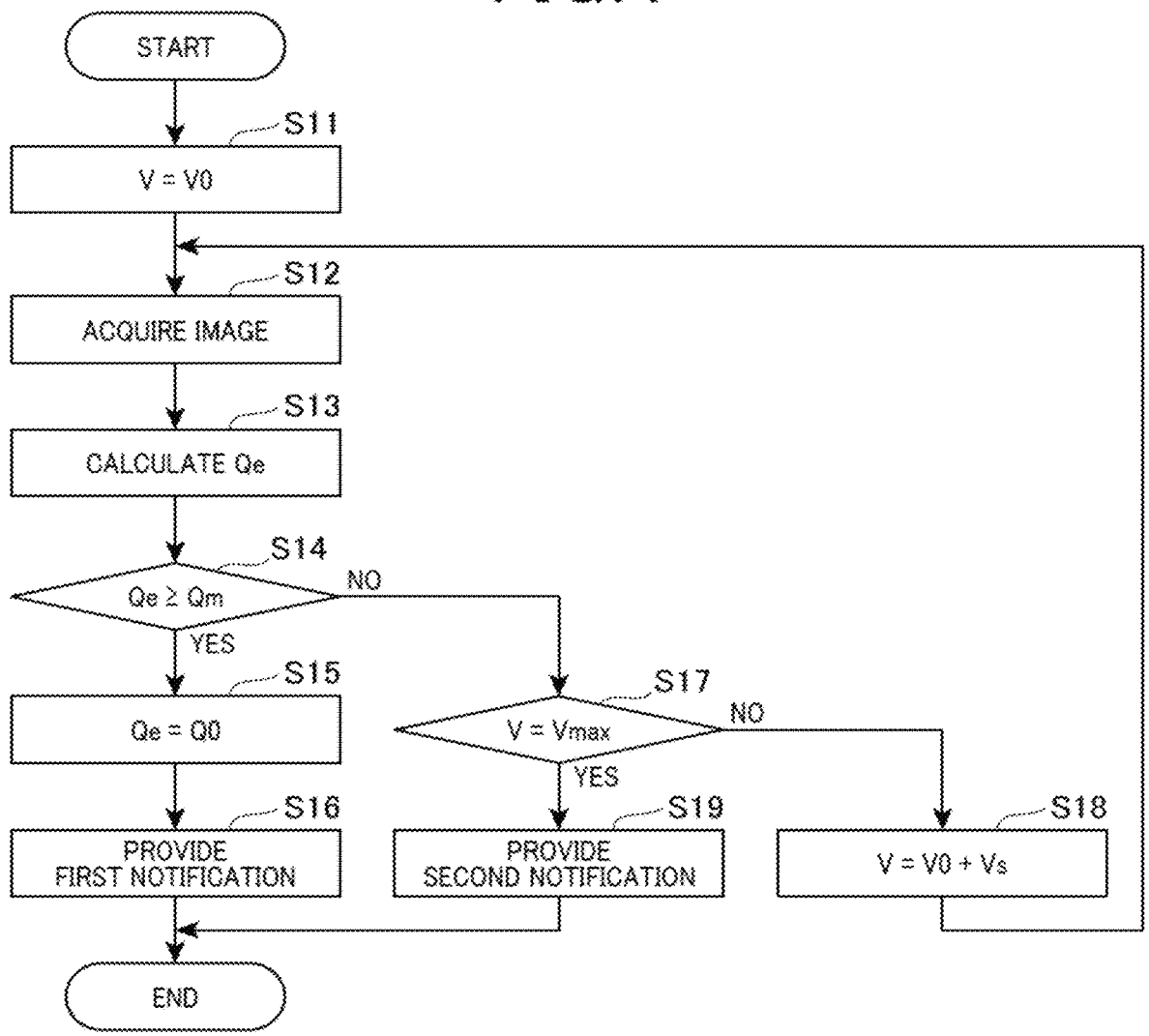
FIG. 4 is a flowchart illustrating processing in an evaluation index calculation method.

As shown in FIG. 4, the index calculation device 20 transmits first a drive command NS for generating an evaluation voltage V0 as a driving voltage V to the light control device 30. The light control device 30 generates an evaluation voltage V0 in response to the drive command NS, and applies the evaluation voltage V0 to the light control sheet 10 to make the light control sheet 10 opaque. Thus, the light control sheet 10 changes the optical state thereof to a state for calculating an evaluation index Qe (step S11).

It should be noted that the index calculation device 20 may be configured to separately store an evaluation voltage V0 for each evaluation item. For example, according to the evaluation item selected by the user, the index calculation device 20 may select an evaluation voltage V0 corresponding to the evaluation item selected. For example, a high haze not allowing visual recognition of the presence or absence of an object via the light control sheet 10, or a high haze not allowing visual recognition of the contour of an object via the light control sheet 10 may be selected by the user and adopted for the optical state as an evaluation item. The index calculation device 20 may read the evaluation voltage V0 corresponding to the evaluation item selected by the user, and transmit a drive command NS to the light control device 30 to use the evaluation voltage V0 as a driving voltage V.

Next, the imaging device 12 captures an evaluation image PE of the imaging target 13 via the light control sheet 10 to which the evaluation voltage V0 is applied. The index calculation device 20 acquires the evaluation image PE of the imaging target 13 captured via the light control sheet 10 from the imaging device 12 (step S12).

Next, the index calculation device 20 analyzes the evaluation image PE to calculate a degree of obscuring caused by the light control sheet 10 in the evaluation image PE, as an evaluation index Qe. The image analysis performed by the index calculation device 20 is to calculate a degree of obscuring caused by the light control sheet 10 in the evaluation image PE. The image analysis is performed, for example, in the order of grayscaling, two-dimensional fast Fourier transform, and frequency analysis as described above (step S13).

Next, the index calculation device 20 determines whether the calculated evaluation index Qe is not less than the index threshold Qm. In this case, the index threshold Qm is a lower limit of the evaluation index Qe obtained in advance via the light control sheet 10 having a suitable optical state. If an optical state not allowing visual recognition of the presence or absence of an object is selected as an evaluation item, the light control sheet 10 having a suitable optical state should have a high haze not allowing visual recognition of the presence or absence of an object via the light control sheet 10. If an optical state not allowing visual recognition of the contour of an object is selected as an evaluation item, the light control sheet 10 having a suitable optical state should have a high haze not allowing visual recognition of the contour of an object via the light control sheet 10 (step S14).

If the evaluation index Qe is determined to be not less than the index threshold Qm (YES at step S14), the index calculation device 20 stores the evaluation index Qe as a previous index Q0 (step S15). Then, the index calculation device 20 notifies the external notification device that the optical state of the light control sheet 10 at the evaluation voltage V0 is normal (normality determination: step S16). It should be noted that the index calculation device 20 can also make a deterioration determination in addition to the normality determination, or in place of the comparison between the evaluation index Qe and the index threshold Qm in the normality determination. The deterioration determination is processing in which a deviation between the evaluation index Qe calculated currently and the previous index Q0 is calculated, and the calculated deviation is determined as to whether it is in a predetermined normal range.

On the other hand, if the evaluation index Qe is determined to be less than the index threshold Qm (NO at step S14), the index calculation device 20 determines whether the currently calculated driving voltage V is the upper limit voltage Vmax (step S17). Next, if the currently calculated driving voltage V is determined not to be the upper limit voltage Vmax (NO at step S17), the index calculation device 20 transmits a drive command NS to the light control device 30 so that a new driving voltage V is generated with an addition of a step voltage Vs to the evaluation voltage V0.

The light control device 30 generates a new driving voltage V in response to the drive command NS, and applies the generated driving voltage to the light control sheet 10. Thus, the light transmittance of the light control sheet 10 is further reduced. Then, repeating the processing of steps S12 to S18, the index calculation device 20 acquires the driving voltage V when the evaluation index Qe becomes not less than the index threshold Qm (drive correction).

It should be noted that, in addition to or in place of the drive correction, the index calculation device 20 may notify the light control device 30 that deterioration has been recognized in the light control sheet 10, based on the evaluation index Qe being less than the evaluation threshold Qm (NO at step S14). In this case, the index calculation device 20 or the light control device 30 may store the notification as a log entry in order to use the state history of the light control sheet 10 for later analysis.

It should be noted that the index calculation device 20 notifies the light control device 30 of the driving voltage V when the evaluation index Qe is not less than the index threshold Qm. The light control device 30 stores the notified driving voltage V as a driving voltage V satisfying the evaluation item, and uses the stored driving voltage V in the driving for satisfying the evaluation item.

On the other hand, if the currently calculated driving voltage V is determined to be the upper limit voltage Vmax (YES at step S17), the index calculation device 20 notifies an external notification device of the abnormality of the optical state of the light control sheet 10 (abnormality determination: step S19).

Test Examples

Next, referring to FIGS. 5 to 27, a description will be given of test examples which show that the optical state of the light control sheet 10 can be evaluated by image analysis. The following description will be given taking an example in which a polymer network liquid crystal light control sheet driven as a normal type is used as the light control sheet 10.

Figure 5:
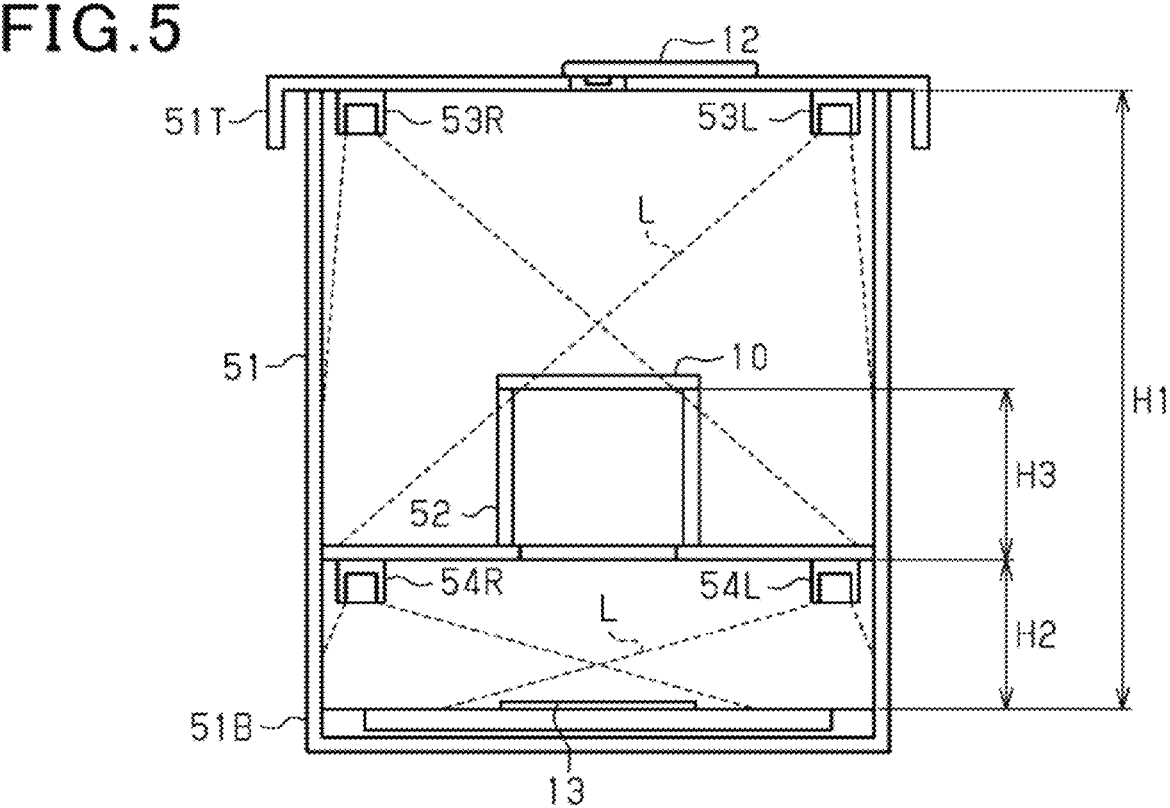
FIG. 5 is a device configuration diagram illustrating an imaging device for an evaluation image in Example Device 1.
Figure 6:
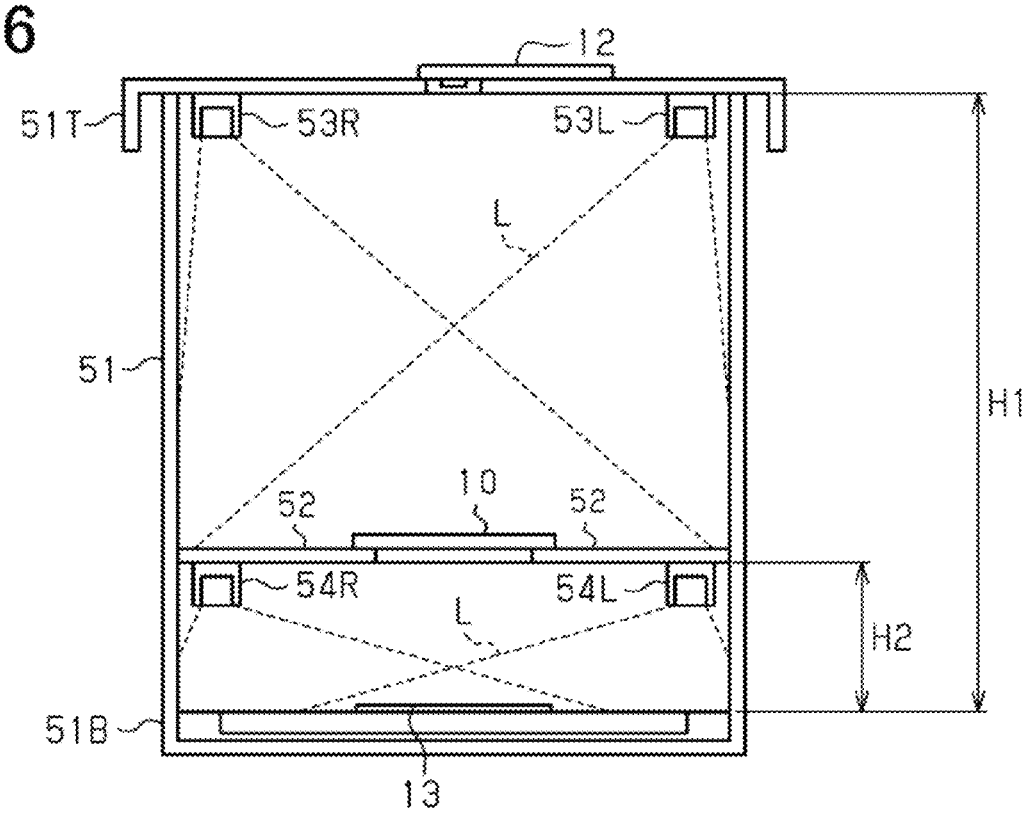
FIG. 6 is a device configuration diagram illustrating an imaging device for an evaluation image in Example Device 2.

First, a device for capturing an evaluation image PE will be described. FIGS. 5 and 6 show Example Devices 1 and 2 used for capturing images for Test Examples 1 to 4.

As shown in FIG. 5, a dark chamber 51 of Example Device 1 includes a bottom part 51B serving as a surface light source. The bottom part 51B of the dark chamber 51 is a LED table applying light to the top part of the dark chamber 51. The bottom part of the dark chamber 51 supports the imaging target 13 on the inside of the dark chamber 51. The imaging device 12 such as a smartphone is mounted to a top part 51T of the dark chamber 51 so that the interior of the dark chamber 51 can be imaged from directly above the imaging target 13. The inner surfaces of the dark chamber 51 have a black color to suppress external light from reaching the imaging device 12, and the occurrence of reflection at the imaging device 12.

In the interior of the dark chamber 51, a mounting part 52 for mounting the light control sheet 10 is provided between the imaging device 12 and the imaging target 13. The mounting part 52 includes a plate-shaped partition to define a space in which the imaging target 13 is placed from the remaining space, with a rectangular through hole formed in the partition at a position facing the imaging target 13. The mounting part 52 further includes a rectangular cylindrical mount extending toward the imaging device 12 from the through hole of the partition, so that the light control sheet 10 can be placed on the cylindrical mount. The imaging device 12 captures an image of the imaging target 13 through the light control sheet 10, the cylindrical mount, and the through hole of the partition.

The light control sheet 10, which is in a state of being bonded to a colorless transparent glass plate, is mounted to the mounting part 52. The light control sheet 10 has a rectangular sheet shape, with a short side thereof being 100 mm and a long side thereof being 112 mm. The glass plate to which the light control sheet 10 is bonded also has a rectangular plate shape, with a short side thereof being 105 mm and a long side thereof being 126 mm. The light control sheet 10 has a lowest transmittance when the driving voltage V is 0 V, and has a highest transmittance when the driving voltage V is the upper limit voltage Vmax.

The interior of the dark chamber 51 includes target LEDs 54R, 54L which apply light L to the imaging target 13. In the interior of the dark chamber 51, the target LEDs 54R, 54L apply light L to the entire bottom part 51B from the lower surface of the mounting part 52. The target LEDs 54R, 54L apply light of the same color as natural daylight. The illuminance of the target LEDs 54R, 54L for the imaging target 13 is 2,690 lx.

The interior of the dark chamber 51 includes sheet LEDs 53R, 53L which apply light L to the light control sheet 10. In the interior of the dark chamber 51, the sheet LEDs 53R, 53L apply light L to the entire mounting part 52 from the top part 51T of the dark chamber 51. The sheet LEDs 53R, 53L apply light of the same color as natural daylight. The illuminance of the sheet LEDs 53R, 53L for the light control sheet 10 is 532 lx.

There is a distance H1 of 350 mm between the imaging device 12 and the imaging target 13 in the vertical direction. There is a distance H2 of 100 mm between the imaging target 13 and the mounting part 52 in the vertical direction. There is a distance H3 of 100 mm in the mounting part 52 in the vertical direction. Specifically, the distance (=H2+H3) between the imaging target 13 and the light control sheet 10 in the vertical direction is 200 mm, and the distance between the light control sheet 10 and the imaging device 12 in the vertical direction is 150 mm.

As shown in FIG. 6, the dark chamber 51 of Example Device 2 has a configuration in which the cylindrical mount is omitted from the mounting part 52 in the dark chamber 51 of Example Device 1. The mounting part 52 of Example Device 2 includes a flat partition defining a space where the imaging target 13 is placed from the remaining space. In the partition, a rectangular through hole is formed at a position opposed to the imaging target 13. In the mounting part 52, the light control sheet 10 is placed on the partition. The imaging device 12 captures an image of the imaging target 13 through the light control sheet 10 and the through hole of the partition.

In Example Device 2, the illuminance of the sheet LEDs 53R, 53L for the light control sheet 10 is 1,632 lx. Furthermore, the illuminance of the target LEDs 54R, 54L for the imaging target 13 is 2,901 lx.

In Example Device 2, there is a distance H1 of 350 mm, as in Example Device 1, between the imaging device 12 and the imaging target 13 in the vertical direction. On the other hand, the distance (=H2) between the imaging target 13 and the light control sheet 10 in the vertical direction is 100 mm, and the distance between the light control sheet 10 and the imaging device 12 in the vertical direction is 200 mm.

Figure 7A:
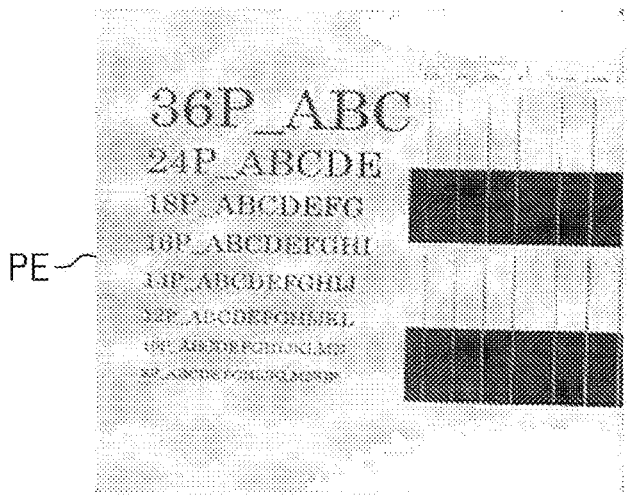
FIG. 7A shows Example Evaluation Image 1-1.
Figure 8A:
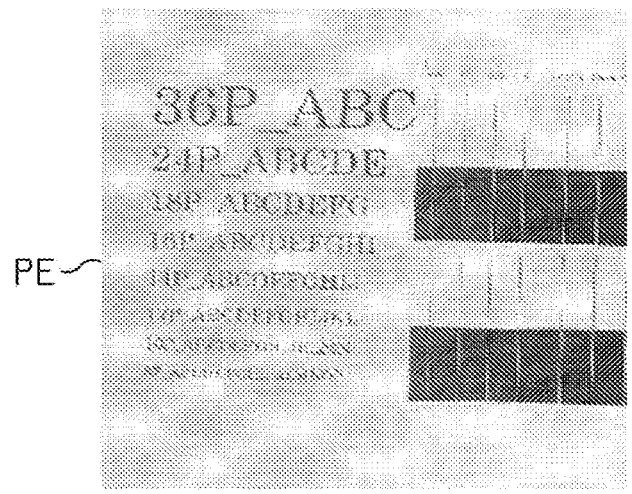
FIG. 8A shows Example Evaluation Image 1-2.
Figure 9A:
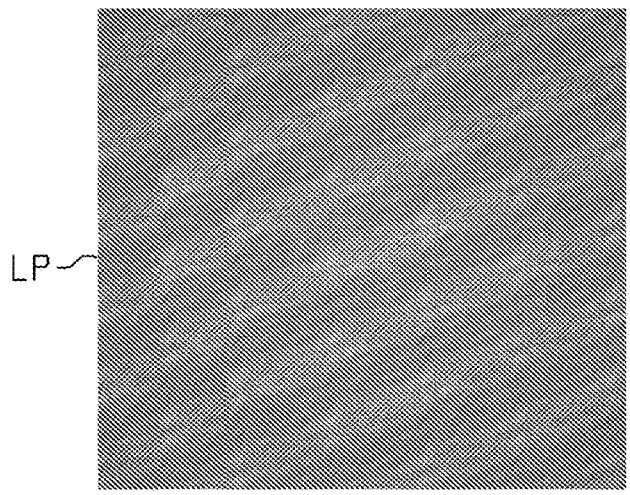
FIG. 9A shows Example Evaluation Image 1-3.

FIGS. 7A, 8A and 9A show Example Evaluation Images 1-1, 1-2, 1-3 of a test chart captured using Example Device 1 with the driving voltage V changed to 30 V, 20 V and 0 V.

Figure 7B:
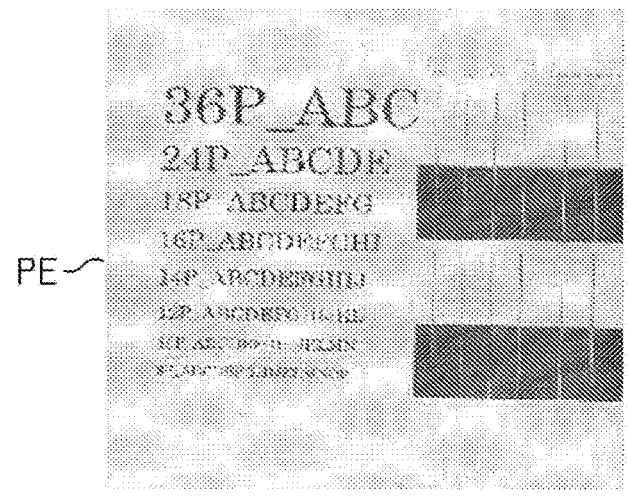
FIG. 7B shows Example Evaluation Image 2-1.
Figure 8B:
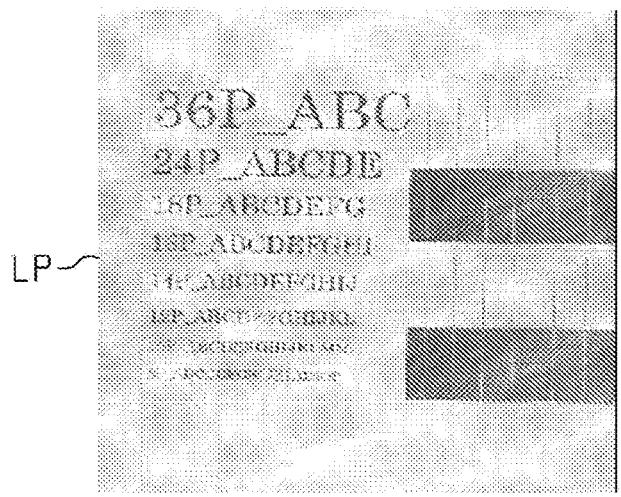
FIG. 8B shows Example Evaluation Image 2-2.
Figure 9B:
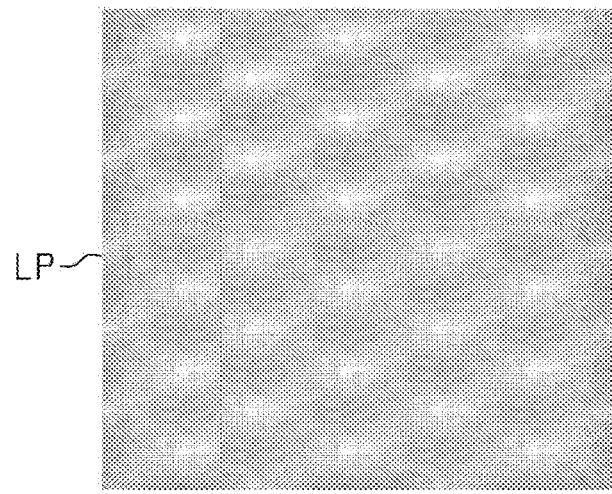
FIG. 9B shows Example Evaluation Image 2-3.

FIGS. 7B, 8B and 9B show Example Evaluation Images 2-1, 2-2, 2-3 of the test chart captured using Example Device 2 with the driving voltage V changed to 30 V, 20 V and 0 V.

It should be noted that Example Evaluation Images 1-1, 1-2, 1-3 and Example Evaluation Images 2-1, 2-2, 2-3 were all obtained through the following processing. Specifically, from among the images captured by the imaging device 12, the above images were each trimmed to a size of 600 cps×600 cps to define the portion imaged via the light control sheet 10, and then compressed to a size of 256 cps×256 cps.

As shown in FIGS. 7A, 8A and 9A, Example Evaluation Images 1-1, 1-2, 1-3 show that the opacity of the light control sheet 10 increases as the driving voltage V decreases. In FIGS. 7B, 8B and 9B, Example Evaluation Images 2-1, 2-2, 2-3 also show that the opacity of the light control sheet 10 increases as the driving voltage V decreases. From the comparison between Example Evaluation Images 1-1, 1-2, 1-3 and Example Evaluation Images 2-1, 2-2, 2-3, it can be said that the whiteness of the evaluation images PE increases as the illuminance on the light control sheet 10 increases.

Figure 10A:
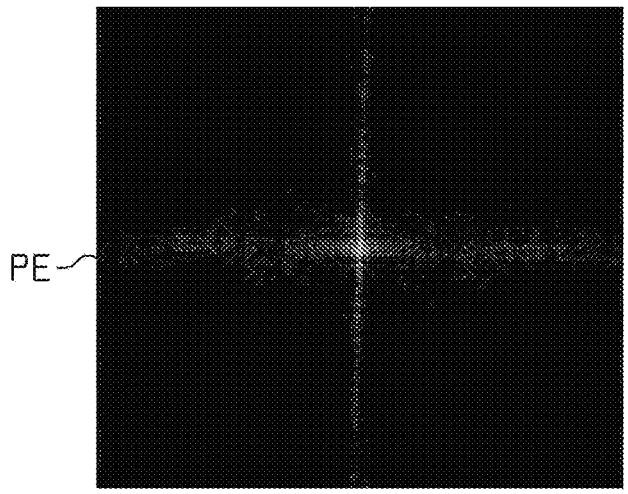
FIG. 10A shows an FFT image of Example Evaluation Image 1-1.
Figure 10B:
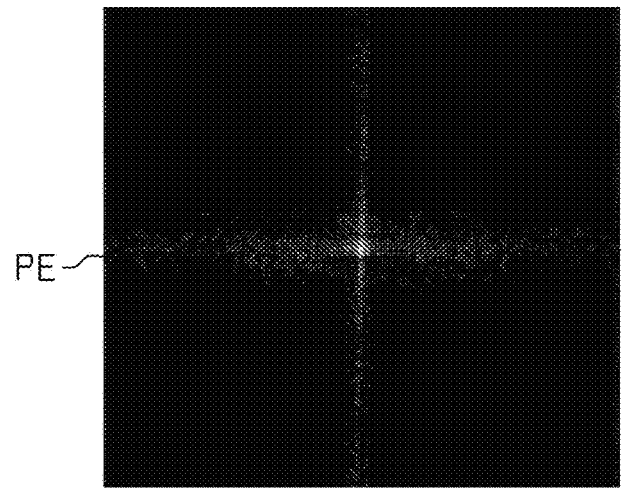
FIG. 10B shows an FFT image of Example Evaluation Image 2-1.
Figure 11A:
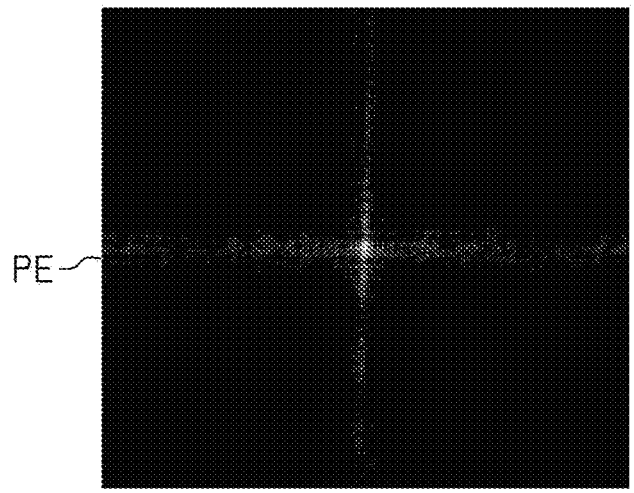
FIG. 11A shows an FFT image of Example Evaluation Image 1-2.
Figure 11B:
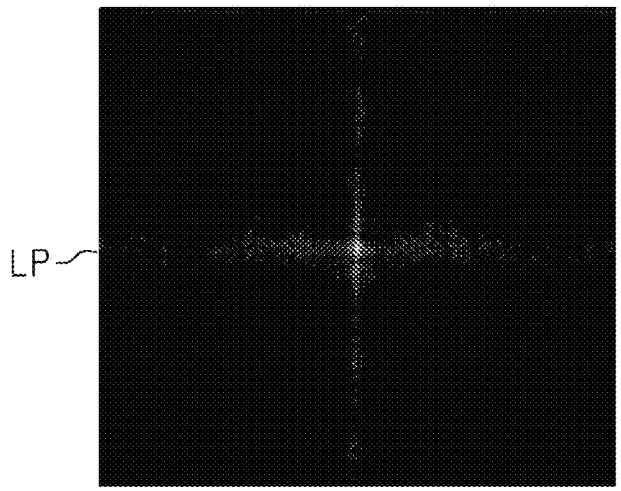
FIG. 11B shows an FFT image of Example Evaluation Image 2-2.
Figure 12A:
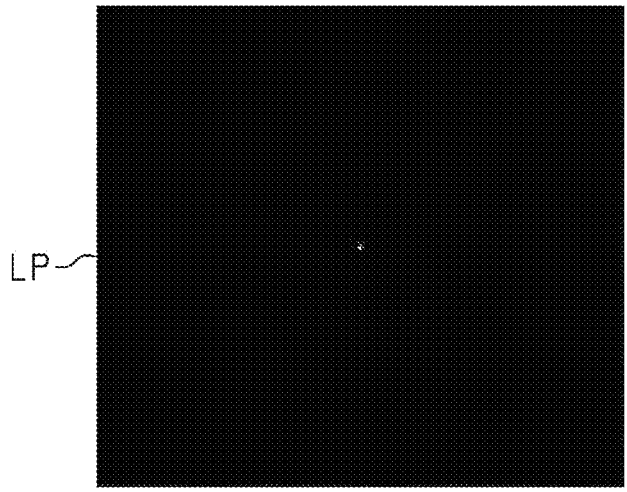
FIG. 12A shows an FFT image of Example Evaluation Image 1-3.
Figure 12B:
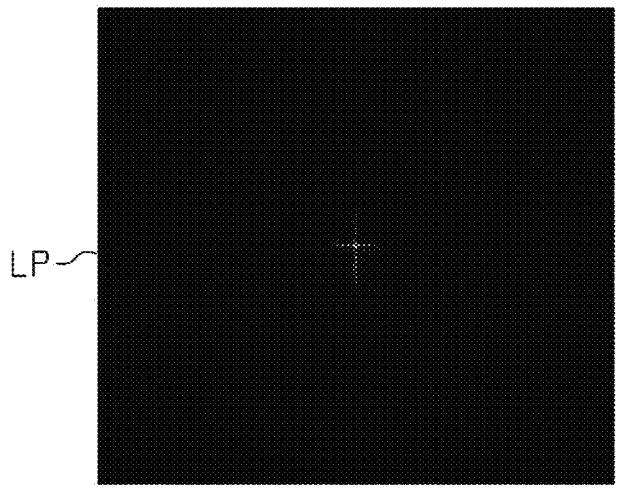
FIG. 12B shows an FFT image of Example Evaluation Image 2-3.

FIGS. 10A, 11A and 12A show FFT images LP which are two-dimensional Fourier transform images of Example Evaluation Images 1-1, 1-2, 1-3. FIGS. 10B, 11B and 12B show FFT images LP of Example Evaluation Images 2-1, 2-2, 2-3.

Figure 13A:
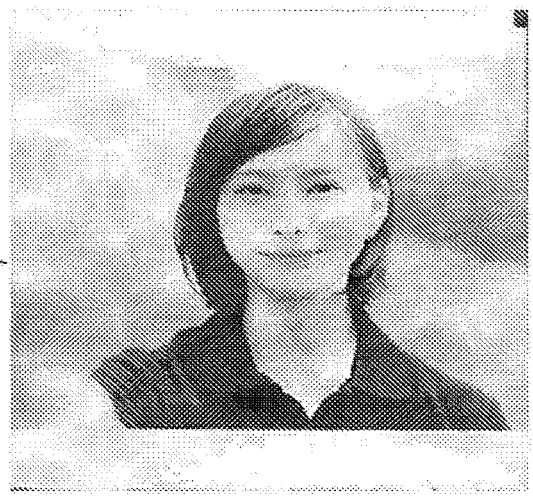
FIG. 13A shows Example Evaluation Image 3-1.
Figure 14A:
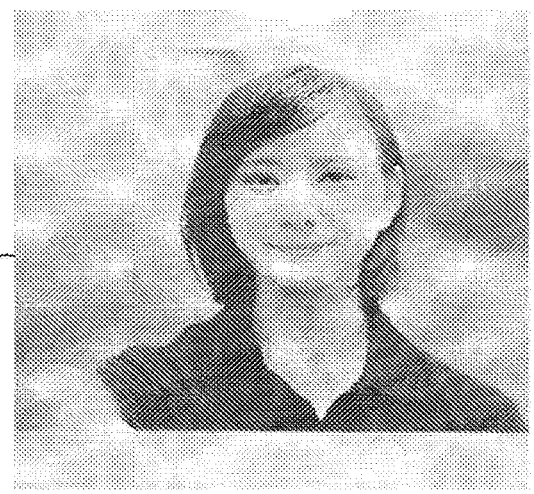
FIG. 14A shows Example Evaluation Image 3-2.
Figure 15A:
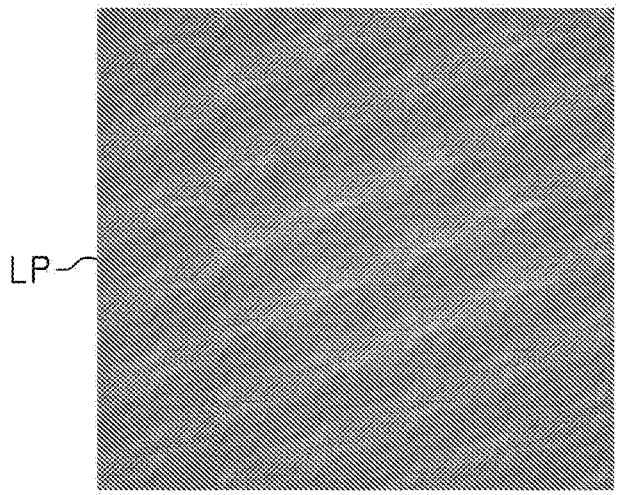
FIG. 15A shows Example Evaluation Image 3-3.

FIGS. 13A, 14A and 15A show Example Evaluation Images 3-1, 3-2, 3-3 of a person captured using Example Device 1 with the driving voltage V changed to 30 V, 20 V and 0 V.

Figure 13B:
FIG. 13B shows Example Evaluation Image 4-1.
Figure 14B:
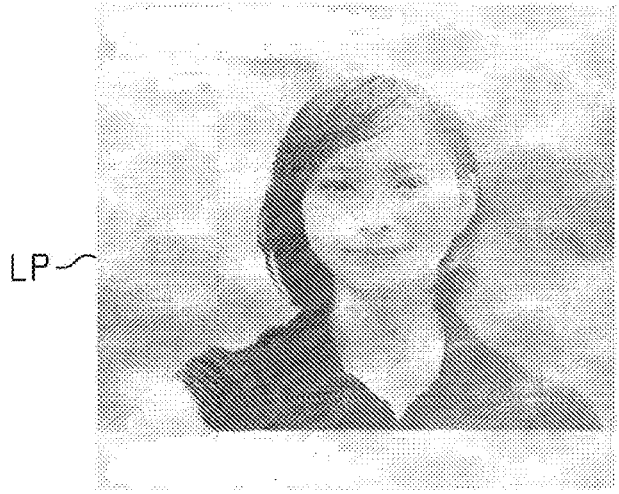
FIG. 14B shows Example Evaluation Image 4-2.
Figure 15B:
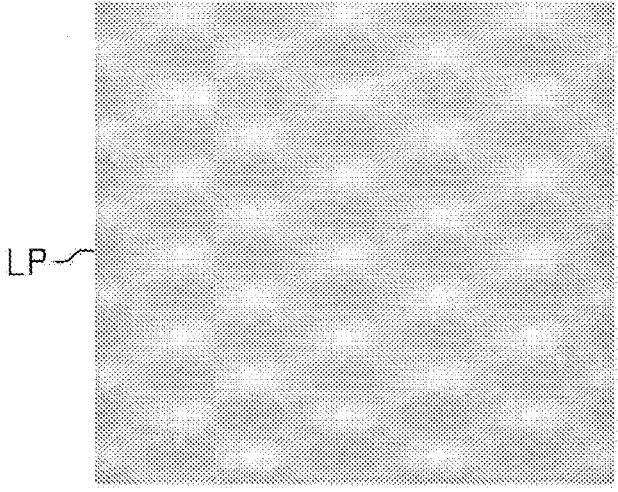
FIG. 15B shows Example Evaluation Image 4-3.

FIGS. 13B, 14B and 15B show Example Evaluation Images 4-1, 4-2, 4-3 of the person captured using Example Device 2 with the driving voltage V changed to 30 V, 20 V and 0 V.

It should be noted that Example Evaluation Images 3-1, 3-2, 3-3 and Example Evaluation Images 4-1, 4-2, 4-3 were all obtained through the following processing. Specifically, from among the images captured by the imaging device 12, the above images were each trimmed to a size of 600 cps×600 cps to define the portion imaged via the light control sheet 10, and then compressed to a size of 256 cps×256 cps.

As shown in FIGS. 13A, 14A and 15A, Example Evaluation Images 3-1, 3-2, 3-3 show that the opacity of the light control sheet 10 increases as the driving voltage V decreases. In FIGS. 13B, 14B and 15B, Example Evaluation Images 4-1, 4-2 4-3 also show that the opacity of the light control sheet 10 increases as the driving voltage V decreases. From the comparison between Example Evaluation Images 3-1, 3-2, 3-3 and Example Evaluation Images 4-1, 4-2, 4-3, it can be said that, in these evaluation images PE also, the whiteness of the evaluation images PE increases as the illuminance of the light control sheet 10 increases.

Figure 16A:
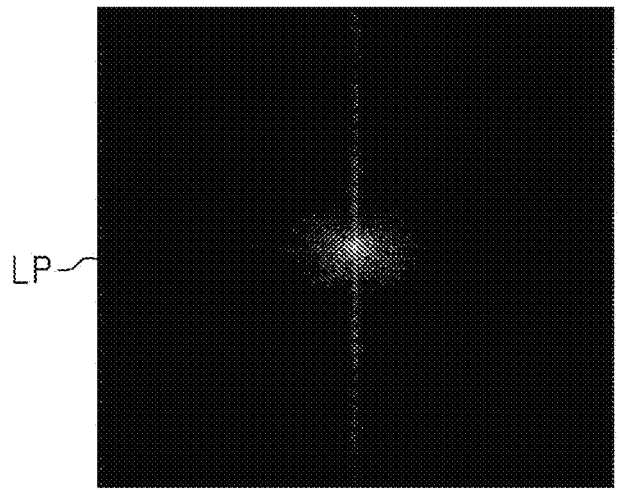
FIG. 16A shows an FFT image of Example Evaluation Image 3-1
Figure 16B:
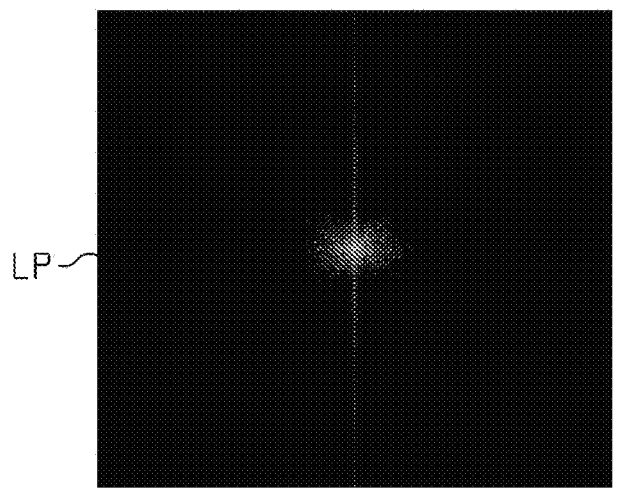
FIG. 16B shows an FFT image of Example Evaluation Image 4-1.
Figure 17A:
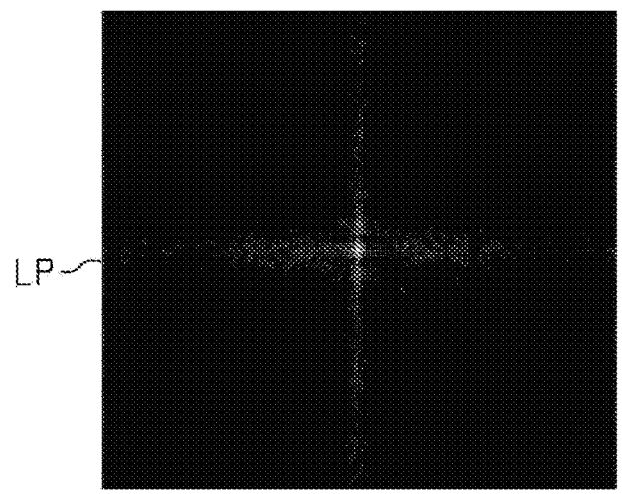
FIG. 17A shows an FFT image of Example Evaluation Image 3-2.
Figure 17B:
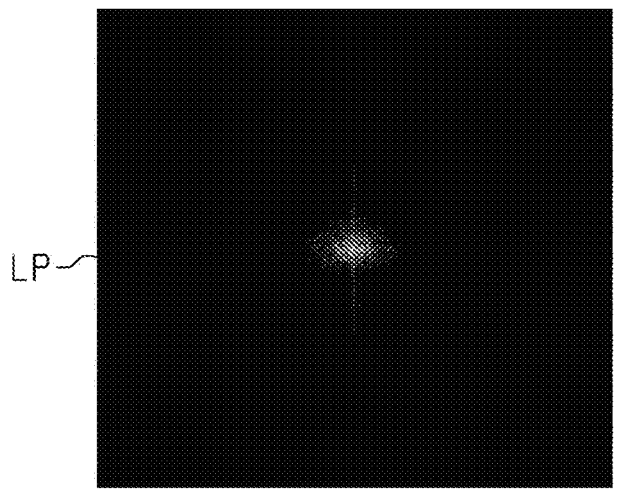
FIG. 17B shows an FFT image of Example Evaluation Image 4-2.
Figure 18A:
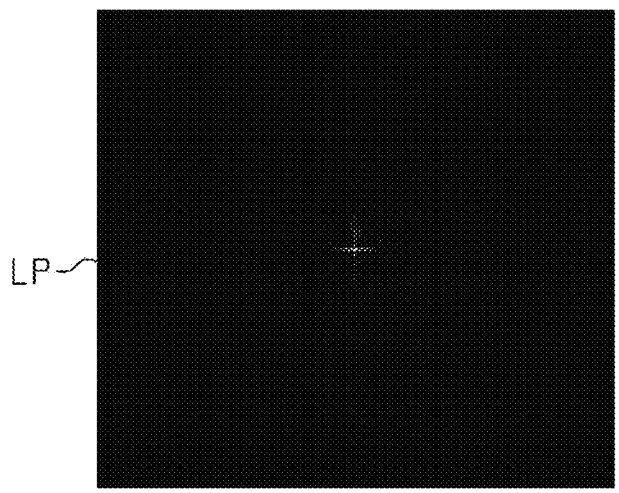
FIG. 18A shows an FFT image of Example Evaluation Image 3-3.
Figure 18B:
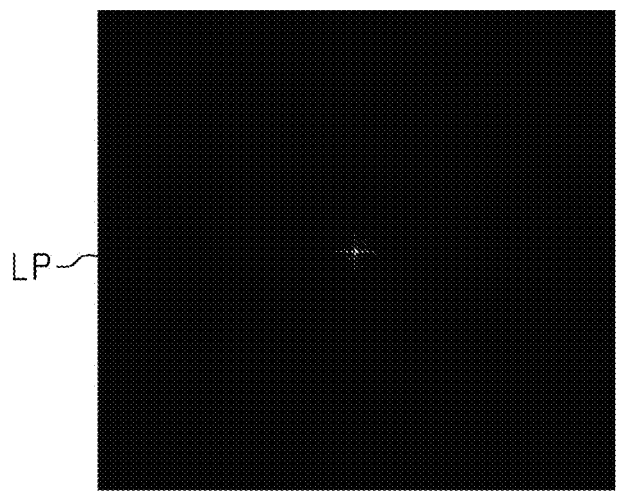
FIG. 18B shows an FFT image of Example Evaluation Image 4-3.

FIGS. 16A, 17A and 18A show FFT images LP of Example Evaluation Images 3-1, 3-2, 3-3. FIGS. 16B, 17B and 18B show FFT images LP of Example Evaluation Images 4-1, 4-2, 4-3.

Test Example 1

Figure 19:
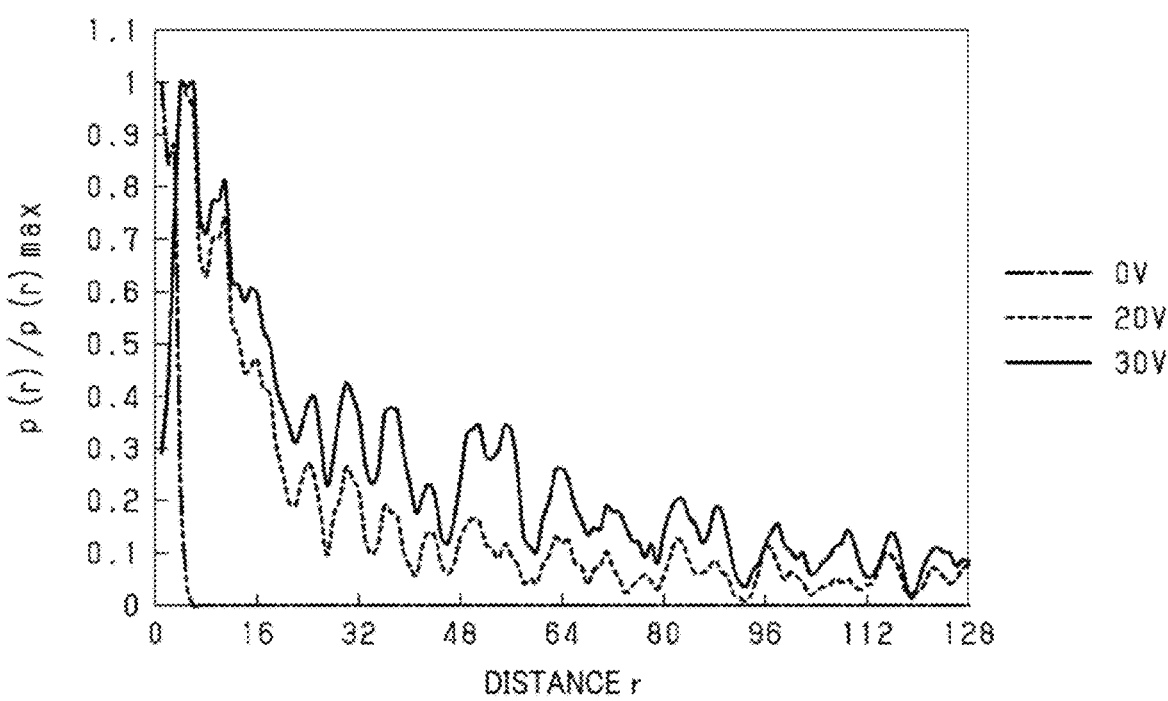
FIG. 19 is a graph showing the radial distribution of Test Example 1 obtained from the FFT images of Example Evaluation Images 1-1, 1-2, 1-3.
Figure 20:
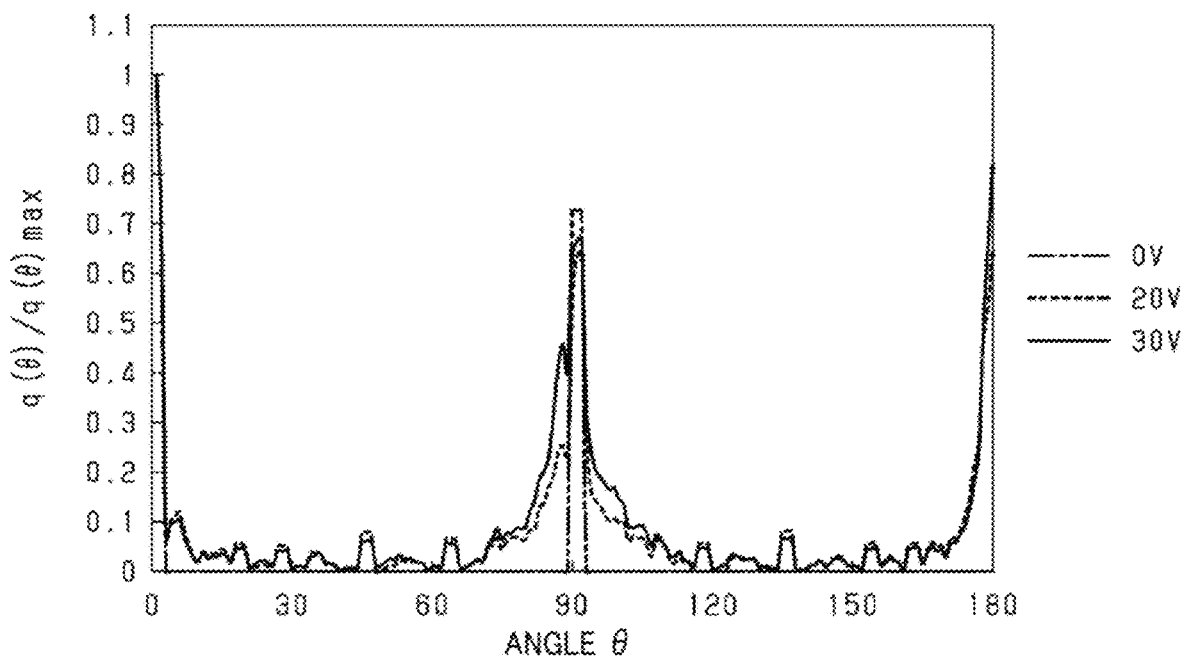
FIG. 20 is a graph showing the angular distribution of Test Example 1 obtained from the FFT images of Example Evaluation Images 1-1, 1-2, 1-3.

FIG. 19 is a graph showing the dependence of the radial distribution p(r) on the driving voltage V, i.e., showing the radial distribution p(r) of Test Example 1 obtained from the FFT images of Example Evaluation Images 1-1, 1-2, 1-3. In FIG. 19, values obtained by normalizing the radial distribution p(r) by the maximum value p(r)max are shown for each driving voltage V. FIG. 20 is a graph showing the dependence of the angular distribution q(θ) on the driving voltage V, i.e., showing the angular distribution q(θ) of Test Example 1 obtained from the FFT images of Example Evaluation Images 1-1, 1-2, 1-3. In FIG. 20, values obtained by normalizing the angular distribution q(θ) by a maximum value q(θ)max are also shown for each driving voltage V.

It should be noted that, for the FFT images, processing according to ITU-R Rec BT.601 standard was used as (i) grayscaling, and using the grayscaled image data, (ii) two-dimensional fast Fourier transform and (iii) frequency analysis were sequentially performed.

As shown in FIG. 19, in the results of frequency analysis of Test Example 1, a relatively large radial distribution p(r)

is present in a relatively small range in which the distance r is 16 or less. On the other hand, in a relatively large range in which the distance r exceeds 16, a relatively small radial distribution p (r) is present.

The radial distribution p(r) is reduced as the driving voltage V is sequentially reduced from 30 V, 20 V to 0 V. The degree of reducing the radial distribution p(r) is small in the range in which the distance r is relatively small, and large in the range in which the distance r is relatively large. Thus, the radial distribution p(r) is less likely to change due to the difference in the driving voltage V, in the range in which the distance r is relatively small, i.e., in the relatively low spatial frequency range in real space. On the other hand, the radial distribution p(r) greatly changes due to the difference in the driving voltage V, in the range in which the distance r is relatively large, i.e., in the relatively high spatial frequency range in real space.

The high spatial frequency range in real space shows fine gradation in a grayscaled image, e.g., shows the surface profile or contour of an object. On the other hand, the low spatial frequency range in real space shows coarse gradation in a grayscaled image, e.g., shows the presence or absence of an object. As described above, a difference in radial distribution p(r) due to the difference in the driving voltage V represents the difference in spatial frequency in real space. For example, a difference in radial distribution p(r) due to the difference in the driving voltage V represents the difference between fine gradation such as the surface profile or contour of an object, and coarse gradation such as the presence or absence of an object.

Consequently, for example, it can be said that, for the light control sheet 10 with a predetermined driving voltage V applied thereto, a difference in radial distribution p(r) can represent the difference between an optical state not allowing visual recognition of the surface profile, contour, or the like of an object, and an optical state allowing visual recognition of the surface profile, contour, or the like of an object. For example, it can be said that, for the light control sheet 10 with a predetermined driving voltage V applied thereto, a difference in radial distribution p(r) can represent the difference between an optical state not allowing visual recognition of the presence or absence, or the like of an object, and an optical state allowing visual recognition of the presence or absence, or the like of an object.

In other words, it can be said that the driving voltage V that makes the light control sheet 10 opaque so as not to allow visual recognition of the surface profile, contour, or the like of an object, or the driving voltage V that makes the light control sheet 10 transparent so as to allow visual recognition of the surface profile, contour, or the like of an object can be specified based on the fact that the sum of values of the radial distribution p(r) is a predetermined value. Furthermore, it can be said that the driving voltage V that makes the light control sheet 10 opaque so as not to allow visual recognition of the presence or absence, or the like of an object, or the driving voltage V that makes the light control sheet 10 transparent so as to allow visual recognition of the presence or absence, or the like of an object can be specified based on the fact that the sum of values of the radial distribution p(r) is a predetermined value.

As shown in FIG. 20, in the results of frequency analysis of Test Example 1, a relatively large angular distribution q(θ) of the respective driving voltages V is present in the angle θ range of 60° or more and 120° or less. The integrated value of the angular distribution q(θ) in the angle θ range of 60° or more and 120° or less decreases as the driving voltage V sequentially decreases from 30 V, 20 V to 0 V. Thus, in the angle θ range of 60° or more and 120° or less, the angular distribution q(θ) greatly changes due to the difference in the driving voltage V.

Consequently, it can be said that a difference in integrated value of angular distribution q(θ) can represent the difference between optical states having and not having a predetermined opacity. Furthermore, it can be said that the driving voltage V for bringing the light control sheet 10 into an optical state with a predetermined opacity can be specified based on the fact that the sum of values of the angular distribution q(θ) is a predetermined value.

Test Example 3

Figure 21:
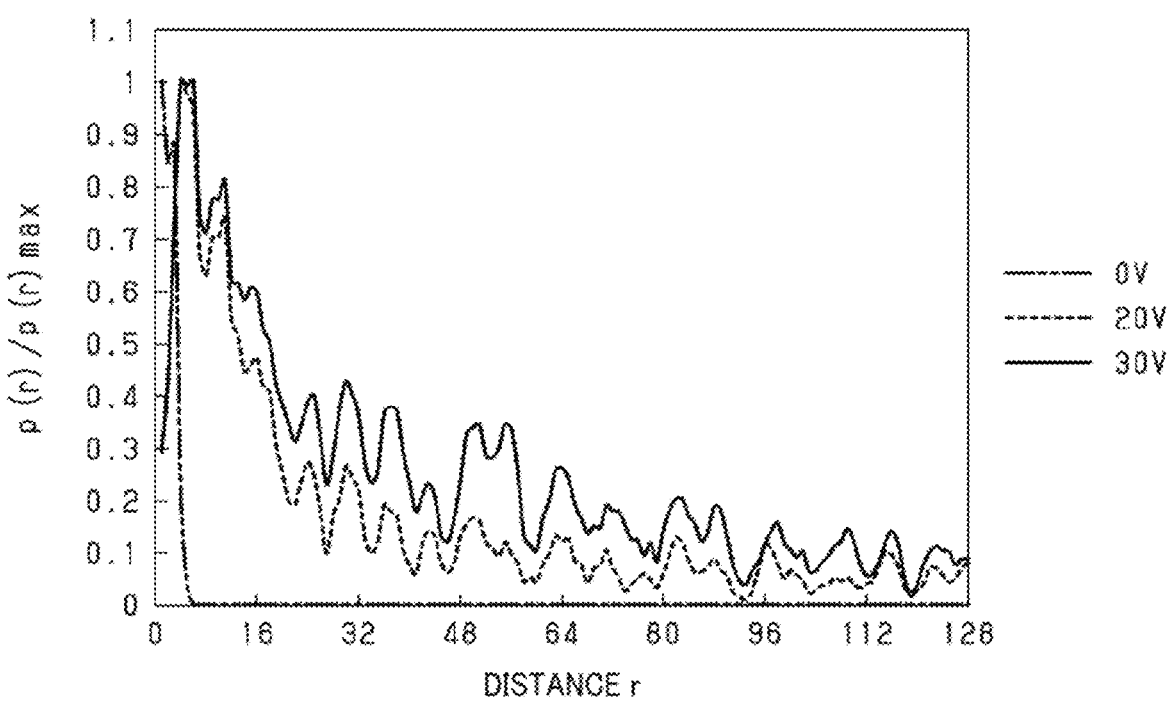
FIG. 21 is a graph showing the radial distribution of Test Example 3 obtained from the FFT images of Example Evaluation Images 3-1, 3-2, 3-3.
Figure 22:
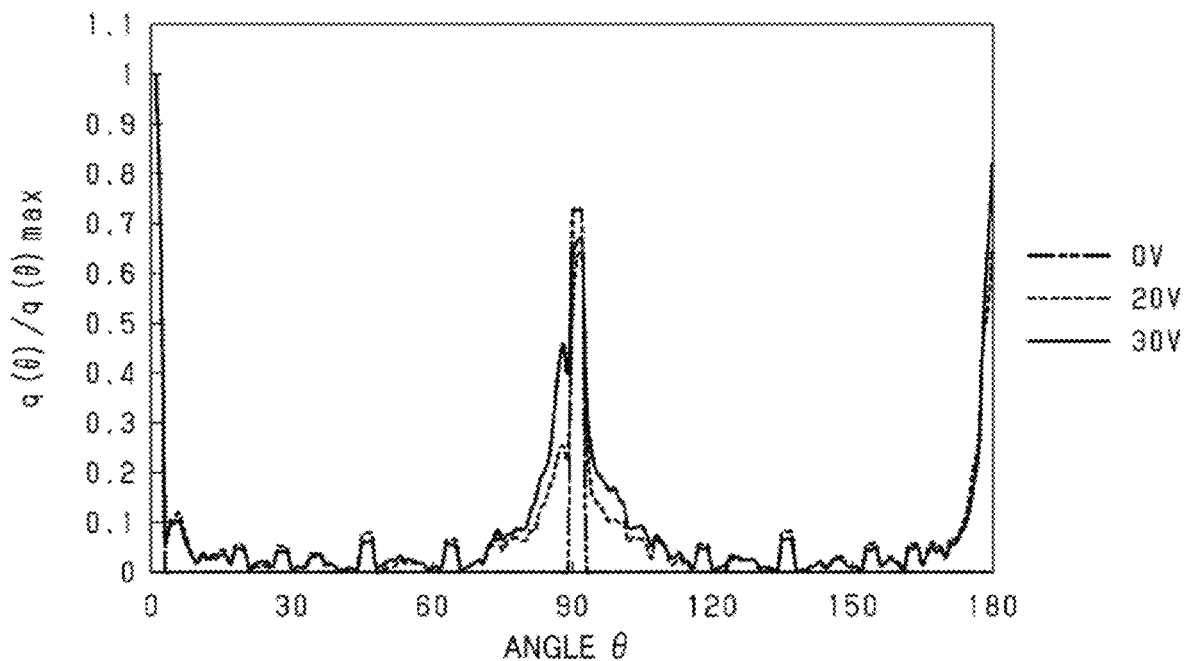
FIG. 22 is a graph showing the angular distribution of Test Example 3 obtained from the FFT images of Example Evaluation Images 3-1, 3-2, 3-3.

FIG. 21 is a graph showing the dependence of the radial distribution p(r) on the driving voltage V. FIG. 21 shows the radial distribution p(r) of Test Example 3 obtained from the FFT images of Example Evaluation Images 3-1, 3-2, 3-3 as in Test Example 1. FIG. 22 is a graph showing the dependence of the angular distribution q(θ) on the driving voltage V. FIG. 22 shows the angular distribution q(θ) of Test Example 3 obtained from the FFT images of Example Evaluation Images 3-1, 3-2, 3-3 as in Test Example 1.

For example, it can be said that, for the light control sheet 10 with a predetermined driving voltage V applied thereto, a difference in radial distribution p(r) can also represent the difference between optical states allowing and not allowing visual recognition of the surface profile, contour, or the like of an object in Example Test 3. Furthermore, it can be said that, for the light control sheet 10 with a predetermined driving voltage V applied thereto, a difference in radial distribution p(r) can represent the difference between optical states allowing and not allowing visual recognition of the presence or absence, or the like of an object.

Consequently, as shown in FIG. 22, it can be said that a difference in integrated value of the angular distribution q(θ) can also represent the difference between optical states having and not having a predetermined opacity in Text Example 3. Furthermore, it can be said that the driving voltage V for bringing the light control sheet 10 into an optical state with a predetermined opacity can be specified based on the fact that the sum of values of the angular distribution q(θ) is a predetermined value.

Test Example 2

Figure 23:
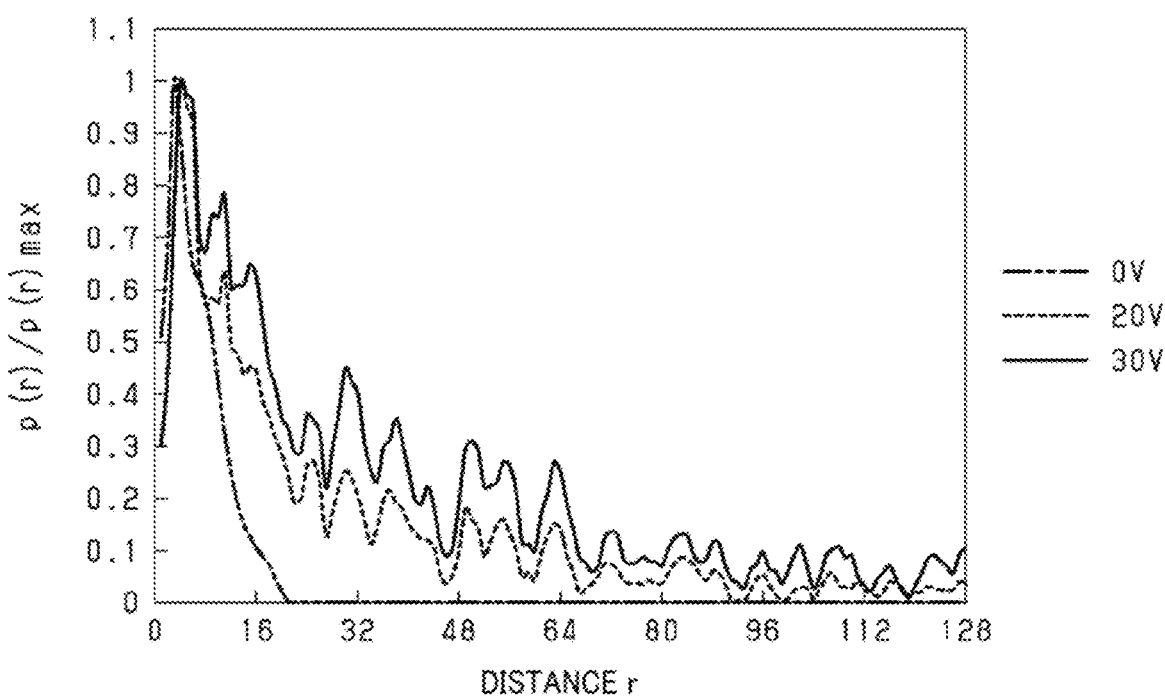
FIG. 23 is a graph showing the radial distribution of Test Example 2 obtained from the FFT images of Example Evaluation Images 2-1, 2-2, 2-3.
Figure 24:
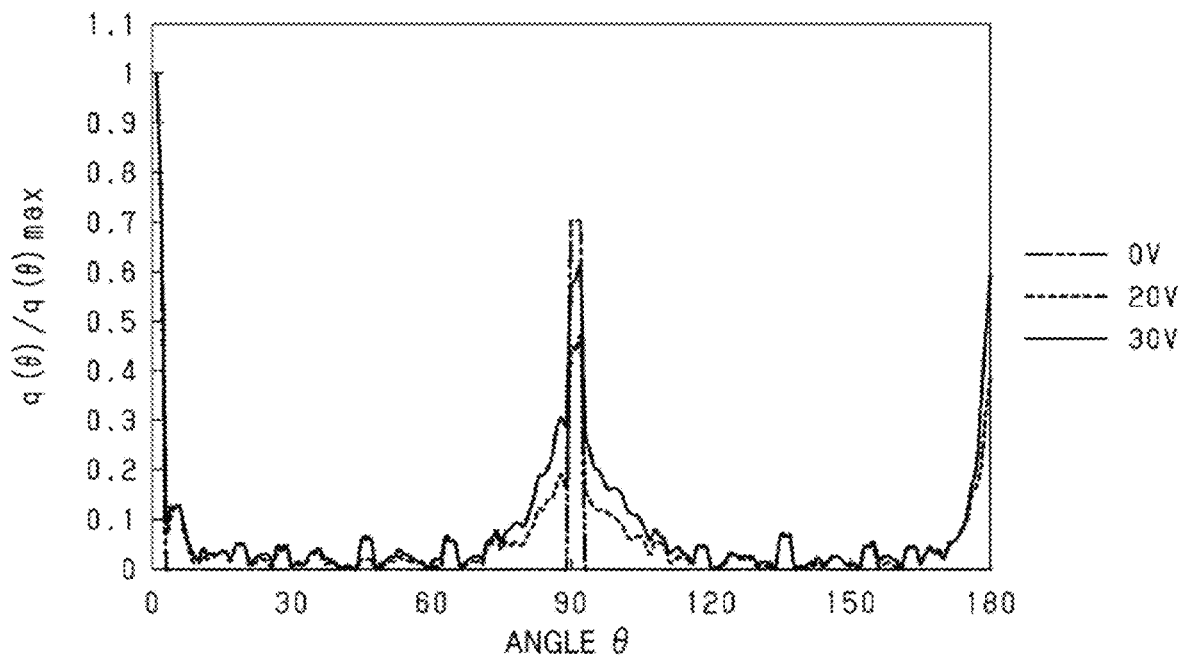
FIG. 24 is a graph showing the angular distribution of Test Example 2 obtained from the FFT images of Example Evaluation Images 2-1, 2-2, 2-3.

FIG. 23 is a graph showing the dependence of the radial distribution p(r) on the driving voltage V. FIG. 23 shows the radial distribution p(r) of Test Example 2 obtained from the FFT images of Example Evaluation Images 2-1, 2-2, 2-3 as in Test Example 1. FIG. 24 is a graph showing the dependence of the angular distribution q(θ) on the driving voltage V. FIG. 24 shows the angular distribution q(θ) of Test Example 2 obtained from the FFT images of Example Evaluation Images 2-1, 2-2, 2-3 as in Test Example 1.

As shown in FIG. 23, it can be said that, for the light control sheet 10 with a predetermined driving voltage V applied thereto, a difference in radial distribution p(r) can also represent the difference between optical states allowing and not allowing visual recognition of the surface profile, contour, or the like of an object in Test Example 2. Furthermore, it can be said that, for the light control sheet 10 with a predetermined driving voltage V applied thereto, a difference in radial distribution p(r) can represent the difference between optical states allowing and not allowing visual recognition of the presence or absence, or the like of an object.

As shown in FIG. 24, it can be said that a difference in integrated value of the angular distribution $q(\theta)$ can also represent the difference between optical states having and not having a predetermined opacity in Text Example 2. Furthermore, it can be said that the driving voltage V for bringing the light control sheet 10 into an optical state with a predetermined opacity can be specified based on the fact that the sum of values of the angular distribution $q(\theta)$ is a predetermined value.

Test Example 4

Figure 25:
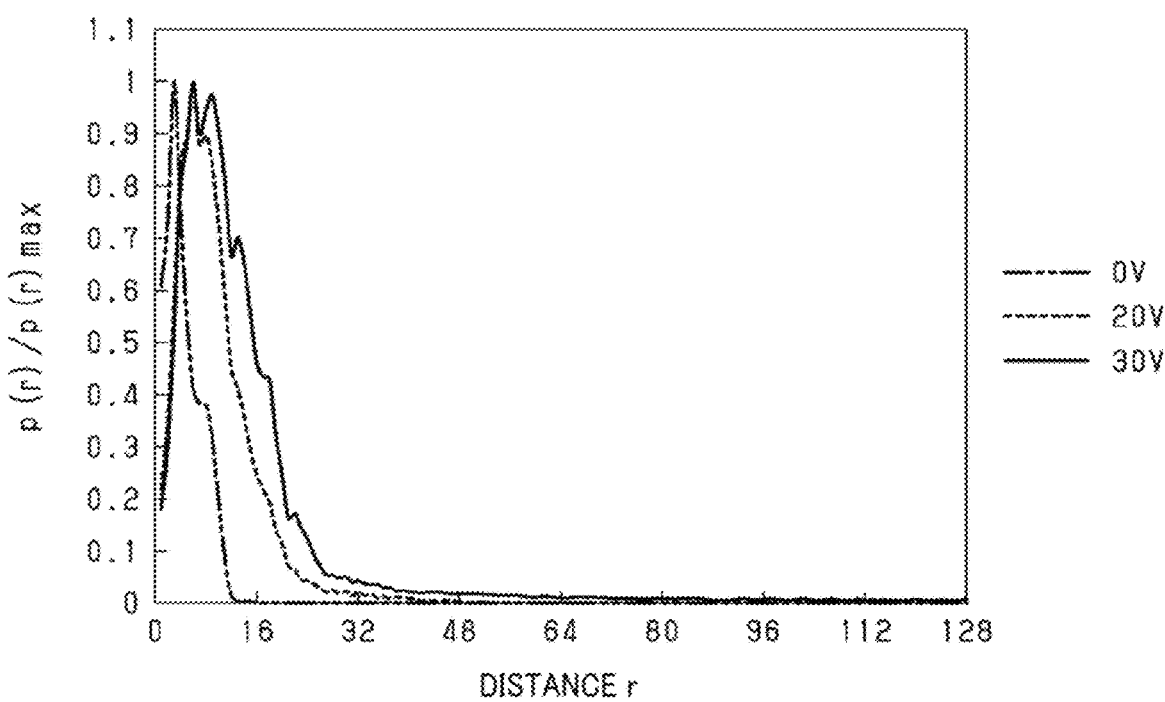
FIG. 25 is a graph showing the radial distribution of Test Example 4 obtained from the FFT images of Example Evaluation Images 4-1, 4-2, 4-3.
Figure 26:
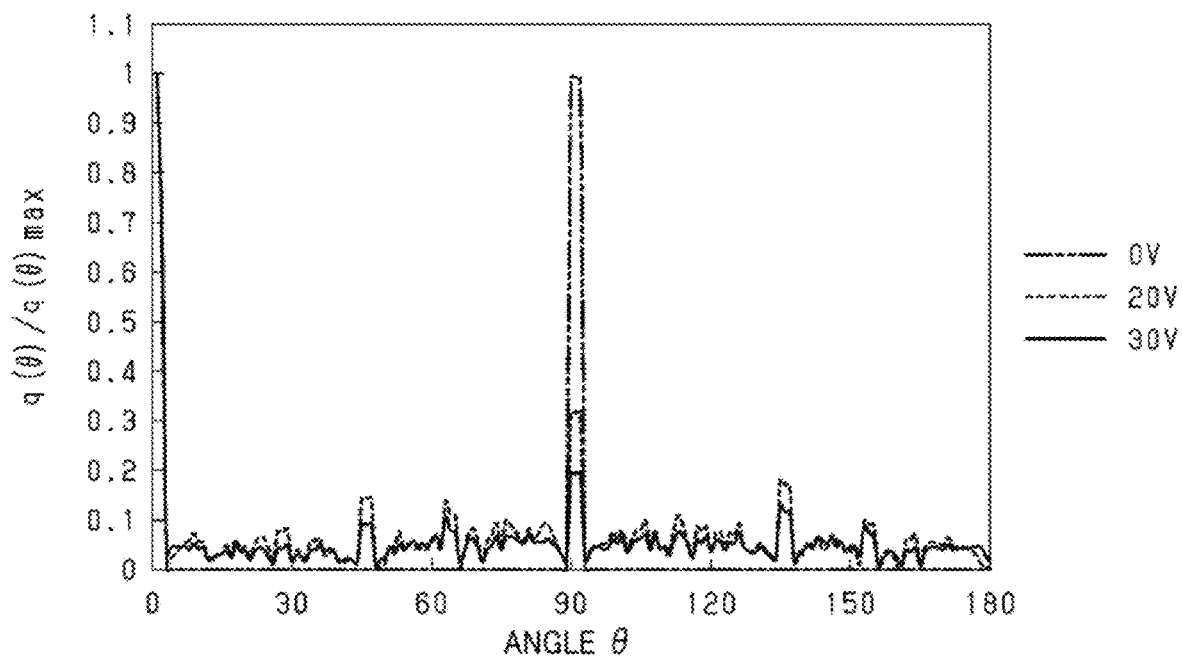
FIG. 26 is a graph showing the angular distribution of Test Example 4 obtained from the FFT images of Example Evaluation Images 4-1, 4-2, 4-3.

FIG. 25 is a graph showing the dependence of the radial distribution $p(r)$ on the driving voltage V. FIG. 25 shows the radial distribution $p(r)$ of Test Example 4 obtained from the FFT images of Example Evaluation Images 4-1, 4-2, 4-3 as in Test Example 1. FIG. 26 is a graph showing the dependence of the angular distribution $q(\theta)$ on the driving voltage V. FIG. 26 shows the angular distribution $q(\theta)$ of Test Example 4 obtained from the FFT images of Example Evaluation Images 4-1, 4-2, 4-3 as in Test Example 1.

As shown in FIG. 25, it can be said that, for the light control sheet 10 with a predetermined driving voltage V applied thereto, a difference in radial distribution $p(r)$ can also represent the difference between optical states allowing and not allowing visual recognition of the surface profile, contour, or the like of an object in Test Example 4. Furthermore, it can be said that, for the light control sheet 10 with a predetermined driving voltage V applied thereto, a difference in radial distribution $p(r)$ can represent the difference between optical states allowing and not allowing visual recognition of the presence or absence, or the like of an object.

It can be said that a difference in integrated value of the angular distribution $q(\theta)$ can also represent the difference between optical states having and not having a predetermined opacity in Text Example 4. Furthermore, it can be said that the driving voltage V for bringing the light control sheet 10 into an optical state with a predetermined opacity can be specified based on the fact that the sum of values of the angular distribution $q(\theta)$ is a predetermined value.

Haze and Evaluation Index Qe

Figure 27:
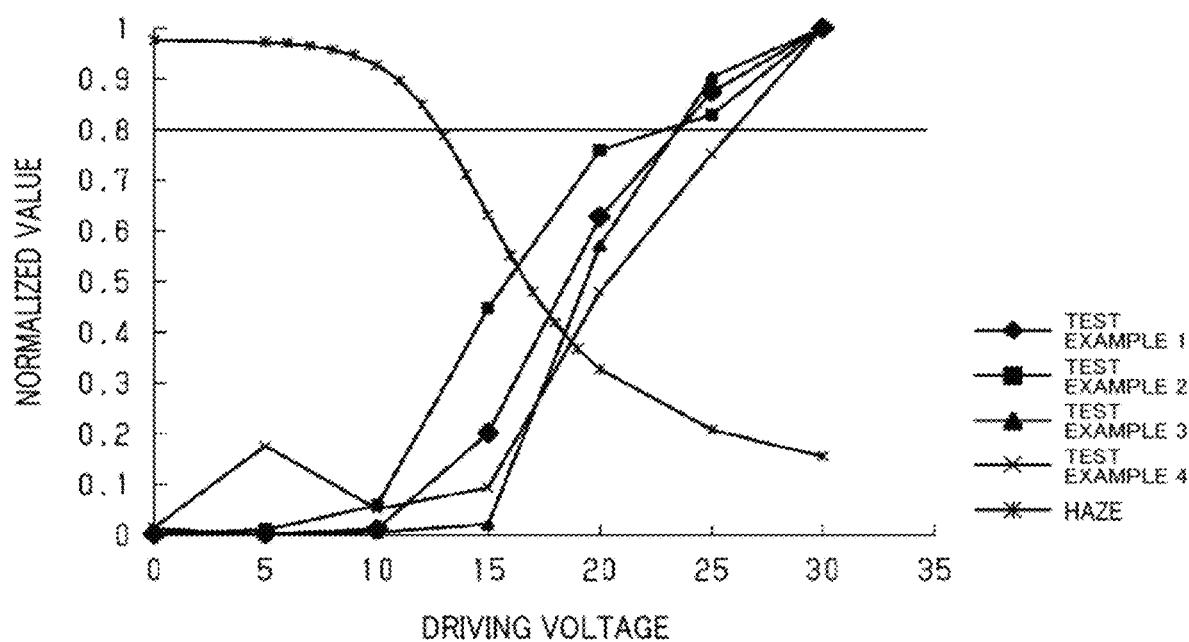
FIG. 27 is a graph showing a relationship between the driving voltage and the normalized value of a sample integrated value obtained from the radial distributions of the test examples, together with haze.

FIG. 27 shows the dependence of the evaluation indices Qe obtained from the radial distribution $p(r)$ of Test Examples 1 to 4 on the driving voltage V, and the dependence of the haze in the light control sheet 10 on the driving voltage V. It should be noted that, in FIG. 27, the sample integrated value SumV calculated at each driving voltage V is divided by a reference value to indicate an evaluation index Qe normalized by the reference value. In this case, the sample integrated value SumV when the driving voltage V is 30 V, i.e., the sample integrated value SumV when the light control sheet 10 has the highest light transmittance, was used as the reference value. Furthermore, in FIG. 27, haze in the light control sheet 10 shows values each normalized to 100% as 1.

As shown in FIG. 27, haze in the light control sheet 10 shows a substantially constant value close to 100% in the range where the driving voltage V is 0 V or more and 10 V or less. Furthermore, in the range where the driving voltage V is 0 V or more and 10 V or less, the evaluation indices Qe of Test Examples 1 to 4 also show substantially constant values of 0.2 or smaller.

In the range where the driving voltage V is 15 V or more and 20 V or less, haze in the light control sheet 10 rapidly decreases from 65% to 30%. Furthermore, in the range where the driving voltage V is 15 V or more and 20 V or less, the evaluation indices Qe of Test Examples 1 to 4 rapidly increase from 0.2 to 0.8.

In the range where the driving voltage V is 25 V or more and 30 V or less, haze in the light control sheet 10 gradually decreases from 20% to 10%. Furthermore, in the range where the driving voltage V is 25 V or more and 30 V or less, the evaluation indices Qe of Test Examples 1 to 4 gradually increase from 0.8 to 1.0.

Thus, in the entire range where the driving voltage V is 0 V or more and 30 V or less, the evaluation indices Qe change following the change in haze in the light control sheet 10. Furthermore, the evaluation indices Qe are maintained following the maintenance of haze in the light control sheet 10. Thus, the evaluation index Qe obtained through image analysis of the evaluation image PE can be said to represent the optical state of the light control sheet 10.

According to the first embodiment, the advantageous effects enumerated below can be achieved.

(1-1) The degree of obscuring caused by the light control sheet 10 in the evaluation image PE captured via the light control sheet 10 is calculated through image analysis of the evaluation image PE. Capturing an evaluation image PE is achieved not by a dedicated optical device such as an integrating sphere, but by a general-purpose imaging device such as a smartphone or tablet, and this leads to enhancing versatility of evaluating the optical state of the light control sheet 10.

(1-2) The degree of obscuring caused by the light control sheet 10 tends to be larger as haze in the light control sheet 10 increases, and thus easily changes in synchrony with the change in haze in the light control sheet 10. Therefore, with the above configuration for calculating the degree of obscuring of the evaluation image PE, the evaluation index representing the optical state of the light control sheet 10 can be diversified.

(1-3) Normality of the light control sheet 10 is determined using the index threshold Qm, which is the evaluation index Qe of the light control sheet 10 in a normal optical state, and the evaluation index Qe, which is calculated by the index calculation device 20. Accordingly, normality of the light control sheet 10 can be determined using an alternative evaluation index Qe.

(1-4) Sharpness of short-period repetition in the surface profile, contour, or the like of an object in the evaluation image PE is detected as the magnitudes of frequency components in a high frequency band. On the other hand, sharpness of long-period repetition in the presence or absence, or the like of an object in the evaluation image PE is detected as the magnitudes frequency components in a low frequency band. In this regard, with the configuration in which the evaluation index Qe is calculated through frequency analysis of the evaluation image PE, the optical state of the light control sheet 10 can be expressed precisely by the evaluation index Qe.

(1-5) A sample group for calculating an evaluation index Qe is extracted based on the sampling conditions which should satisfy the above Conditions 1 and 2. Specifically, a predetermined frequency band in which the sample threshold rx is larger than the extraction reference distance rs is extracted as a sample group for calculating an evaluation index Qe. Thus, for example, an evaluation index Qe tailored to the sharpness of the short-period repetition can also be provided.

It should be noted that, for example, an evaluation index in consideration of the sharpness of long-period repetition can also be provided if a predetermined frequency band, in which the sample threshold rx is not more than the extraction reference distance rs, is configured to be included in the sample group for calculating an evaluation index Qe.

(1-6) Since the evaluation index Qe is calculated from the sample integrated value SumV in the radial distribution p(r), an evaluation index Qe with a magnitude according to the optical state of the light control sheet 10 can be calculated whether the spatial frequency components may appear in a one-dimensional direction or in two-dimensional directions. Specifically, constraints related to spatial anisotropy are mitigated in the imaging target 13. Accordingly, application of the evaluation index calculation device 20 can be diversified into various fields, and further, versatility of the evaluation index calculation device 20 can be enhanced.

(1-7) The radial distribution p(r) with a relatively short distance r tends to show only the presence or absence of an object via the light control sheet 10, and thus tends to show the maximum energy. In this regard, as indicated by Conditions 1 and 2, since the evaluation index Qe is calculated using a band higher than the maximum value p(r)max as a sample group, evaluation can be made as to whether the light control sheet 10 provides fine visibility such as the contour of an object, rather than coarse visibility such as the presence or absence of an object.

(1-8) The sample integrated value SumV when the driving voltage V is 0 V is normalized by the sample integrated value SumV when the driving voltage V is 30 V, and the normalized value is calculated as an evaluation index value Qe. Therefore, based on the optical state of the light control sheet 10 with the driving voltage V applied thereto, the optical state of the light control sheet 10 with the driving voltage V not applied thereto can be evaluated. Therefore, the optical state of the light control sheet 10 can be evaluated, including evaluation on normality of the light control device 30.

The first embodiment can be modified and implemented as follows.

The evaluation index Qe is not limited to a value obtained by normalizing the sample integrated value SumV by a reference value, but may be, for example, the sample integrated value SumV itself. It should be noted that a first evaluation index Qe when the light control sheet 10 is transparent may be calculated, and a second evaluation index Qe may be normalized using the first evaluation index Qe as a reference value. With this configuration, the error due to the difference in illumination during imaging or due to the difference in the imaging target 13 can be mitigated in the evaluation index Qe. Thus, the degree of obscuring caused by the light control sheet 10 can be calculated with high accuracy.

The index calculation device 20 may be configured to omit the communication unit 24 but to include an output unit which outputs an evaluation index Qe calculated by the image analysis unit 22 using display or sound. In this case, processing from steps S14 to S18 such as the normality determination, abnormality determination, and drive correction using the evaluation index Qe may be performed using another device such as the light control device 30 which is configured to receive an input of the evaluation index Qe from an operation unit or the like.

Second Embodiment

A description will now be given of a second embodiment of an evaluation index calculation device, an evaluation index calculation method, and an evaluation index calculation program. It should be noted that the evaluation index calculation device of the second embodiment is a suitability determination device which determines whether the imaging target 13 is suitable, from the perspective of enhancing accuracy in evaluation of the light control sheet. Also, the evaluation index calculation method of the second embodiment is a suitability determination method which determines whether the imaging target 13 is suitable, from the perspective of enhancing the accuracy in evaluation of the light control sheet. Furthermore, the evaluation index calculation program of the second embodiment is a suitability determination program which determines whether the imaging target 13 is suitable, from the perspective of enhancing the accuracy in evaluation of the light control sheet.

The following description will focus mainly on the differences between the evaluation index calculation device described in the first embodiment and the evaluation index calculation device according to the second embodiment. The following description will focus mainly on the differences between the evaluation index calculation method described in the first embodiment and the evaluation index calculation method according to the second embodiment. The following description will focus mainly on the differences between the evaluation index calculation program described in the first embodiment and the evaluation index calculation program according to the second embodiment.

When the degree of obscuring of an evaluation image PE captured via the light control sheet 10 satisfying the evaluation items shows that the evaluation items are satisfied, the imaging target 13 that is the subject of the evaluation image PE is suitable for the optical state evaluation. Furthermore, when the degree of obscuring of an evaluation image PE captured via the light control sheet 10 not satisfying the evaluation items shows that the evaluation items are not satisfied, the imaging target 13 that is the subject of the evaluation image PE is suitable for optical state evaluation.

On the other hand, when the degree of obscuring of the evaluation image PE captured via the light control sheet 10 satisfying the evaluation items shows that the evaluation items cannot be satisfied, the imaging target 13 that is the subject of the evaluation image PE can reduce the accuracy of optical state evaluation. Alternatively, when the degree of obscuring of an evaluation image PE captured via the light control sheet 10 not satisfying the evaluation items shows that the evaluation items can be satisfied, the imaging target 13 that is the subject of the evaluation image PE can reduce the accuracy of optical state evaluation.

Referring back FIG. 1, during manufacture or installation, for example, the index calculation device 20 compares an evaluation index Qe calculated by the index calculation device 20 and an index threshold Qm. In this case, an imaging target 13 suitable for evaluating the optical state of the light control sheet 10 is imaged via the light control sheet 10 having the predetermined optical state, and an index threshold Qm is obtained from the evaluation image PE of the imaging target 13. The index threshold Qm may be obtained through simulation using an imaging target 13 suitable for optical state evaluation and using the predetermined optical state.

The index calculation device 20 makes a suitability determination based on the comparison between the evaluation index Qe and the index threshold Qm. In the suitability determination, the suitability of using the imaging target 13 for optical state evaluation of the light control sheet 10 is determined. For example, the index threshold Qm may be a suitability range obtained from the imaging target 13 suitable for optical state evaluation of the light control sheet 10. If the suitability range is specified by a lower limit, the evaluation index Qe being not less than the index threshold Qm indicates that the imaging target 13 is suitable for optical state evaluation of the light control sheet 10. Then, the index calculation device 20 outputs that using the imaging target 13 for optical state evaluation of the light control sheet 10 is suitable. Alternatively, the index threshold Qm may have a range for each suitability degree, and the index calculation device 20 may determine which of ranges of the index threshold Qm the evaluation index Qe belongs to. Then, the index calculation device 20 may output a suitability degree of the imaging target 13, based on the range to which the evaluation index Qe belongs.

The imaging target 13 is a target for which suitability is determined. The imaging target 13 is a target of imaging used for calculating an evaluation index Qe. The imaging target 13 may be an artificial object, or may be a natural landscape, or may be a test pattern. The artificial object may be a building visually recognized via the light control sheet 10, or may be a structure visually recognized via the light control sheet 10. The natural landscape is a natural landscape visually recognized via the light control sheet 10. The test pattern is printed matter prepared as a candidate for optical state evaluation of the light control sheet 10. The artificial object or the natural landscape is an example of a view which is seen from the place where the light control sheet 10 is installed.

The index calculation information 23B includes the index threshold Qm. The index threshold Qm is a threshold of the evaluation index Qe obtained in advance through the light control sheet 10 satisfying the evaluation items. The index threshold Qm is obtained in advance by capturing an image of an imaging target suitable for optical state evaluation. As described above, the index threshold Qm may be a single range or may include each of several ranges for each suitability degree considered to be suitable for evaluation.

The control unit 21 causes the communication unit 24 to acquire the evaluation image PE from the imaging device 12. The control unit 21 causes the image analysis unit 22 to perform image analysis using the evaluation image PE acquired by the communication unit 24. The control unit 21 causes the communication unit 24 to output the results of the image analysis performed by the image analysis unit 22 to the outside. The control unit 21, which is an example of the determination section, determines suitability of the imaging target 13 based on the comparison between the evaluation index Qe resulting from the image analysis and the index threshold Qm.

The communication unit 24 can execute, for example, transmission of a drive command NS required for calculating an evaluation index Qe to the light control device 30 in response to an instruction from the control unit 21, and transmission of the results of the suitability determination for the imaging target 13 to an output unit such as a display unit. Furthermore, the communication unit 24 may transmit the results of the suitability determination for the imaging target 13 to the user terminal in response to an instruction from the control unit 21.

The control unit 31 reads the driving program from the storage unit 32, and interprets the driving program to cause the drive unit 33 to generate the driving voltage V.

The control unit 31 causes the storage unit 32 to store the driving voltage V corrected when determining suitability. Upon receiving a drive command NS from the index calculation device 20 or upon receiving an input signal MC from an operation unit, the control unit 31 reads the corrected driving voltage V from the storage unit 32 and causes the drive unit 33 to generate the corrected driving voltage V. The drive unit 33 applies the generated corrected driving voltage V to the light control sheet 10 during calculation of the subsequent evaluation index Qe which is executed after the suitability determination.

Suitability Determination

Returning back to FIG. 4, a suitability determination method executed by the index calculation device 20 will be described. The following description will be given taking an example in which it is evaluated whether the light control sheet 10 has a high haze that does not allow visual recognition of an object via the light control sheet 10, using a reverse type liquid crystal light control sheet.

The index calculation device 20 transmits first a drive command NS for generating an evaluation voltage V0 as a driving voltage V to the light control device 30. The light control device 30 generates an evaluation voltage V0 in response to the drive command NS, and applies the evaluation voltage V0 to the light control sheet 10 to make it opaque. Thus, the light control sheet 10 changes into an optical state for determining suitability of the imaging target 13 (step S11).

Next, the imaging device 12 captures an evaluation image PE of the imaging target 13 via the light control sheet 10 to which the evaluation voltage V0 is being applied. The index calculation device 20 acquires the evaluation image PE of the imaging target 13 from the imaging device 12 (step S12).

Next, the index calculation device 20 executes image analysis of the evaluation image PE to calculate a degree of obscuring of the evaluation image PE as an evaluation index Qe. As a result of the image analysis executed by the index calculation device 20, a degree of obscuring caused by the light control sheet 10 in the evaluation image PE is calculated. The image analysis in the index calculation device 20 is performed, for example, in the order of grayscaling, two-dimensional fast Fourier transform, and frequency analysis (step S13).

Next, the index calculation device 20 reads the range of the evaluation index Qe corresponding to high haze, as an index threshold Qm. The index calculation device 20 determines whether the evaluation index Qe is not less than the index threshold Qm. Herein, the high haze is of a level not allowing visual recognition of an object via the light control sheet 10. Also, the index threshold Qm is a lower limit of the evaluation index Qe obtained from an image of the imaging target suitable for the evaluation. An image of the imaging target is captured in advance via the light control sheet 10 having high haze.

For example, if an optical state not allowing visual recognition of the presence or absence of an object is selected as an evaluation item, the light control sheet 10 having an optical state suitable for evaluation should have a high haze not allowing visual recognition of the presence or absence of an object via the light control sheet 10.

For example, if an optical state not allowing visual recognition of the contour of an object is selected as an evaluation item, the light control sheet 10 having an optical state suitable for evaluation should have a high haze not allowing visual recognition of the contour of an object via the light control sheet 10 (step S14).

If the evaluation index Qe is determined to be not less than the index threshold Qm (YES at step S14), the index calculation device 20 stores the evaluation index Qe as an initial index Q0 (step S15). Then, the index calculation device 20 provides an external notification that the imaging target 13 is suitable as a subject for calculating an evaluation index Qe, preceding the time-dependent optical state evaluation of the light control sheet 10 (suitability determination: step S16).

On the other hand, if the evaluation index Qe is determined to be less than the index threshold Qm (NO at step S14), the index calculation device 20 determines whether the currently calculated driving voltage V is the upper limit voltage Vmax (step S17). Next, if the currently calculated driving voltage V is determined not to be the upper limit voltage Vmax (NO at step S17), the index calculation device 20 transmits a drive command NS to the light control device 30 so that a new driving voltage V is generated with an addition of a step voltage Vs to the evaluation voltage V0.

The light control device 30 generates a new driving voltage V in response to the drive command NS, and applies the generated driving voltage to the light control sheet 10. Thus, the light transmittance of the light control sheet 10 is further reduced. Then, repeating the processing of steps S12 to S18, the index calculation device 20 acquires the driving voltage V when the evaluation index Qe becomes not less than the index threshold Qm.

It should be noted that the index calculation device 20 notifies the light control device 30 of the driving voltage V when the evaluation index Qe is not less than the index threshold Qm. The light control device 30 stores the notified driving voltage V as a driving voltage V for satisfying the evaluation item, i.e., as a driving voltage V at which the imaging target 13 can be used in the time-dependent optical state evaluation, and uses the stored driving voltage V in the time-dependent optical state evaluation executed thereafter.

On the other hand, if the currently calculated driving voltage V is determined to be the upper limit voltage Vmax (YES at step S17), the index calculation device 20 provides an external notification that the suitability degree of the imaging target 13 is low as a subject for which an evaluation index Qe is calculated, or that the imaging target 13 is not suitable as a subject for which an evaluation index Qe is calculated, preceding the time-dependent optical state evaluation of the light control sheet 10 (step S19).

It should be noted that if the evaluation index Qe is determined to be less than the index threshold Qm (NO at step S14) the index calculation device 20 may provide an external notification that the suitability degree of the imaging target 13 is low as a subject for which an evaluation index Qe is calculated, or that the imaging target 13 is not suitable as a subject for which an evaluation index Qe is calculated, without performing the processing of steps S17 and S18.

Test Examples

Next, referring to FIGS. 28 to 34, test examples showing suitability degree of the imaging target 13 will be described. The following description will be given taking an example in which a polymer network liquid crystal light control sheet driven as a normal type is used as the light control sheet 10, and Example Device 2 described in the first embodiment is used as the imaging device.

Figure 28:
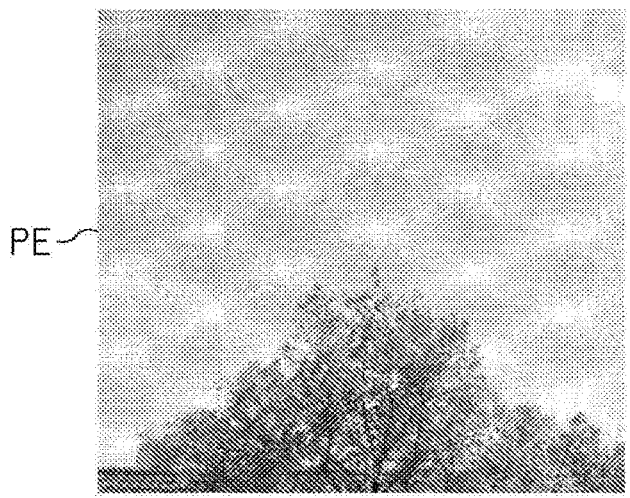
FIG. 28 shows an image of an imaging target of Test Example 2-1.

FIG. 28 is an evaluation image PE of Test Example 2-1, showing a natural landscape as the imaging target 13. As shown in FIG. 28, the substantially monochromatic sky occupies more than half the area of the evaluation image PE of Test Example 2-1, while one tree occupies the area other than the sky.

Figure 29:
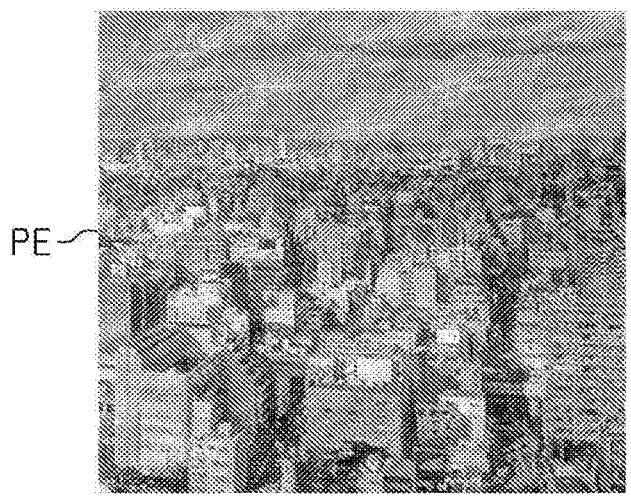
FIG. 29 shows an image of an imaging target of Test Example 2-2.

FIG. 29 is an evaluation image PE of Test Example 2-2, showing a natural landscape including buildings and the like as the imaging target 13. As shown in FIG. 29, the townscape with many large and small buildings occupies more than half the area of the evaluation image PE of Test Example 2-2, while the sky with clouds occupies the area other than the townscape.

Figure 30:
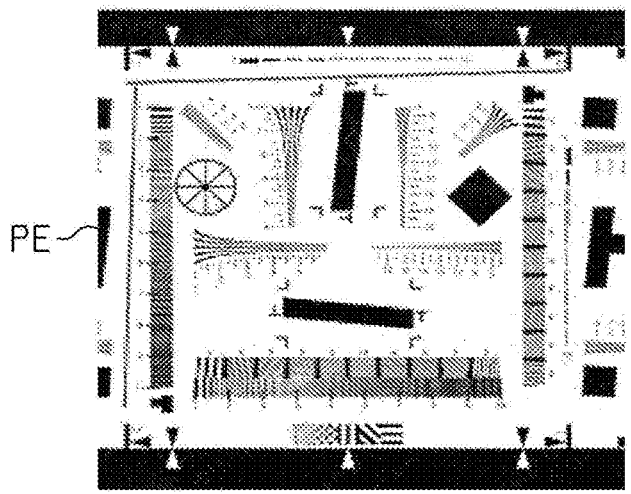
FIG. 30 shows an image of an imaging target of Test Example 2-3.

FIG. 30 is an evaluation image PE of Test Example 2-3, showing a test pattern as the imaging target 13. As shown in FIG. 30, the evaluation image PE of Test Example 2-3 includes a pattern in which thin white and black lines are alternated in parallel, patterns in which thin black lines are radially arranged, patterns in which thin white and black lines with different line widths are alternated in parallel, and patterns in which thin white and black lines with different densities are arranged.

It should be noted that all of the evaluation images PE of FIGS. 28 to 30 were captured with the driving voltage V set to 30 V. Also, the evaluation images PE were all obtained through the following processing. Specifically, from among the images captured by the imaging device 12, the above images were each trimmed to a size of 600 cps×600 cps to define the portion imaged via the light control sheet 10, and then compressed to a size of 256 cps×256 cps.

Figure 31:
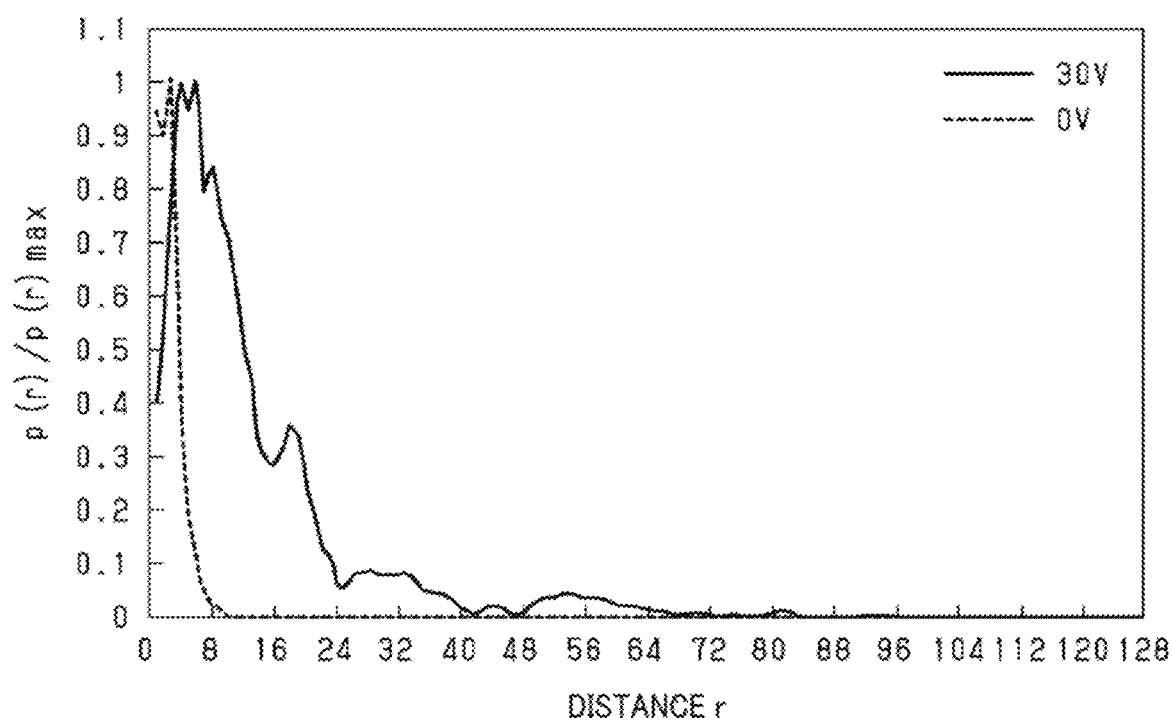
FIG. 31 is a graph showing the radial distribution obtained from the FFT image of Test Example 2-1.

FIG. 31 is a graph showing the dependence of the radial distribution p(r) on the driving voltage V, i.e., showing the radial distribution p(r) of Test Example 2-1 obtained from the FFT image of Example Evaluation Image 2-1.

Figure 32:
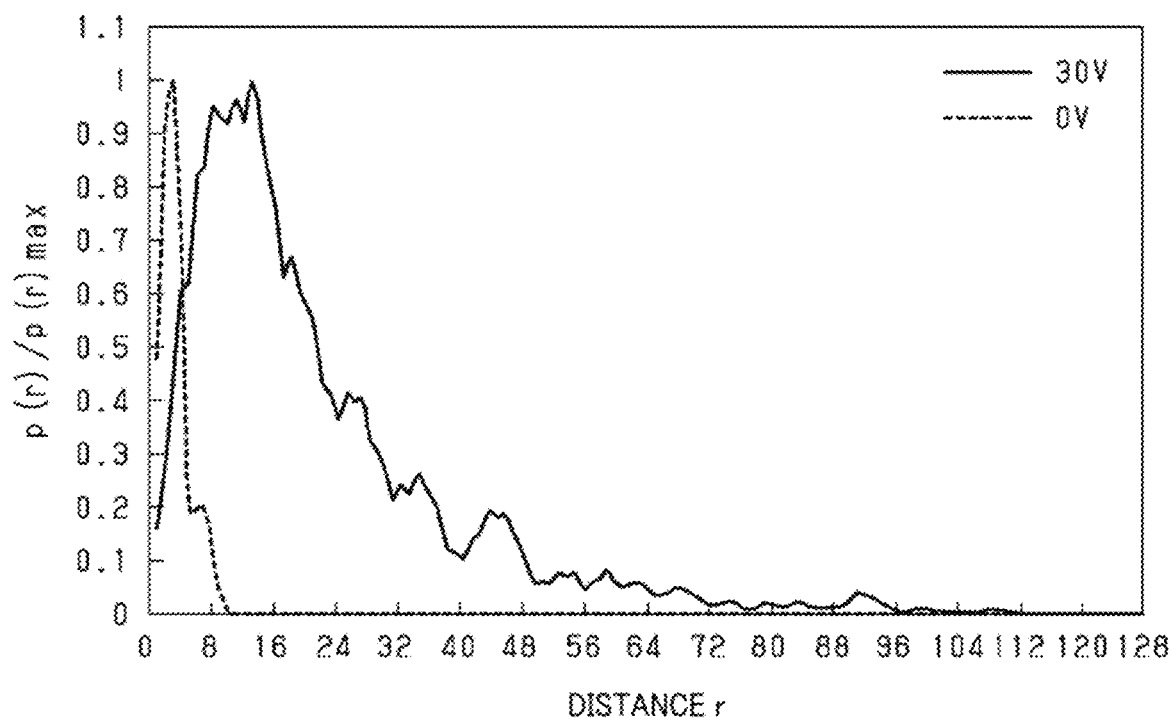
FIG. 32 is a graph showing the radial distribution obtained from the FFT image of Test Example 2-2.

FIG. 32 is a graph showing the dependence of the radial distribution p(r) on the driving voltage V, i.e., showing the radial distribution p(r) of Test Example 2-2 obtained from the FFT image of Example Evaluation Image 2-2.

Figure 33:
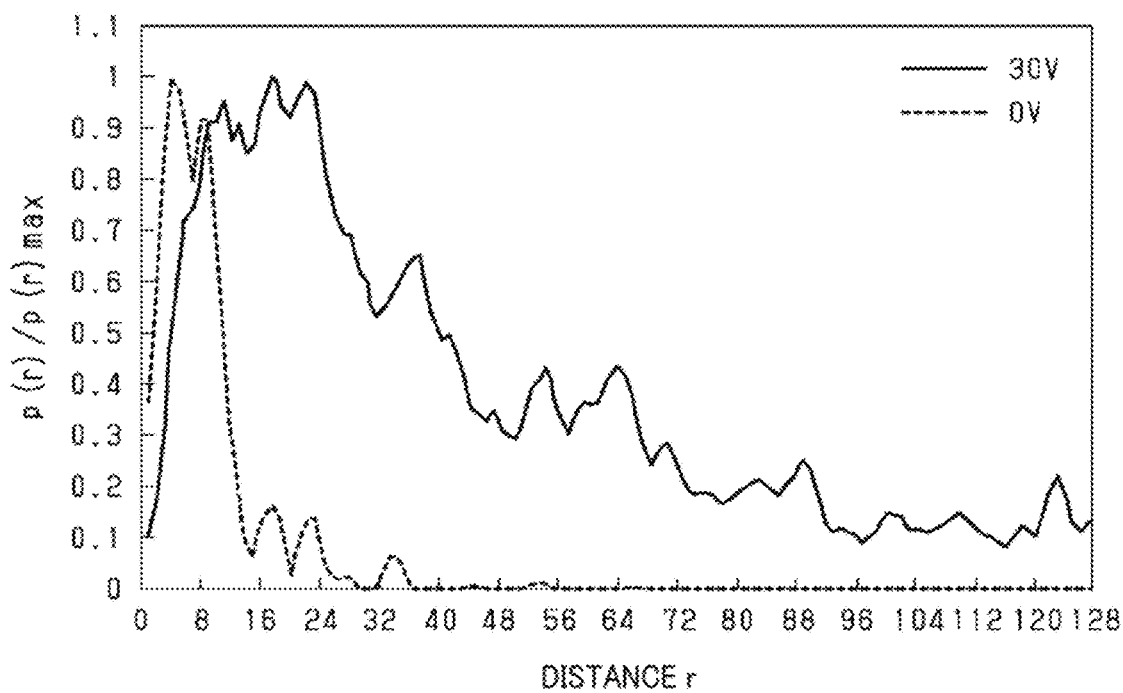
FIG. 33 is a graph showing the radial distribution obtained from the FFT image of Test Example 2-3.

FIG. 33 is a graph showing the dependence of the radial distribution p(r) on the driving voltage V, i.e., showing the radial distribution p(r) of Test Example 2-3 obtained from the FFT image of Example Evaluation Image 2-3.

It should be noted that, in FIGS. 31 to 33, values obtained by normalizing the radial distribution p(r) by the maximum value p(r)max are shown for each driving voltage V. Furthermore, each FFT uses processing according to ITU-R Rec BT.601 standard for (i) grayscaling, and using the grayscaled image data, (ii) two-dimensional fast Fourier transform and (iii) frequency analysis were sequentially performed.

As shown in FIG. 31, as a result of frequency analysis of Test Example 2-1, when the driving voltage V is 0 V, i.e., when the light transmittance of the light control sheet 10 is the lowest, there is one large peak of radial distribution p(r) in the range where the distance r is 8 or smaller, and there are no peaks of radial distribution p(r) in the remaining range. When the driving voltage is 30 V, i.e., when the light transmittance of the light control sheet 10 is the highest, there are two large peaks of radial distribution p(r) in the range where the distance r is 16 or smaller, and there are four small peaks of radial distribution p(r) in the range where the distance r is 16 or more and 64 or less.

As shown in FIG. 32, as a result of frequency analysis of Test Example 2-2, when the driving voltage V is 0 V, i.e., when the light transmittance of the light control sheet 10 is the lowest, there are one large peaks of radial distribution p(r) and one small peak of radial distribution p(r) in the range where the distance r is 8 or smaller, and there are no peaks of radial distribution p(r) in the remaining range.

On the other hand, as a result of frequency analysis of Test Example 2-2, when the driving voltage is 30 V, i.e., when the light transmittance of the light control sheet 10 is the highest, there are three large peaks of radial distribution p(r) in the range where the distance r is 8 or more and 16 or less. In addition, there are a large number of small peaks of radial distribution p(r) over a wide range where the distance r is 16 or more and 96 or less, the number of which is significantly larger than in Test Example 2-1.

As shown in FIG. 33, as a result of frequency analysis of Test Example 2-3, when the driving voltage V is 0 V, i.e., when the light transmittance of the light control sheet 10 is the lowest, there are two large peaks of radial distribution p(r) in the range where the distance r is 16 or less, and there are three small peaks of radial distribution p(r) in the range where the distance is 16 or more and 40 or less.

On the other hand, as a result of frequency analysis of Test Example 2-3, when the driving voltage is 30 V, i.e., when the light transmittance of the light control sheet 10 is the highest, there are a large number of large peaks of radial distribution p(r) over almost the entire range of the distance r of 128 or less, the number of which is significantly larger than in Test Examples 2-1 and 2-2.

Thus, in all of Test Examples 2-1 to 2-3, the radial distribution p(r) is less likely to change due to the difference in the driving voltage V, in the range in which the distance r is relatively small, i.e., in the relatively high spatial frequency range in real space. On the other hand, in Test Examples 2-2 and 2-3, the radial distribution p(r) greatly changes due to the difference in the driving voltage V, in the range in which the distance r is relatively large, i.e., in the relatively high spatial frequency range in real space.

The high spatial frequency range in real space shows fine gradation in a grayscaled image, e.g., shows the surface profile or contour of an object. On the other hand, the low spatial frequency range in real space shows coarse gradation in a grayscaled image, e.g., shows the presence or absence of an object. As described above, a difference in radial distribution p(r) due to the difference in the driving voltage V can represent the difference in spatial frequency in real space. For example, a difference in radial distribution p(r) due to the difference in the driving voltage V can represent the difference between fine gradation such as the townscape with many buildings of different sizes or the test pattern, and coarse gradation such as the tree against the background of the sky.

Consequently, for example, for the light control sheet 10 with a predetermined driving voltage V applied thereto, a difference in radial distribution p(r) can represent the difference between an optical state not allowing visual recognition of the surface profile, contour, or the like of an object, and an optical state allowing visual recognition of the surface profile, contour, or the like of an object. For example, for the light control sheet 10 with a predetermined driving voltage V applied thereto, a difference in radial distribution p(r) can represent the difference between an optical state not allowing visual recognition of the presence or absence, or the like of an object, and an optical state allowing visual recognition of the presence or absence, or the like of an object.

In other words, it can be said that the suitability degree of the imaging target 13 as a subject is determined based on the sum of values of the radial distribution p(r) satisfying the sampling conditions, preceding the time-dependent evaluation on the optical state of the light control sheet 10.

Figure 34:
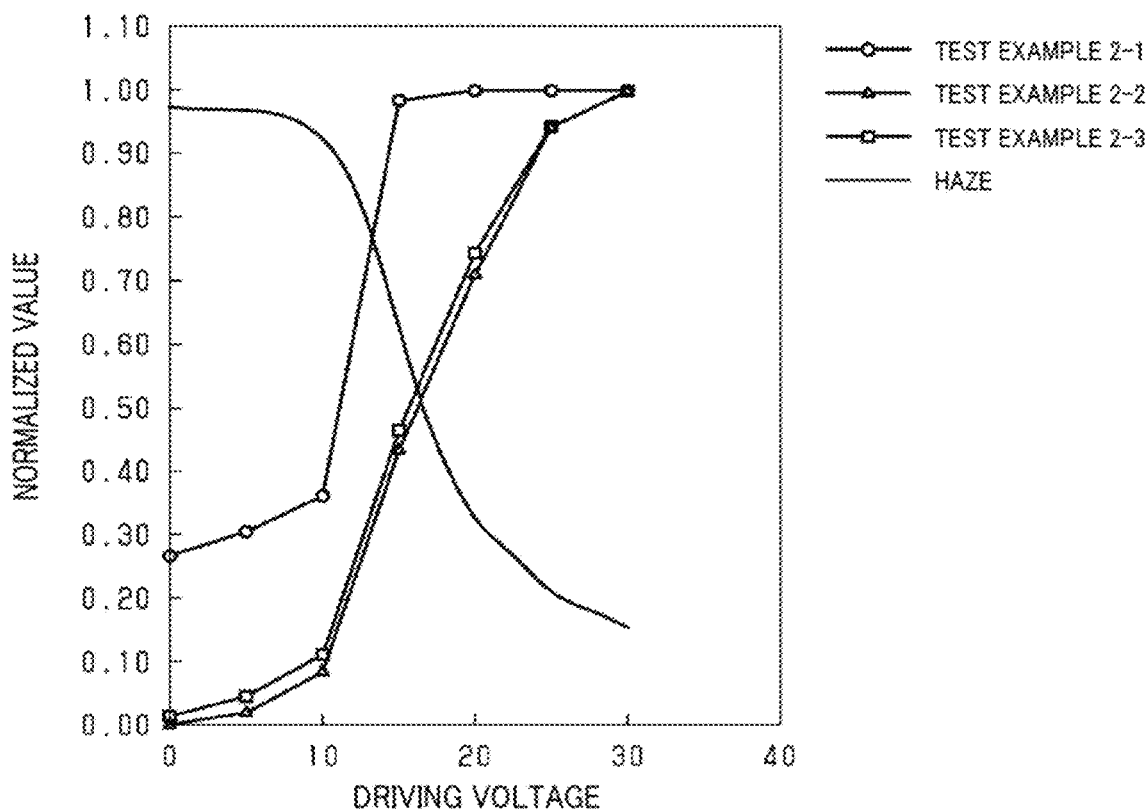
FIG. 34 is a graph showing a relationship between the driving voltage and the normalized value of a sample integrated value obtained from the radial distributions of the test examples, together with haze.

FIG. 34 shows the dependence of the evaluation indices Qe obtained from the radial distribution p(r) of Test Examples 2-1 to 2-3 on the driving voltage V, and the dependence of the haze in the light control sheet 10 on the driving voltage V. It should be noted that, in FIG. 34, the sample integrated value SumV calculated at each driving voltage V is divided by the reference value to indicate an evaluation index Qe normalized by the reference value. In this case, the sample integrated value SumV when the driving voltage V is 30 V, i.e., the sample integrated value SumV when the light control sheet 10 has the highest light transmittance, was used as the reference value. Furthermore, in FIG. 34, haze in the light control sheet 10 shows values each normalized to 100% as 1.

As shown in FIG. 34, in the range where the driving voltage V is 0 V or more and 10 V or less, haze in the light control sheet 10 gradually decreases from around 100% to 90%. Furthermore, in the range where the driving voltage V is 0 V or more and 10 V or less, the evaluation index Qe of Test Example 2-1 gradually increases from around 0.3 to around 0.4. The evaluation indices Qe of Test Examples 2-2 and 2-3 gradually increase from around 0 to 0.1.

On the other hand, in the range where the driving voltage V is 10 V or more and 20 V or less, haze in the light control sheet 10 rapidly decreases from 90% to 30%. In the range where the driving voltage V is 10 V or more and 20 V or less, the evaluation indices Qe of Test Examples 2-2 and 2-3 rapidly increase from around 0.1 to around 0.7.

Thus, when the imaging targets 13 of Test Examples 2-2 and 2-3 are used for evaluation, the evaluation indices Qe corresponding to haze in the light control sheet 10 are easily obtained at all driving voltages V. The imaging targets 13 of Test Examples 2-2 and 2-3 are suitable for evaluating the haze degree of the light control sheet 10.

On the other hand, in the range where the driving voltage V is 10 V or more and 13 V or less, the evaluation index Qe of Test Example 2-1 rapidly increases from around 0.3 to around 1.0, and remains substantially at 1.0 when the driving voltage V is 13 V or more.

Thus, when the imaging target 13 of Test Example 2-1 is used for evaluation, the evaluation index Qe corresponding to haze in the light control sheet 10 is easily obtained at the driving voltage V of less than 13 V. On the other hand, when the imaging target 13 of Test Example 2-1 is used for evaluation, the evaluation index Qe is less likely to follow haze in the light control sheet 10 in the range where the driving voltage V is 13 V or more, compared to the driving voltage V of less than 13 V. Therefore, when using haze in the light control sheet 10 as an evaluation item, the imaging target 13 of Test Example 2-1 is suitable at the driving voltage V of less than 13 V. Also, when evaluating whether haze in the light control sheet 10 is 90% or more, the imaging target 13 of Test Example 2-1 is suitable at all the driving voltages V.

It should be noted that in the range where the driving voltage V is 20 V or more and 30 V or less, haze in the light control sheet 10 gradually decreases from 30% to 10%. Furthermore, the evaluation indices Qe of Test Examples 2-2 and 2-3 gradually increase from 0.7 to 1.0.

According to the second embodiment, the advantageous effects enumerated below can be achieved.

(2-1) The evaluation index Qe according to the light control sheet 10 tends to be larger as haze in the light control sheet 10 increases, and thus easily changes in synchrony with the change in haze in the light control sheet 10. Thus, since the suitability of the imaging target 13 is determined on the basis that the evaluation index Qe is in a predetermined range, the optical state of the light control sheet 10 can be evaluated using the alternative evaluation index Qe.

(2-2) The external light conditions in which the imaging target 13 is placed when capturing an image thereof via the light control sheet 10 can change variously depending on the imaging conditions. The external light conditions in which the imaging target 13 is placed may include illuminance and illumination angle in the illumination of lighting equipment or in the external light such as natural light. In this regard, if the sample integrated value SumV when the light control sheet 10 is transparent is configured to be used as a reference value, the influence of the external light conditions on the calculation of the evaluation index Qe is reduced. Consequently, the accuracy of evaluation using the alternative evaluation index Qe can be enhanced.

(2-3) A view which is seen from the place of installation of the light control sheet 10 can be used as an imaging target 13. Therefore, the optical state of the light control sheet 10 which is mounted on the transparent member 11 can be evaluated when installing or monitoring the light control sheet 10.

(2-4) Since the evaluation index Qe is calculated from the sample integrated value SumV in the radial distribution p(r), an evaluation index Qe with a magnitude according to the optical state of the light control sheet 10 can be calculated whether the spatial frequency components may appear in a one-dimensional direction or in two-dimensional directions in an evaluation image PE. Specifically, constraints related to spatial anisotropy are mitigated in the imaging target 13. Accordingly, the suitability determination for the imaging target 13 can be diversely applied to various fields, and further, versatility of the light control system can be enhanced.

The second embodiment can be modified and implemented as follows.

The evaluation index Qe is not limited to a value obtained by normalizing the sample integrated value SumV by a reference value, but may be, for example, the sample integrated value SumV itself. It should be noted that a first evaluation index Qe when the light control sheet 10 is transparent may be calculated, and a second evaluation index Qe may be normalized using the first evaluation index Qe as a reference value. With this configuration, the error due to the difference in illumination during imaging or due to the difference in the imaging target 13 can be mitigated in the evaluation index Qe. Thus, since a degree of obscuring caused by the light control sheet 10 can be calculated with high accuracy, accuracy can be enhanced in the suitability determination for an imaging target.

After determining that an imaging target 13 is suitable for optical state evaluation, the index calculation device 20 may separately calculate an evaluation index Qe from the evaluation image PE of the imaging target 13 after being used for the suitability determination. Then, the index calculation device 20 may determine that the light control sheet 10 is normal on the basis that the evaluation index Qe calculated after the suitability determination is not less than the index threshold Qm. Specifically, the index calculation device 20 may execute the processing from steps S11 to S14 after performing the suitability determination, and may determine that the optical state of the light control sheet 10 should be maintained on the basis that the evaluation index Qe is not less than the index threshold Qm.

Furthermore, the index calculation device 20 may correct the driving voltage V so that the evaluation index Qe will be not less than the index threshold Qm on the basis that the evaluation index Qe calculated after the suitability determination is less than the index threshold Qm. Specifically, the index calculation device 20 may execute the processing from steps S12 to S18 after performing the suitability determination and may correct the driving voltage V so that the evaluation index Qe will be not less than the index threshold Qm on the basis that the evaluation index Qe is less than the index threshold Qm, thereby maintaining the optical state of the light control sheet 10.

Third Embodiment

Next, of the imaging targets 13 for evaluating the optical state of the light control sheet 10, a more preferable imaging target 13 will be described below as an example, from the perspective of enhancing the evaluation accuracy of the optical state.

The radial distribution p(r) obtained in an example of image processing is the sum of the power spectra over the concentric circle regions that are present at a distance r from the center of the two-dimensional Fourier transform image. The waves that are highly likely to show the contour of an object have a higher frequency in the two-dimensional Fourier transform than the waves that are highly likely to show the presence or absence of an object. The waves that are highly likely to show the contour of an object have a larger distance r in the radial distribution p(r) than the waves that are highly likely to show the presence or absence of an object. Thus, the radial distribution p(r) with a relatively large distance r in the range of the distance r for which the radial distribution p(r) is calculated represents the appearance of an object more precisely, such as the contour and the surface texture of the object, seen via the light control sheet 10.

By evaluating the appearance of an object seen via the light control sheet 10 in more detail, the optical state of the light control sheet 10 can be evaluated with higher accuracy. If the radial distribution p(r) with a relatively large distance r follows the change in optical state of the light control sheet 10 with higher accuracy, this means that the evaluation index Qe obtained from the radial distribution p(r) can more faithfully represent the appearance of the object seen via the light control sheet 10. Specifically, the imaging target 13, in which the radial distribution p(r) with a relatively large distance r changes following the change in optical state of the light control sheet 10, can evaluate the optical state of the light control sheet 10 with higher accuracy among various imaging targets 13.

The imaging target 13 capable of evaluating the optical state of the light control sheet 10 with higher accuracy is a geometric pattern, i.e., a test pattern, formed of a plurality of straight lines. The width of each straight line forming the geometric pattern is preferred to be, for example, 0.2 mm or more and 0.7 mm or less, and more preferred to be 0.2 mm or more and 0.5 mm or less. The interval between the straight lines adjacent to each other in the geometric pattern is preferred to be, for example, 2.5 mm or more and 3.5 mm or less, and more preferred to be 2.8 mm or more and 3.0 mm or less. If the width of each straight line is 0.2 mm or more and 0.7 mm or less, the sharpness of the image captured via the light control sheet 10 is more suitable for evaluating the light control sheet 10. If the interval between first and second straight lines adjacent to each other is 2.5 mm or more and 3.5 mm or less, the degree of overlap between the partially obscured first straight line in the image and the partially obscured second straight line adjacent to the partially obscured first straight line in the image is more suitable for evaluating the light control sheet 10. The geometric pattern may be formed of a black background and white straight lines, or may be formed of a white background and black straight lines.

Test Examples

Referring to FIGS. 35 to 42, a description will now be given of test examples showing whether the imaging target 13 is preferable, from the perspective of enhancing the accuracy of evaluation. The following description will be given taking an example in which a polymer network liquid crystal light control sheet driven as a normal type is used as the light control sheet 10.

It should be noted that FIGS. 35, 37, 39, 41 and 43 are images of imaging targets 13 different from each other captured as Test Examples 3-1, 3-2, 3-3, 3-4 and 3-5 using Example Device 1 described in the first embodiment. Also, all the test examples are images captured via the light control sheet 10 in a transparent state with the driving voltage set to 30 V. Furthermore, all the test examples are images, as evaluation images PE, obtained through the following processing. Specifically, from among the images captured by the imaging device 12, the above images were each trimmed to a size of 600 cps×600 cps to define the portion imaged via the light control sheet 10, and then compressed to a size of 256 cps×256 cps.

FIGS. 36, 38, 40, 42 and 44 are graphs showing the radial distribution p(r) calculated from the evaluation images PE of Test Examples 3-1, 3-2, 3-3, 3-4 and 3-5 using the image processing described in the first embodiment. When calculating the radial distributions p(r), the FFT images of Test Examples 3-1, 3-2, 3-3, 3-4 and 3-5 were sequentially subjected to (i) grayscaling according to the processing of the ITU-R Rec BT.601 standard, (ii) two-dimensional fast Fourier transform using the grayscaled image data, and (iii) frequency analysis.

In FIGS. 36, 38, 40, 42 and 44, the horizontal axis indicates the frequency corresponding to the distance r. The vertical axis indicates values obtained by normalizing the radial distribution p(r) by the maximum value p(r)max, as intensities. Furthermore, FIGS. 36, 38, 40, 42 and 44 show the intensities obtained via the light control sheet 10 in a transparent state, the intensities obtained via the light control sheet 10 in an opaque state, and the intensities obtained via the light control sheet 10 in an intermediate state between the transparent and opaque states. The transparent state, the opaque state, and the intermediate state between the transparent and opaque states were obtained by changing the driving voltage.

Figure 35:
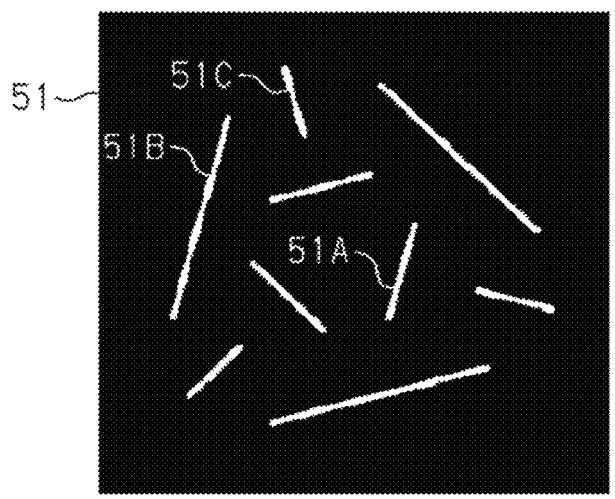
FIG. 35 is a diagram illustrating a test pattern of Test Example 3-1.

FIG. 35 is an evaluation image PE of Test Example 3-1. The imaging target 13 in the evaluation image PE of Test Example 3-1 is a pattern of white light leaking from linear slits. The imaging target 13 in the evaluation image PE of Test Example 3-1 is formed of a plurality of linear slits geometrically arranged in a black background. The width of each straight line of white light is 0.2 mm or more and 0.5 mm or less. The interval between the straight lines of white light adjacent to each other is 2.8 mm or more and 3.0 mm or less.

As shown in FIG. 35, the evaluation image PE of Test Example 3-1 includes three first straight lines 51A, three second straight lines 51B, and three third straight lines 51C. The first straight lines 51A, the second straight lines 51B, and the third straight lines 51C are isolated straight lines which do not intersect each other.

The length of each first straight line 51A is shorter than that of each second straight line 51B, and longer than that of each third straight line 51C. The three first straight lines 51A extend in the tangential direction of one first circle inscribed in these first straight lines 51A. The three first straight lines 51A are evenly arranged, one every 120°, in the circumferential direction of the first circle.

The three second straight lines 51B extend in the tangential direction of one second circle inscribed in these second straight lines 51B, and are evenly arranged, one every 120°, in the circumferential direction of the second circle. The diameter of the second circle inscribed in the three second straight lines 51B is larger than the diameter of the first circle inscribed in the three first straight lines 51A. In the circumferential direction of the second circle, each second straight line 51B is located between first straight lines 51A adjacent to each other. In this case, the angle formed between the normal line to each of these first straight lines 51A and the normal line to the corresponding second straight line 51B is 60°.

The three third straight lines 51C are located outside the first circle inscribed in the three first straight lines 51A, and traverse the second circle inscribed in the three second straight lines 51B. The third straight lines 51C align with respective normal lines to the first straight lines 51A. The extension lines of the third straight lines 51C pass through the center of the respective first straight lines 51A.

The first circle inscribed in the three first straight lines 51A is concentric with the second circle inscribed in the three second straight lines 51B. The diameter of the first circle inscribed in the three first straight lines 51A is slightly larger than the length of each first straight line 51A. The diameter of the second circle inscribed in the three second straight lines 51B is about twice the diameter of the first circle inscribed in the first straight lines 51A, and is slightly larger than the length of each second straight line 51B.

Figure 36:
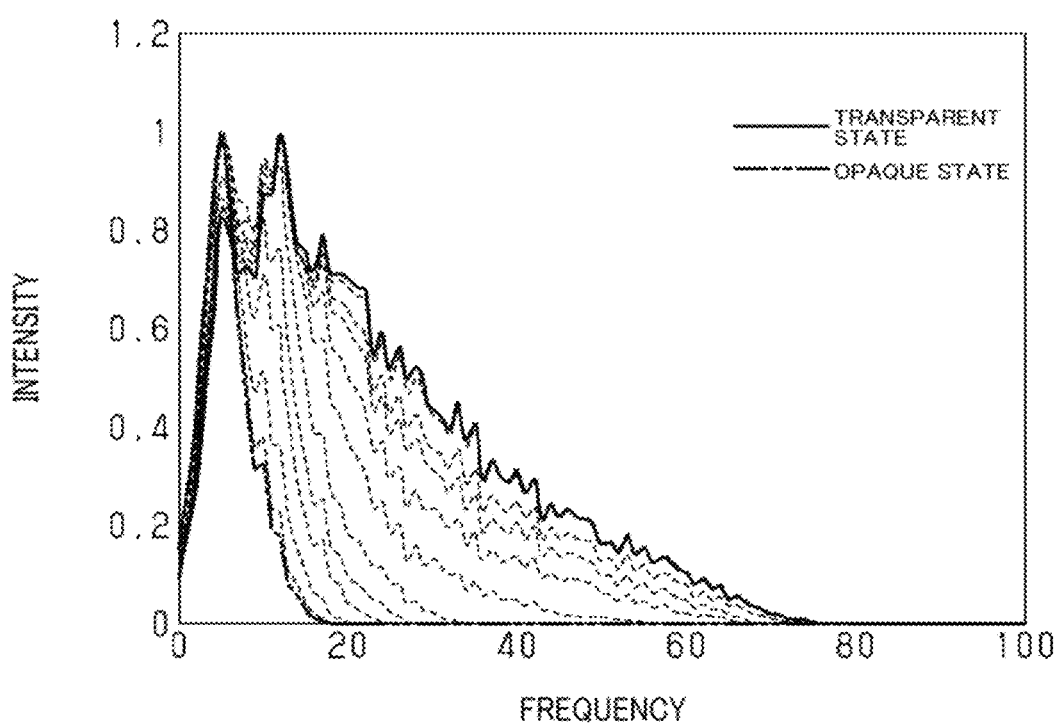
FIG. 36 is a graph showing the radial distribution obtained from the FFT image of Test Example 3-1.

FIG. 36 is a graph showing the dependence of the radial distribution p(r) of Test Example 3-1 on the driving voltage. Specifically, FIG. 36 is a graph showing the dependence of the radial distribution p(r) of Test Example 3-1 on the optical state of the light control sheet 10.

As shown in FIG. 36, when the light control sheet 10 is in a transparent state, the frequency dependence of the radial distribution p(r) of Test Example 3-1 shows the presence of a number of fine peaks. These fine peaks tend to become lower as the frequency becomes higher. Further, the frequency dependence of the radial distribution p(r) of Test Example 3-1 shows the presence of broad peaks as a whole extending to a relatively high frequency band.

The radial distribution p(r) of Test Example 3-1 is reduced as the state of the light control sheet 10 changes from transparent to opaque, i.e., as the driving voltage is reduced. Thus, the degree of reducing the radial distribution p(r) is small in the range in which the frequencies are relatively low, and large in the range in which the frequencies are relatively high.

As mentioned above, when the light control sheet 10 is in a transparent state, the frequency dependence of the radial distribution p(r) of Test Example 3-1 shows the presence of a number of fine peaks. As the state of the light control sheet 10 changes from transparent to opaque, the frequency dependence of the radial distribution p(r) gradually reduces, as if the fine peaks are reduced one by one. In the radial distribution p(r) of Test Example 3-1, since a large number of peaks are present when the light control sheet 10 is in a transparent state, high resolution is obtained from reducing the peaks one by one.

In Test Example 3-1, the radial distribution p(r) with relatively high frequencies changes more finely following the change in optical state of the light control sheet 10. Consequently, Test Example 3-1 can evaluate the optical state of the light control sheet 10 with higher accuracy among various imaging targets 13.

Figure 37:
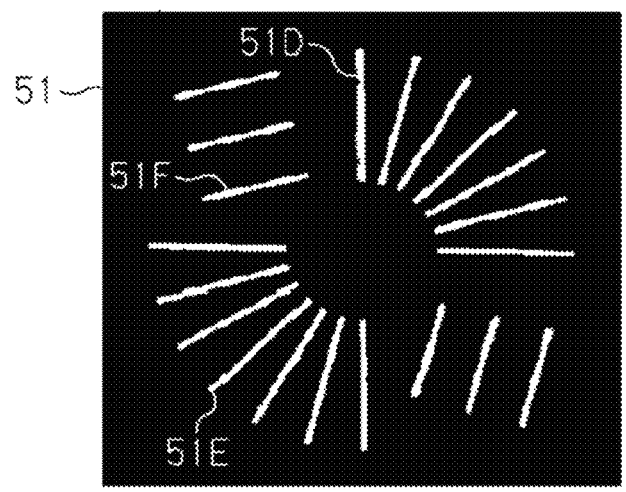
FIG. 37 is a diagram illustrating a test pattern of Test Example 3-2.

FIG. 37 is an evaluation image PE of Test Example 3-2. The imaging target 13 in the evaluation image PE of Test Example 3-2 is a pattern of white light leaking from linear slits. The imaging target 13 in the evaluation image PE of Test Example 3-2 is formed of a plurality of linear slits geometrically arranged in a black background.

As shown in FIG. 37, the evaluation image PE of Test Example 3-2 is formed of two radial line groups each including seven fourth straight lines 51D, and two parallel line groups each including three fifth straight lines 51F. The length of each fourth straight line 51D is slightly larger than that of each fifth straight line 51F.

The inner ends of the fourth straight lines 51D are located on a single circle. The fourth straight lines 51D extend radially outward from the single circle. The diameter of the single circle on which the inner ends of the 14 fourth straight lines 51D are located is equal to the length of each fourth straight line 51D. In each of the radial line groups, the seven fourth straight lines 51D are evenly arranged, one every 15°, in the circumferential direction of the circle. The center angle of the radial line group is 90°. The two radial line groups are diagonally positioned with respect to the single circle on which the inner ends of the 14 fourth straight lines 51D are located.

In each of the parallel line groups, three fifth straight lines 51F are arranged equally spaced apart in one direction. The direction in which the fifth straight lines 51F are arranged is the normal direction of the fifth straight lines 51F. The virtual straight line passing through the centers of the fifth straight lines 51F and extending in the normal direction of the fifth straight lines 51F does not pass through the center of the single circle on which the inner ends of the fourth straight line 51D are located. A first parallel line group is located in a first gap sandwiched between the two radial line groups in the circumferential direction of the single circle where the inner ends of the fourth straight lines 51D are located. A second parallel line group is located in a second gap sandwiched between the two radial line groups in the circumferential direction of the single circle where the inner ends of the fourth straight lines 51D are located. The first parallel line group is located diagonally opposite to the second parallel line group with respect to the single circle where the inner ends of the fourth straight lines 51D are located. The two parallel line groups are asymmetric with respect to the center of the single circle where the inner ends of the fourth straight lines 51D are located.

Figure 38:
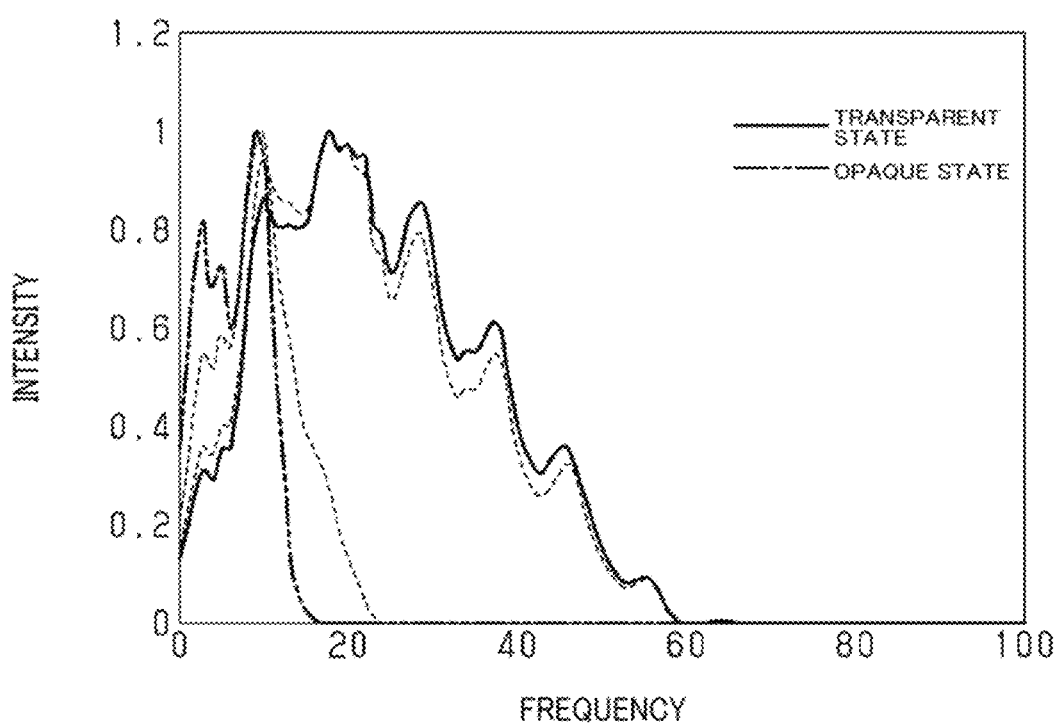
FIG. 38 is a graph showing the radial distribution obtained from the FFT image of Test Example 3-2.

FIG. 38 is a graph showing the dependence of the radial distribution p(r) of Test Example 3-2 on the driving voltage. Specifically, FIG. 38 is a graph showing the dependence of the radial distribution p(r) of Test Example 3-2 on the optical state of the light control sheet 10.

As shown in FIG. 38, when the light control sheet 10 is in a transparent state, the frequency dependence of the radial distribution p(r) of Test Example 3-2 shows the presence of seven peaks greatly separated from each other. Specifically, the frequency dependence of the radial distribution p(r) of Test Example 3-2 shows the presence of fewer peaks than in Test Example 3-1. Also, the frequency spread of the radial distribution p(r) of Test Example 3-2 is narrower than in Test Example 3-1.

The radial distribution p(r) of Test Example 3-2 is reduced as the state of the light control sheet 10 changes from transparent to opaque, i.e., as the driving voltage is reduced. Thus, the degree of reducing the radial distribution p(r) is small in the range in which the frequencies are relatively low, and large in the range in which the frequencies are relatively high.

As mentioned above, when the light control sheet 10 is in a transparent state, the frequency dependence of the radial distribution p(r) of Test Example 3-2 shows the presence of peaks which are coarse compared to Test Example 3-1. Consequently, if the evaluation index Qe is calculated using the imaging target 13 of Test Example 3-2, the optical state of the light control sheet 10 can be evaluated. However, if the evaluation index Qe is calculated using the imaging target 13 of Test Example 3-1, the optical state of the light control sheet 10 can be evaluated with higher accuracy because the radial distribution p(r) with relatively high frequencies can follow the change in optical state of the light control sheet 10.

Figure 39:
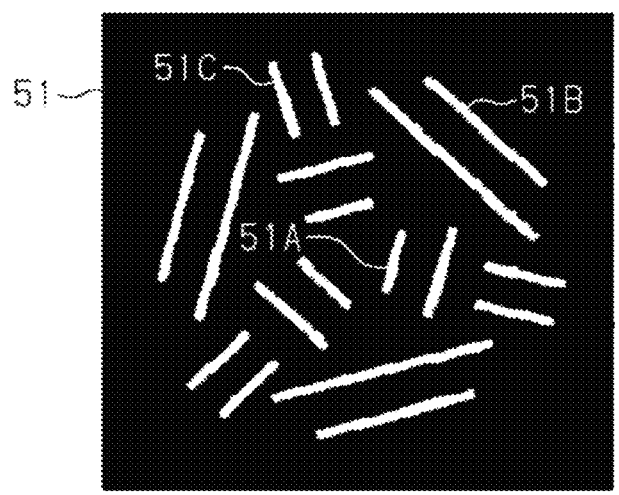
FIG. 39 is a diagram illustrating a test pattern of Test Example 3-3.

FIG. 39 is an evaluation image PE of Test Example 3-3. The imaging target 13 in the evaluation image PE of Test Example 3-3 is a pattern of white light leaking from linear slits. The imaging target 13 in the evaluation image PE of Test Example 3-3 is formed of a plurality of linear slits geometrically arranged in a black background.

As shown in FIG. 39, the evaluation image PE of Test Example 3-3 includes six first straight lines 51A, six second straight lines 51B, and six third straight lines 51C. The number of straight lines forming the evaluation image PE of Test Example 3-3 is twice the number of straight lines in the evaluation image PE of Test Example 3-1.

The six first straight lines 51A form two straight line groups each of which is formed of three first straight lines 51A. The diameter of the circle inscribed in one line group is larger than the diameter of the circle inscribed in another line group. The six second straight lines 51B form two straight line groups each of which is formed of three second straight lines 51B. The diameter of the circle inscribed in one line group is larger than the diameter of the circle inscribed in another line group. The six third straight lines 51C form three straight line groups each of which is formed of two third straight lines 51C parallel to each other.

Figure 40:
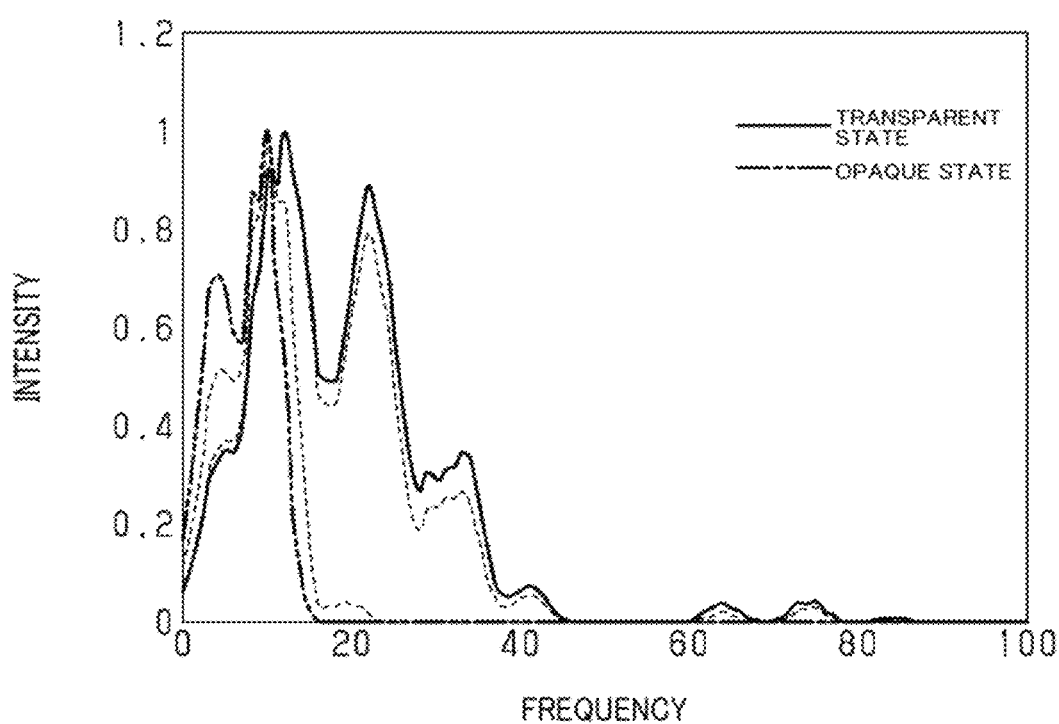
FIG. 40 is a graph showing the radial distribution obtained from the FFT image of Test Example 3-3.

FIG. 40 is a graph showing the dependence of the radial distribution p(r) of Test Example 3-3 on the driving voltage. Specifically, FIG. 40 is a graph showing the dependence of the radial distribution p(r) of Test Example 3-3 on the optical state of the light control sheet 10.

As shown in FIG. 40, when the light control sheet 10 is in a transparent state, the frequency dependence of the radial distribution p(r) of Test Example 3-3 shows the presence of seven peaks greatly separated from each other. Specifically, the frequency dependence of the radial distribution p(r) of Test Example 3-3 shows the presence of fewer peaks than in Test Example 3-1. Also, the frequency spread of the radial distribution p(r) of Test Example 3-3 is approximately the same as in Test Example 3-1, although the peaks are separated from each other.

The radial distribution p(r) of Test Example 3-3 is reduced as the state of the light control sheet 10 changes from transparent to opaque, i.e., as the driving voltage is reduced. Thus, the degree of reducing the radial distribution p(r) is small in the range in which the frequencies are relatively low, and large in the range in which the frequencies are relatively high.

As mentioned above, when the light control sheet 10 is in a transparent state, the frequency dependence of the radial distribution p(r) of Test Example 3-3 shows the presence of coarse peaks compared to Test Examples 3-1 and 3-2. Consequently, if the evaluation index Qe is calculated using the imaging target 13 of Test Example 3-3, the optical state of the light control sheet 10 can be evaluated. However, as described above, if the evaluation index Qe is calculated using the imaging target 13 of Test Example 3-1, the optical state of the light control sheet 10 can be evaluated with higher accuracy because the radial distribution p(r) with relatively high frequencies can follow the change in optical state of the light control sheet 10.

Figure 41:
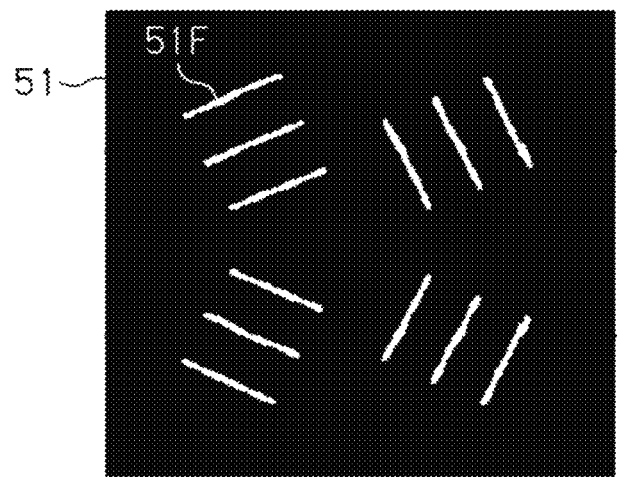
FIG. 41 is a diagram illustrating a test pattern of Test Example 3-4.

FIG. 41 is an evaluation image PE of Test Example 3-4. The imaging target 13 in the evaluation image PE of Test Example 3-4 is a pattern of white light leaking from linear slits. The imaging target 13 in the evaluation image PE of Test Example 3-4 is formed of a plurality of linear slits geometrically arranged in a black background.

As shown in FIG. 41, the evaluation image PE of Test Example 3-4 includes twelve fifth straight lines 51F. The evaluation image PE of Test Example 3-4 is formed of twice as many parallel line groups as the parallel line groups in the evaluation image PE of Test Example 3-2, with the radial line groups omitted from the evaluation image PE of Test Example 3-2.

The twelve fifth straight lines 51F form four parallel line groups each of which is formed of three fifth straight lines 51F. Of the four parallel line groups, two parallel line groups are formed by translating and rotating two other parallel line groups. Of the four parallel line groups, two parallel line groups correspond to the parallel line groups of Test Example 3-2. The circle inscribed in the four parallel line groups is substantially concentric with the circle circumscribing the four parallel line groups.

Figure 42:
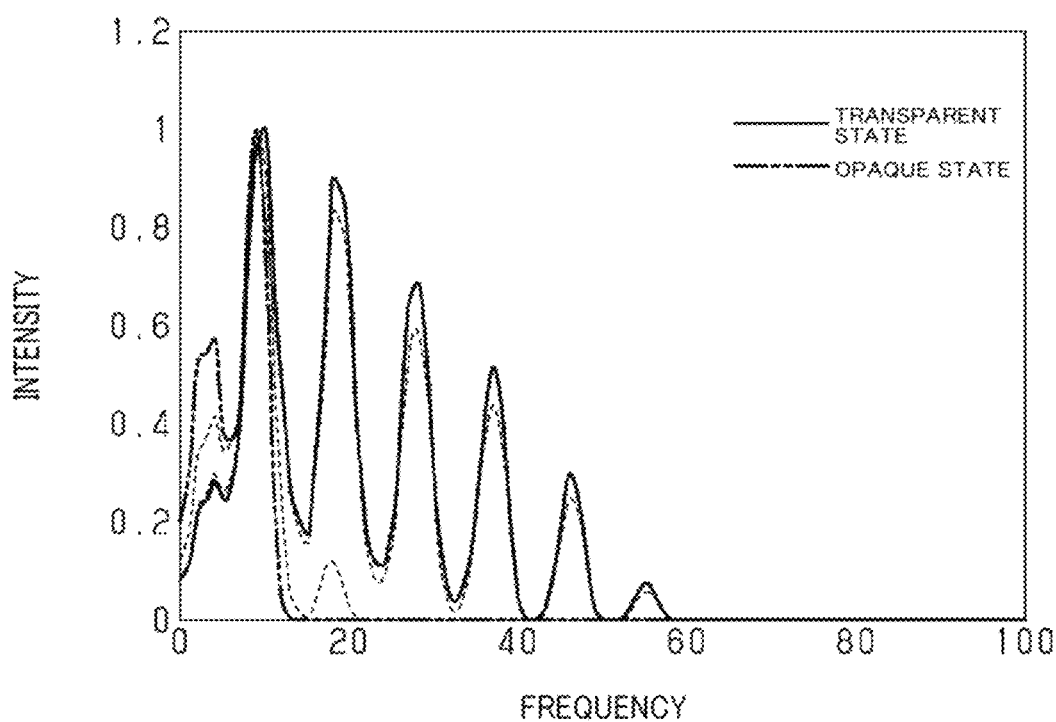
FIG. 42 is a graph showing the radial distribution obtained from the FFT image of Test Example 3-4.

FIG. 42 is a graph showing the dependence of the radial distribution p(r) of Test Example 3-4 on the driving voltage. Specifically, FIG. 42 is a graph showing the dependence of the radial distribution p(r) of Test Example 3-4 on the optical state of the light control sheet 10.

As shown in FIG. 42, when the light control sheet 10 is in a transparent state, the frequency dependence of the radial distribution p(r) of Test Example 3-4 shows the presence of six sharp peaks greatly separated from each other. Specifically, the frequency dependence of the radial distribution p(r) of Test Example 3-4 shows the presence of fewer peaks than in Test Examples 3-1, 3-2 and 3-3. Also, the frequency spread of the radial distribution p(r) of Test Example 3-4 is approximately the same as in Test Example 3-2.

The radial distribution p(r) of Test Example 3-4 is reduced as the state of the light control sheet 10 changes from transparent to opaque, i.e., as the driving voltage is reduced. Thus, the degree of reducing the radial distribution p(r) is small in the range in which the frequencies are relatively low, and large in the range in which the frequencies are relatively high.

As described above, when the light control sheet 10 is in a transparent state, the frequency dependence of the radial distribution p(r) of Test Example 3-4 shows the presence of peaks which are coarse compared to Test Examples 3-1, 3-2 and 3-3. Consequently, if the evaluation index Qe is calculated using the imaging target 13 of Test Example 3-4, the optical state of the light control sheet 10 can be evaluated. However, as described above, if the evaluation index Qe is calculated using the imaging target 13 of Test Example 3-1, the optical state of the light control sheet 10 can be evaluated with higher accuracy because the radial distribution p(r) with relatively high frequencies can follow the change in optical state of the light control sheet 10.

Figure 43:
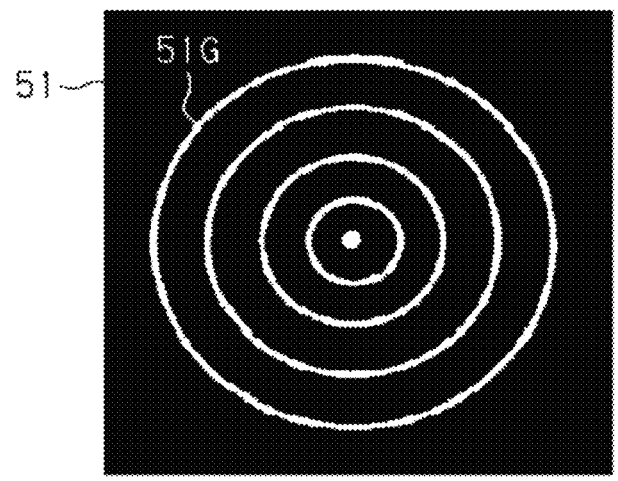
FIG. 43 is a diagram illustrating a test pattern of Test Example 3-5.

FIG. 43 is an evaluation image PE of Test Example 3-5. The imaging target 13 in the evaluation image PE of Test Example 3-5 is a pattern of white light leaking from a circular hole and four annular slits. In the imaging target 13, a circular hole and four annular slits concentric with the circular hole are arranged in a black background.

Figure 44:
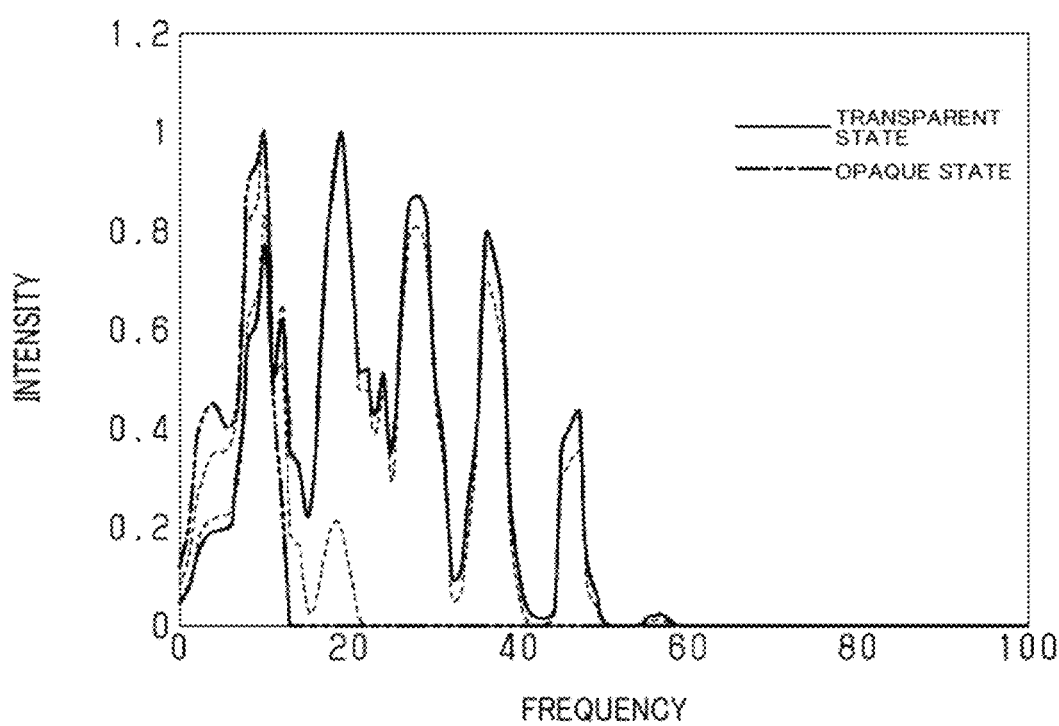
FIG. 44 is a graph showing the radial distribution obtained from the FFT image of Test Example 3-5.

FIG. 44 is a graph showing the dependence of the radial distribution p(r) of Test Example 3-5 on the driving voltage. Specifically, FIG. 44 is a graph showing the dependence of the radial distribution p(r) of Test Example 3-5 on the optical state of the light control sheet 10.

As shown in FIG. 44, when the light control sheet 10 is in a transparent state, the frequency dependence of the radial distribution p(r) of Test Example 3-5 shows the presence of five sharp peaks greatly separated from each other. Specifically, the frequency dependence of the radial distribution p(r) of Test Example 3-5 shows the presence of fewer peaks than in Test Examples 3-1, 3-2 and 3-3. Also, the frequency spread of the radial distribution p(r) of Test Example 3-5 is approximately the same as in Test Example 3-2.

The radial distribution p(r) of Test Example 3-5 is reduced as the state of the light control sheet 10 changes from transparent to opaque, i.e., as the driving voltage is reduced. Thus, the degree of reducing the radial distribution p(r) is small in the range in which the frequencies are relatively low, and large in the range in which the frequencies are relatively high.

As described above, when the light control sheet 10 is in a transparent state, the frequency dependence of the radial distribution p(r) of Test Example 3-5 shows the presence of peaks which are coarse compared to Test Examples 3-1, 3-2, 3-3 and 3-4. Consequently, if the evaluation index Qe is calculated using the imaging target 13 of Test Example 3-5, the optical state of the light control sheet 10 can be evaluated. However, as described above, if the evaluation index Qe is calculated using the imaging target 13 of Test Example 3-1, the optical state of the light control sheet 10 can be evaluated with higher accuracy because the radial distribution p(r) with relatively high frequencies can follow the change in optical state of the light control sheet 10.

The present application addresses the following. Transparent materials such as glass plates or acrylic plates to which light control sheets are mounted are installed in buildings, moving objects, and the like. The spread of light control sheets can be further accelerated if the optical states of light control sheets can be evaluated in a state where they are installed in buildings or moving objects. However, haze measurement, in which light intensity is measured in the dark by placing a dedicated optical device such as an integrating sphere, may make the evaluation of optical state troublesome in buildings, moving objects, and the like. Therefore, in the fields of using light control sheets, alternative evaluation indices are desired to be provided, with which the optical states of light control sheets can be evaluated in a state where they are installed in buildings, moving objects, and the like.

Alternative evaluation indices indicating optical states of light control sheets are commonly required in various situations of handling light control sheets such as when light control sheets are developed, shipped, and monitored, in addition to when they are installed.

An evaluation index calculation device for solving the above issues is an evaluation index calculation device that calculates an evaluation index representing an optical state of a light control sheet. The evaluation index calculation device includes a calculation section that acquires an evaluation image that is an image which is related to a subject in a predetermined environment and captured via the light control sheet, and calculates a degree of obscuring caused by the light control sheet in the evaluation image, as the evaluation index, through image analysis of the evaluation image.

An evaluation index calculation method for solving the above issues is an evaluation index calculation method that calculates an evaluation index representing an optical state of a light control sheet. The evaluation index calculation method includes: acquiring an evaluation image that is an image which is related to a subject in a predetermined environment and captured via the light control sheet; and calculating a degree of obscuring caused by the light control sheet in the evaluation image, as the evaluation index, through image analysis of the evaluation image.

An evaluation index calculation program for solving the above issues causes an evaluation index calculation device for calculating an evaluation index representing an optical state of a light control sheet: to acquire an evaluation image that is an image which is related to a subject in a predetermined environment and captured via the light control sheet; and to calculate a degree of obscuring caused by the light control sheet in the evaluation image, as the evaluation index, through image analysis of the evaluation image.

With the above configuration, the degree of obscuring caused by the light control sheet in the evaluation image captured via the light control sheet is calculated through image analysis of the evaluation image. Capturing an evaluation image is achieved not by a dedicated optical device such as an integrating sphere, but by a general-purpose imaging device such as a smartphone or tablet. The degree of obscuring of the evaluation image is calculated using various image analyses such as frequency analysis and edge intensity analysis of the evaluation image. The degree of obscuring caused by the light control sheet can be calculated based on the degree of obscuring of an evaluation image captured without using the light control sheet, the degree of obscuring of an evaluation image captured with the light control sheet transparent, or a predetermined value estimated to correspond to these values. The degree of obscuring caused by the light control sheet tends to be larger as haze in the light control sheet increases and easily changes in synchrony with the change in haze in the light control sheet. Therefore, the evaluation index representing the optical state of the light control sheet can be diversified as long as the above configuration is used for calculating the degree of obscuring of the evaluation image.

The evaluation index calculation device may further include a determination section that determines normality of the light control sheet, using the evaluation index when an optical state of the light control sheet is normal and the evaluation index calculated by the calculation section.

According to the above evaluation index calculation device, normality of the light control sheet can be determined using an alternative evaluation index.

In the above evaluation index calculation device, the image analysis may be frequency analysis of the evaluation image.

Sharpness of the short-period repetition in an evaluation image is detected as magnitudes of frequency components in a high frequency band. On the other hand, sharpness of the long-period repetition in an evaluation image is detected as magnitudes of frequency components in a low frequency band. In this regard, as long as the above evaluation index calculation device is used, the degree of obscuring is calculated through frequency analysis of the evaluation image, and therefore, the optical state of the light control sheet can be expressed precisely with the degree of obscuring.

In the evaluation index calculation device, the degree of obscuring may be magnitudes of frequency components in a predetermined frequency band.

According to the above evaluation index calculation device, magnitudes of the frequency components in a predetermined frequency band are calculated as a degree of obscuring. Therefore, this can provide, for example, an evaluation index specialized in terms of the sharpness of short-period repetition or the sharpness of long-period repetition.

In the above evaluation index calculation device, the magnitudes of the frequency components may be the intensities of a radial distribution obtained from Fourier transform of the image.

With the above configuration, since the magnitudes of the frequency components in the radial distribution are calculated as a degree of obscuring, the frequency components with magnitudes according to the optical state of the light control sheet can be calculated whether the spatial frequency components may appear in a one-dimensional direction or in two-dimensional directions. Specifically, constraints related to spatial anisotropy are reduced in the imaging target. Accordingly, application of the evaluation index calculation device can be diversified into various fields, and further, versatility of the evaluation index calculation device can be enhanced.

In the above evaluation index calculation device, the predetermined frequency band may be a band of frequencies that are higher than a frequency indicating maximum energy in the radial distribution obtained from Fourier transform of the image.

As described above, sharpness of the short-period repetition in an evaluation image is detected as magnitudes of frequency components in a high frequency band. On the other hand, the frequency components in a low frequency band tend to show only the presence or absence of an object based on visual recognition thereof via the light control sheet, and tend to show maximum energy in the radial distribution. In this regard, as long as the above evaluation index calculation device is used, a degree of obscuring of an evaluation image is calculated in a band higher than the frequency indicating the maximum energy. Therefore, the light control sheet can be evaluated as to whether it can provide fine visibility such as the contour of an object, rather than coarse visibility such as the presence or absence of an object.

The above evaluation index calculation device may further include a determination section that stores magnitudes of frequency components when the optical state of the light control sheet is normal, as a normal range, and determines the optical state of the light control sheet to be normal if the magnitudes of the frequency components are in the normal range.

According to the above evaluation index calculation device, the optical state of the light control sheet being normal can be determined through image analysis, based on the magnitudes of frequency components.

In the above evaluation index calculation device, the calculation section may calculate a value by normalizing a degree of obscuring of the evaluation image when no driving voltage is applied to the light control sheet, by a degree of obscuring of the evaluation image when a driving voltage is applied to the light control sheet.

According to the above evaluation index calculation device, based on the state of the light control sheet with a driving voltage applied thereto, the optical state of the light control sheet with no driving voltage applied thereto is calculated as an evaluation index. Therefore, the optical state of the light control sheet can be evaluated, including evaluation regarding normality of the drive unit for driving the light control sheet.

In the above evaluation index calculation device: the evaluation index may be in a suitability range, the evaluation index being related to an image obtained by capturing an image of the subject suitable for optical state evaluation, via the light control sheet having a predetermined optical state; an image of an imaging target captured via the light control sheet having the predetermined optical state may be an image used for determination; the calculation section may calculate a degree of obscuring of the image used for determination by performing image analysis of the image used for determination; and the device may further include a determination section that determines that the imaging target is suitable for optical state evaluation on the basis that the degree of obscuring of the image used for determination is in the suitability range.

In the above evaluation index calculation method: the evaluation index may be in a suitability range, the evaluation index being related to an image obtained by capturing an image of the subject suitable for optical state evaluation, via the light control sheet having a predetermined optical state; an image of an imaging target captured via the light control sheet having the predetermined optical state may be an image used for determination; and a degree of obscuring of the image used for determination may be calculated by performing image analysis of the image used for determination, and the imaging target may be determined to be suitable for optical state evaluation on the basis that the degree of obscuring of the image used for determination is in the suitability range.

In the above evaluation index calculation program: the evaluation index may be in a suitability range, the evaluation index being related to an image obtained by capturing an image of the subject suitable for optical state evaluation, via the light control sheet having a predetermined optical state; an image of an imaging target captured via the light control sheet having the predetermined optical state may be an image used for determination; and the evaluation index calculation device may be caused to calculate a degree of obscuring of the image used for determination by performing image analysis of the image used for determination, and to determine the imaging target to be suitable for optical state evaluation on the basis that the degree of obscuring of the image used for determination is in the suitability range.

With the above configuration, the degree of obscuring caused by the light control sheet in the image captured via the light control sheet is calculated through image analysis of the image. Capturing such an image is achieved not by a dedicated optical device such as an integrating sphere, but by a general-purpose imaging device such as a smartphone or tablet. The degree of obscuring of such an image is calculated through various image analyses such as frequency analysis and edge intensity analysis. The degree of obscuring caused by the light control sheet can be calculated based on the degree of obscuring of an image captured without using the light control sheet, the degree of obscuring of an image captured with the light control sheet transparent, or a predetermined value estimated to correspond to these values. The degree of obscuring caused by the light control sheet tends to be larger as haze in the light control sheet increases, and thus easily changes in synchrony with the change in haze in the light control sheet. Therefore, the optical state of the light control sheet can be evaluated using an alternative evaluation index that is a degree of obscuring, as long as the above configuration is used for determining that an imaging target is suitable, on the basis that the degree of obscuring caused by the light control sheet in an imaging target is in a suitability range.

In the above evaluation index calculation device: the degree of obscuring of the image used for determination calculated by the calculation section is a value obtained by normalizing a first degree of obscuring by a second degree of obscuring; the suitability range is a range of normalized values of an image which is related to the subject and captured via the light control sheet having a predetermined optical state; the first degree of obscuring is a degree of obscuring caused by the light control sheet in an image of the imaging target captured via the light control sheet in an opaque state; and the second degree of obscuring is a degree of obscuring caused by the light control sheet in an image of the imaging target captured via the light control sheet in a transparent state.

The external light conditions in which the imaging target is placed when capturing an image thereof via the light control sheet can change variously depending on the imaging conditions. The external light conditions in which the imaging target is placed include illuminance and illumination angle in the illumination of lighting equipment or in the external light such as natural light. In this regard, according to the above suitability determination device, the influence of the external light conditions on the calculation of the degree of obscuring is reduced because the degree of obscuring when the light control sheet is transparent is used as a reference. Consequently, the accuracy of evaluation using an alternative evaluation index that is a degree of obscuring can be enhanced.

In the above evaluation index calculation device, the imaging target may be a view that can be seen from a place where the light control sheet is installed. With this configuration, the optical state of the light control sheet can be evaluated when the light control sheet is installed or monitored, being mounted on a transparent member as an exterior or interior material of various facilities.

In the above evaluation index calculation method: the subject may be formed of a plurality of straight lines; the plurality of straight lines do not intersect each other and may be formed of three first straight lines, three second straight lines, and three third straight lines; the three first straight lines may extend in a tangential direction of a first circle inscribed in the three first straight lines, and may be evenly arranged in a circumferential direction of the first circle; the three second straight lines may extend in a tangential direction of a second circle concentric with the first circle and inscribed in the three second straight lines, and may be evenly arranged in a circumferential direction of the second circle so that each one second straight line is located between the first straight lines adjacent to each other in the circumferential direction of the second circle; a diameter of the first circle may be smaller than a diameter of the second circle; and the three third straight lines may be located outside the second circle in a radial direction, and may align with respective normal lines to the three first straight lines.

According to the above evaluation index calculation method, the optical state of the light control sheet can be evaluated with higher accuracy.

The evaluation index calculation device, the evaluation index calculation method, and the evaluation index calculation program of the present disclosure can diversify the evaluation index representing the optical state of the light control sheet.

REFERENCE SIGNS LIST p(r) . . . Radial distribution
PE . . . Evaluation image
Qe . . . Evaluation index
10 . . . Light control sheet
12 . . . Imaging device
13 . . . Imaging target
20 . . . Index calculation device
22 . . . Image analysis unit
23A . . . Evaluation index calculation program
30 . . . Light control device Obviously, numerous modifications and variations of the present invention are possible in light of the above teachings. It is therefore to be understood that within the scope of the appended claims, the invention may be practiced otherwise than as specifically described herein.

What is claimed is:

1. A device that calculates an evaluation index representing an optical state of a light control sheet, comprising:
a calculation section that acquires an evaluation image related to a subject in a predetermined environment and captured via the light control sheet, and calculates a degree of obscuring caused by the light control sheet in the evaluation image, as the evaluation index, through frequency analysis of the evaluation image,
wherein, the degree of obscuring corresponds to intensities of a radial distribution obtained from Fourier transform of the image in a predetermined band of frequencies that are higher than a frequency indicating maximum energy in the radial distribution obtained from Fourier transform of the image.

2. The device according to claim 1, further comprising:
a determination section that determines normality of the light control sheet, using the evaluation index when an optical state of the light control sheet is normal and the evaluation index calculated by the calculation section.

3. The device according to claim 1, further comprising:
a determination section that stores magnitudes of frequency components when the optical state of the light control sheet is normal, as a normal range, and determines the optical state of the light control sheet to be normal if the magnitudes of the frequency components are in the normal range.

4. The device according to claim 1, wherein the calculation section calculates a value by normalizing a degree of obscuring of the evaluation image when no driving voltage is applied to the light control sheet, by a degree of obscuring of the evaluation image when a driving voltage is applied to the light control sheet.

5. The device according to claim 1, wherein the evaluation index is in a suitability range, the evaluation index being related to an image obtained by capturing an image of the subject suitable for optical state evaluation, via the light control sheet having a predetermined optical state,
an image of an imaging target captured via the light control sheet having the predetermined optical state is an image used for determination,
the calculation section calculates a degree of obscuring of the image used for determination by performing image analysis of the image used for determination, and
the device further comprises a determination section that determines that the imaging target is suitable for optical state evaluation on the basis that the degree of obscuring of the image used for determination is in the suitability range.

6. The device according to claim 5, wherein the degree of obscuring of the image used for determination calculated by the calculation section is a value obtained by normalizing a first degree of obscuring by a second degree of obscuring,
the suitability range is a range of normalized values of an image which is related to the subject and captured via the light control sheet having a predetermined optical state;
the first degree of obscuring is a degree of obscuring caused by the light control sheet in an image of the imaging target captured via the light control sheet in an opaque state, and
the second degree of obscuring is a degree of obscuring caused by the light control sheet in an image of the imaging target captured via the light control sheet in a transparent state.

7. The device according to claim 6, wherein the imaging target is a view that can be seen from a place where the light control sheet is installed.

8. A method of calculating an evaluation index representing an optical state of a light control sheet, comprising:
acquiring an evaluation image related to a subject in a predetermined environment and captured via the light control sheet; and
calculating a degree of obscuring caused by the light control sheet in the evaluation image, as the evaluation index, through image analysis of the evaluation image,
wherein, the subject is formed of a plurality of straight lines,
the plurality of straight lines do not intersect each other and are formed of three first straight lines, three second straight lines, and three third straight lines,
the three first straight lines extend in a tangential direction of a first circle inscribed in the three first straight lines, and are evenly arranged in a circumferential direction of the first circle,
the three second straight lines extend in a tangential direction of a second circle concentric with the first circle and inscribed in the three second straight lines, and are evenly arranged in a circumferential direction of the second circle so that each one second straight line is located between the first straight lines adjacent to each other in the circumferential direction of the second circle,
a diameter of the first circle is smaller than a diameter of the second circle, and
the three third straight lines are located outside the second circle in a radial direction, and align with respective normal lines to the three first straight lines.

9. The method according to claim 8, wherein the evaluation index is in a suitability range, the evaluation index being related to an image obtained by capturing an image of the subject suitable for optical state evaluation, via the light control sheet having a predetermined optical state,
an image of an imaging target captured via the light control sheet having the predetermined optical state is an image used for determination, and
a degree of obscuring of the image used for determination is calculated by performing image analysis of the image used for determination, and the imaging target is determined to be suitable for optical state evaluation on the basis that the degree of obscuring of the image used for determination is in the suitability range.

10. A non-transitory computer-readable medium including program, wherein the program, when executed by a computer, causes the computer to perform a method of calculating an evaluation index representing an optical state of a light control sheet, comprising:
acquiring an evaluation image that is an image which is related to a subject in a predetermined environment and captured via the light control sheet; and
calculating a degree of obscuring caused by the light control sheet in the evaluation image, as the evaluation index, through frequency analysis of the evaluation image,
wherein, the degree of obscuring corresponds to intensities of a radial distribution obtained from Fourier transform of the image in a predetermined band of frequencies that are higher than a frequency indicating maximum energy in the radial distribution obtained from Fourier transform of the image.

11. The non-transitory computer-readable medium according to claim 10, wherein the evaluation index is in a suitability range, the evaluation index is related to an image obtained by capturing an image of the subject suitable for optical state evaluation, via the light control sheet having a predetermined optical state,
an image of an imaging target captured via the light control sheet having the predetermined optical state is an image used for determination, and
the evaluation index calculation device is caused to calculate a degree of obscuring of the image used for determination by performing image analysis of the image used for determination, and to determine the imaging target to be suitable for optical state evaluation on the basis that the degree of obscuring of the image used for determination is in the suitability range.

* * * * *